(12) United States Patent
Matsuzaki et al.

(10) Patent No.: US 8,452,985 B2
(45) Date of Patent: May 28, 2013

(54) CIRCUIT BUILDING DEVICE

(75) Inventors: Natsume Matsuzaki, Osaka (JP); Toshihisa Nakano, Osaka (JP); Shinichi Marui, Osaka (JP)

(73) Assignee: Panasonic Corporation, Osaka (JP)

( * ) Notice: Subject to any disclaimer, the term of this patent is extended or adjusted under 35 U.S.C. 154(b) by 1187 days.

(21) Appl. No.: 11/886,712

(22) PCT Filed: Apr. 7, 2006

(86) PCT No.: PCT/JP2006/307481
§ 371 (c)(1),
(2), (4) Date: Sep. 20, 2007

(87) PCT Pub. No.: WO2006/109738
PCT Pub. Date: Oct. 19, 2006

(65) Prior Publication Data
US 2009/0013193 A1    Jan. 8, 2009

(30) Foreign Application Priority Data
Apr. 7, 2005  (JP) ................................. 2005-110608

(51) Int. Cl.
G06F 11/30  (2006.01)
G06F 12/14  (2006.01)

(52) U.S. Cl.
USPC ........................................................ 713/191

(58) Field of Classification Search
USPC ........................................................ 713/191
See application file for complete search history.

(56) References Cited

U.S. PATENT DOCUMENTS

| 6,101,255 | A   | 8/2000 | Harrison et al. |
| 6,907,126 | B2* | 6/2005 | Inada ............................. 380/255 |
| 7,096,357 | B1  | 8/2006 | Tochikubo et al. |
| 7,555,129 | B2  | 6/2009 | Yamamoto et al. |
| 7,788,502 | B1* | 8/2010 | Donlin et al. ................. 713/189 |

(Continued)

FOREIGN PATENT DOCUMENTS

| EP | 1 143 655 | 10/2001 |
| JP | 8-204702  | 8/1996  |

(Continued)

OTHER PUBLICATIONS

Yamada et al., "The Secure Renewal of Crypt Modules in the Open Network Architecture", The 2000 Symposium on Cryptography and Information Security, SCIS2000-C46, Jan. 2000. (including English Translation).

(Continued)

*Primary Examiner* — Edan Orgad
*Assistant Examiner* — Harris Wang
(74) *Attorney, Agent, or Firm* — Wenderoth, Lind & Ponack L.L.P.

(57) ABSTRACT

The present invention provides an apparatus for securely acquiring a circuit configuration information set corresponding to a new cryptosystem without increasing the number of reconfigurable circuits. A content playback apparatus includes an FPGA that is reconfigurable. The content playback apparatus stores a decryption circuit program that shows the structure of a decryption circuit that executes decryption in accordance with a prescribed cryptosystem. The FPGA is reconfigured in accordance with the program to configure the decryption circuit. The playback apparatus acquires, from outside, an encrypted file that has been generated by encrypting a file including a decryption circuit program corresponding to the new cryptosystem in accordance with the prescribed cryptosystem, and decrypts the encrypted file by the decryption circuit.

16 Claims, 28 Drawing Sheets

U.S. PATENT DOCUMENTS

| | | |
|---|---|---|
| 2005/0021961 A1 | 1/2005 | Hanks et al. |
| 2005/0021985 A1 | 1/2005 | Ono et al. |
| 2005/0027994 A1 | 2/2005 | Sai |
| 2005/0074125 A1* | 4/2005 | Chavanne et al. ............ 380/278 |
| 2008/0107269 A1 | 5/2008 | Gehrmann et al. |

FOREIGN PATENT DOCUMENTS

| | | |
|---|---|---|
| JP | 10-320191 | 12/1998 |
| JP | 11-085014 | 3/1999 |
| JP | 2000-261427 | 9/2000 |
| JP | 2001-127747 | 5/2001 |
| JP | 2001-325153 | 11/2001 |
| JP | 2002-50956 | 2/2002 |
| JP | 2002-290396 | 10/2002 |
| JP | 2003-198530 | 7/2003 |
| JP | 2003-304235 | 10/2003 |
| JP | 2004-248232 | 9/2004 |
| JP | 2004-336178 | 11/2004 |
| JP | 2005-6302 | 1/2005 |
| WO | 01/30019 | 4/2001 |

OTHER PUBLICATIONS

United States Office Action issued Sep. 30, 2010 in U.S. Appl. No. 11/912,473.

* cited by examiner

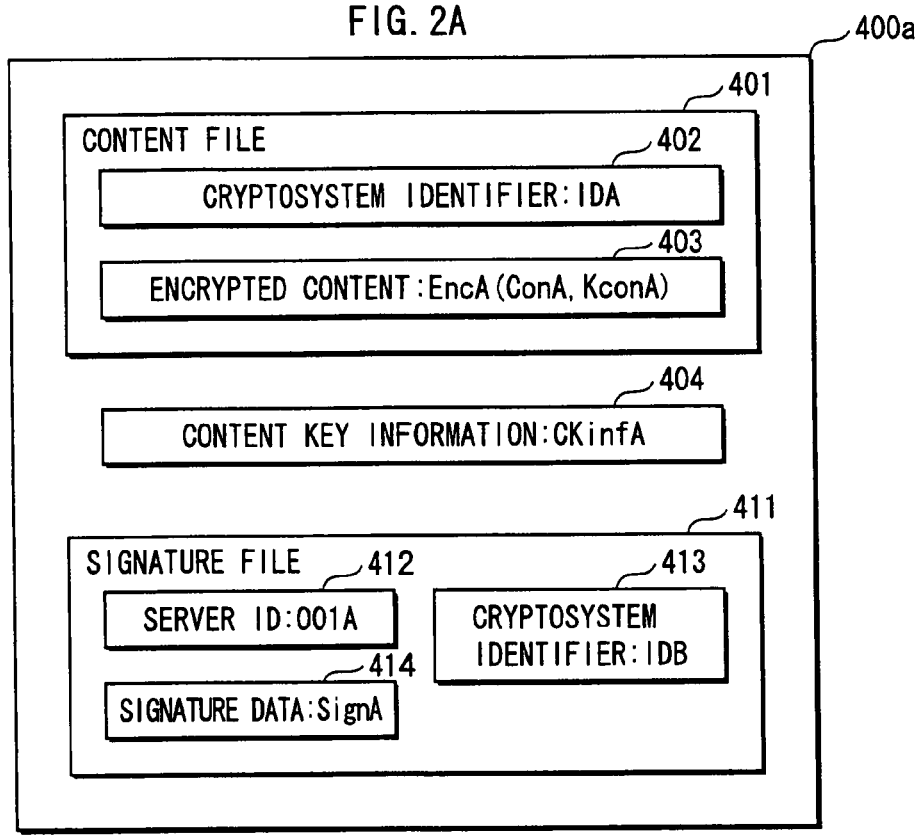
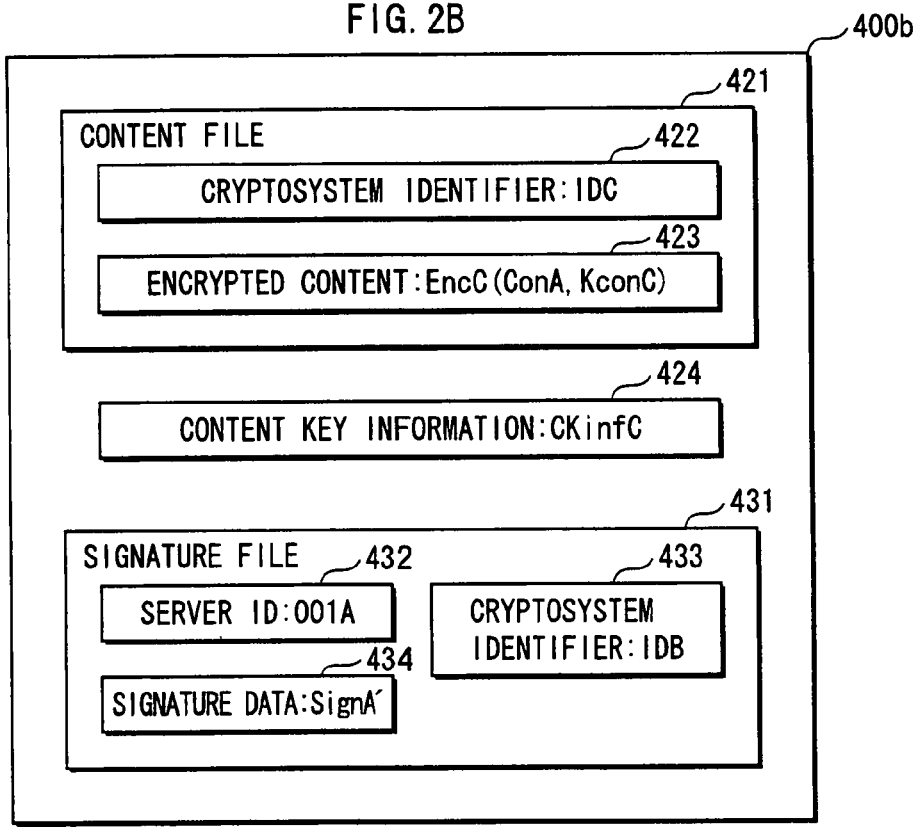

FIG. 4A

DISABLED-CRYPTOSYSTEM LIST  621

| CRYPTOSYSTEM INFORMATION SETS | | | |
|---|---|---|---|
| CRYPTOSYSTEM IDENTIFIER | ENCRYPTION CIRCUIT FILE NAME | KEY CIRCUIT FILE NAME | VERIFICATION KEY FILE NAME |
| IDA | C | KC | VeriC | — 622
| IDB | D | KD | VeriD | — 623
| ⋮ | ⋮ | ⋮ | ⋮ |

FIG. 4B

TRANSMISSION-USE KEY TABLE  626

| TRANSMISSION-USE KEY INFORMATION SETS | | | |
|---|---|---|---|
| CRYPTOSYSTEM IDENTIFIER | ENCRYPTION KEY | DECRYPTION KEY | DECRYPTION KEY INFORMATION |
| IDA | KencA | KdecA | KinfA | — 627
| IDB | KencB | KdecB | KinfB | — 628
| IDC | KencC | KdecC | KinfC | — 629

SIGNATURE KEY TABLE 691

| SIGNATURE KEY INFORMATION SETS ||| |
|---|---|---|---|
| CRYPTOSYSTEM IDENTIFER | SIGNATURE KEY | VERIFICATION KEY | |
| IDA | Ksig_Ab | Kve_Ab | 692 |
| IDB | Ksig_Bb | Kve_Bb | 693 |
| IDC | Ksig_Cb | Kve_Cb | 694 |
| ⋮ | ⋮ | ⋮ | ⋮ |

FIG. 8
CRYPTOSYSTEM MANAGEMENT SERVER

AVAILABLE-CRYPTOSYSTEM TABLE 166

| AVAILABILITY INFORMATION SETS ||
|---|---|
| CRYPTOSYSTEM IDENTIFIER | USAGE FLAG |
| IDA | 1 |
| IDB | 1 |

171
172

166b

| AVAILABILITY INFORMATION SETS ||
|---|---|
| CRYPTOSYSTEM IDENTIFIER | USAGE FLAG |
| IDA | 0 |
| IDB | 1 |
| IDC | 1 |

171b
173

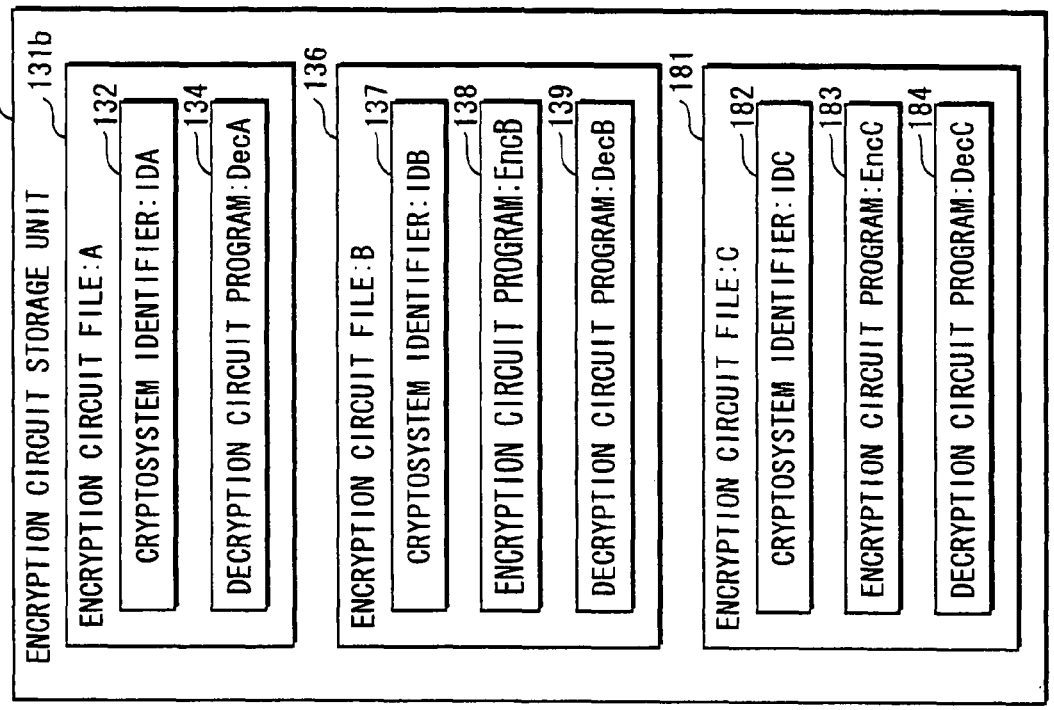
FIG. 12B
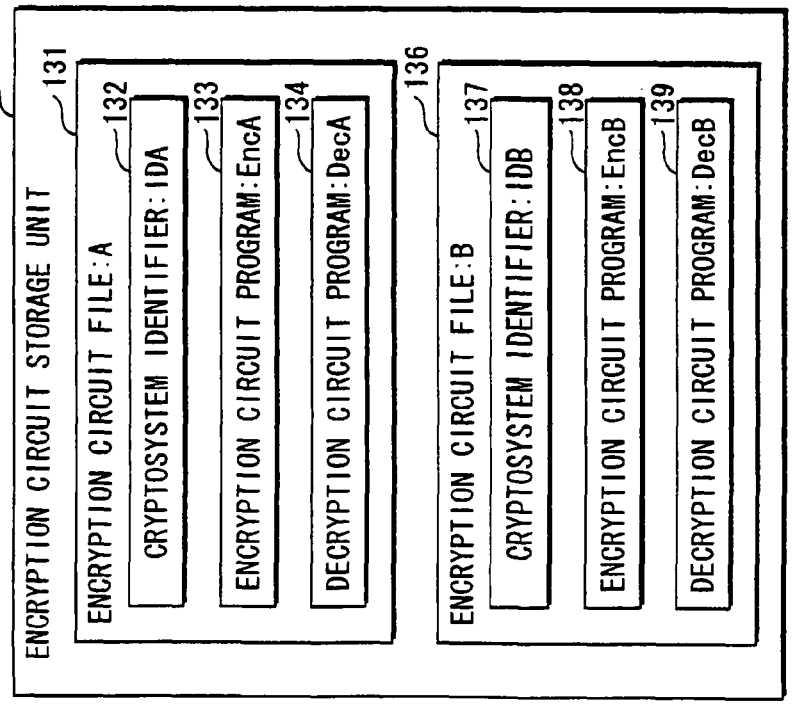
FIG. 12A

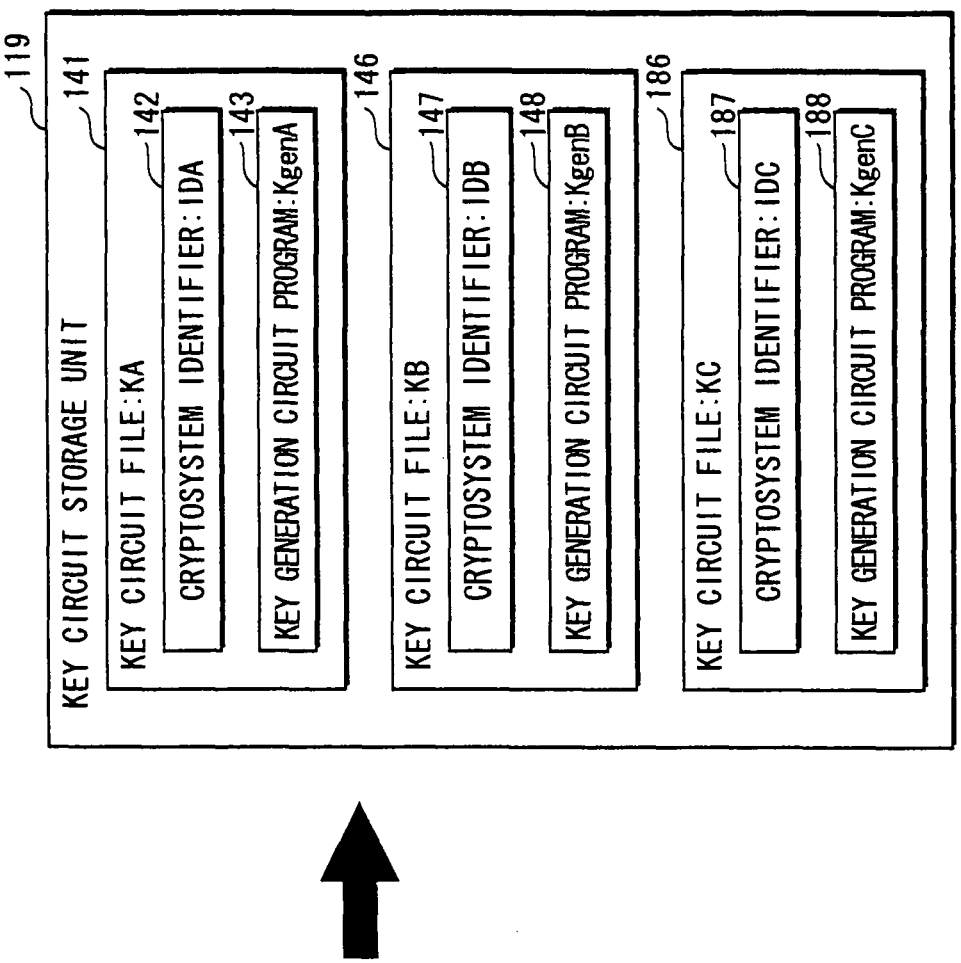
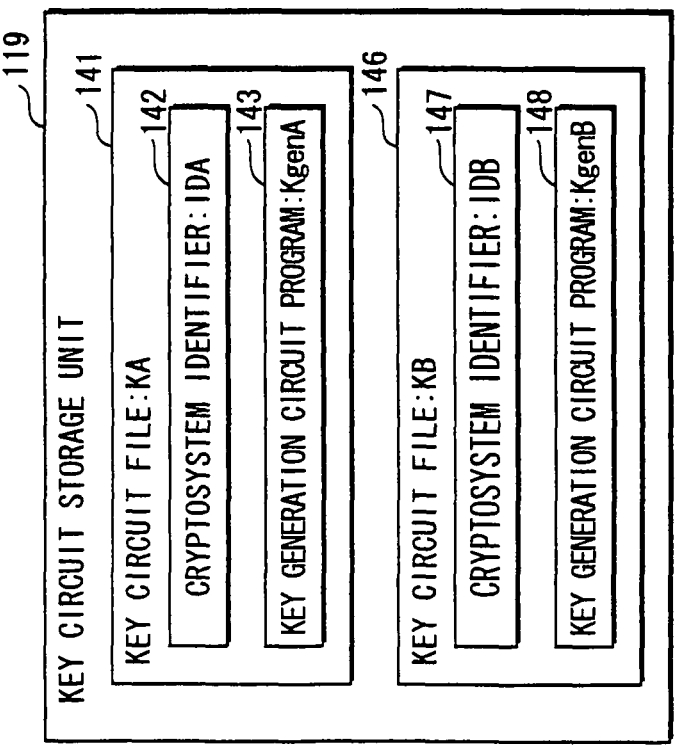

FIG. 18

CHECK INFORMATION TABLE

| CHECK INFORMATION SETS ||| |
|---|---|---|---|
| CRYPTOSYSTEM IDENTIFIER | SERVER ID | VERIFICATION KEY | |
| IDA | 001A | Kve_Aa | |
| IDA | 001B | Kve_Ab | |
| IDB | 001A | Kve_Ba | ~202 |
| IDB | 001B | Kve_Bb | ~203 |

US 8,452,985 B2

CIRCUIT BUILDING DEVICE

TECHNICAL FIELD

The present invention relates to a technique to introduce a new cryptosystem. In particular, the present invention relates to a technique to securely introduce a new cryptosystem, using a limited number of reconfigurable circuits.

BACKGROUND ART

It is now common that a cryptography technology is used for recording digital contents which consist of video and audio data on a recording medium, and selling the contents or distributing the contents via a network, to prevent a malicious use of the contents, such as tampering and tapping. For example, a content provider encrypts contents before distributing the contents, and a playback apparatus decrypts the content to play back the contents. Such a cryptography function is often hardware-implemented into a playback apparatus to realize real-time playback and to secure tamper resistance.

Meanwhile, there is a demand for changing a cryptosystem to another when the cryptosystem used for encryption is broken or a new cryptosystem is developed.

As a technique to change a hardware-implemented cryptosystem, Patent Document 1 discloses an encryption processing system. In this technique, the encryption processing system includes a programmable processor, and changes a cryptosystem by downloading a program in correspondence with the type of an application and data, and introducing the program into the programmable processor.

In some cases, such a program includes information to be kept secret, such as key data used in the cryptography processing and a programmer's knowledge. Therefore, the program should be acquired in a safe manner.

Patent Document 2 discloses a technique to securely input structure data for structuring a circuit in an FPGA (Field Programmable Gate Array). According to this technique, a decryption circuit is provided in the FPGA, between a reconfigurable part thereof and an input terminal. This decryption circuit acquires and decrypts encrypted structure data, and outputs the structure data to the reconfigurable part of the FPGA.

Patent Document 1: Japanese Laid-open Patent Application Publication No. 10-320191

Patent Document 2: Japanese Laid-open Patent Application Publication No. 2002-50956

SUMMARY OF THE INVENTION

However, the technique of Patent Document 2 can not change the cryptosystem stored in the decryption circuit if the cryptosystem is broken. As a result, it becomes impossible to securely acquire the structure data. This is a problem.

Also, reconfigurable circuits are high-cost, and occupy a large area on the substrate. Therefore, it is undesirable to mount many reconfigurable circuits.

To solve the aforementioned problems, the object of the present invention is to provide a circuit configuration apparatus and a circuit configuration method for securely acquiring a circuit configuration information set relating to a new cryptosystem without increasing the number of reconfigurable circuits to be mounted.

Means for Solving the Problems

To solve the aforementioned problems, the present invention provides a circuit configuration apparatus that reconfigures a reconfigurable logic circuit in accordance with a plurality of circuit configuration information sets stored therein to configure an execution circuit, comprising: the reconfigurable logic circuit; a configuration unit operable to acquire a circuit configuration information set that defines an execution circuit that executes prescribed processing, and reconfigure the reconfigurable logic circuit in accordance with the acquired circuit configuration information set to configure the execution circuit; a storage unit that stores one or more existing-circuit configuration information sets respectively corresponding to one or more cryptosystems and each defining an encryption circuit that executes cryptographic processing in accordance with corresponding one of the one or more cryptosystems; an acquisition unit operable to acquire an introduction information set that includes at least an encrypted new-circuit configuration information set generated by encrypting a new-circuit configuration information set that defines an encryption circuit that executes cryptographic processing in accordance with a new cryptosystem that is different from any of the one or more cryptosystems; a reading unit operable to read one of the existing-circuit configuration information sets that corresponds to a cryptosystem used for encrypting the new-circuit configuration information set, and output the read existing-circuit configuration information set as the circuit configuration information set to the configuration unit so that the configuration unit configures an encryption circuit; a control unit operable to control the encryption circuit that has been configured based on the one of the existing-circuit configuration information sets, to decrypt the encrypted new-circuit configuration information set included in the acquired introduction information set to generate the new-circuit configuration information set; and a writing unit operable to write the new-circuit configuration information set that has been legitimately generated into the storage unit.

Another aspect of the present invention is a new circuit introduction system that includes a server apparatus and a circuit configuration apparatus that reconfigures a reconfigurable logic circuit in accordance with a plurality of circuit configuration information sets stored therein to configure an execution circuit, the circuit configuration apparatus comprising: the reconfigurable logic circuit; a configuration unit operable to acquire a circuit configuration information set that defines an execution circuit that executes prescribed processing, and reconfigure the reconfigurable logic circuit in accordance with the acquired circuit configuration information set to configure the execution circuit; a storage unit that stores one or more existing-circuit configuration information sets respectively corresponding to one or more cryptosystems and each defining an encryption circuit that executes cryptographic processing in accordance with corresponding one of the one or more cryptosystems; an acquisition unit operable to acquire an introduction information set that includes at least an encrypted new-circuit configuration information set generated by encrypting a new-circuit configuration information set that defines an encryption circuit that executes cryptographic processing in accordance with a new cryptosystem that is different from any of the one or more cryptosystems; a reading unit operable to read one of the existing-circuit configuration information sets that corresponds to a cryptosystem used for encrypting the new-circuit configuration information set, and output the read existing-circuit configuration information set as the circuit configuration information set to the configuration unit so that the configuration unit configures an encryption circuit; a control unit operable to control the encryption circuit that has been configured based on the one of the existing-circuit configuration information sets, to decrypt the encrypted new-circuit configuration information set included in the acquired introduction information set to generate the new-circuit configuration information set; and a writing unit operable to write the new-circuit configuration information set that has been legitimately generated into the storage unit, and the server apparatus comprising: a storage unit that stores the new-circuit configuration information set; a generation unit operable to generate the encrypted new-circuit configuration information set by encrypting the new-circuit configuration information set; and an output unit operable to output the introduction information set that includes the generated encrypted new-circuit configuration information set to the circuit configuration apparatus.

In the embodiment described below, the "logic circuit" above corresponds to an FPGA 122. The "configuration unit" corresponds to a configuration mechanism 123. The "storage unit" corresponds to an encryption circuit storage unit 117. The "acquisition unit" corresponds to a program acquisition unit 106. The reading unit corresponds to a selection unit 113. The "control unit" corresponds to a control unit 116. The function of the "writing unit" is carried out by a legitimacy check unit 112.

Advantageous Effects of the Present Invention

With the stated structure, the storage unit stores one or more existing-circuit configuration information respectively corresponding to one or more cryptosystems, and the configuration unit reconfigures the logic circuit in accordance with any of the circuit configuration information sets to configure the execution circuit. Accordingly, even if any of the cryptosystems is broken, the circuit configuration apparatus of the present invention can configure an encryption circuit in accordance with a non-broken cryptosystem using only a single rewritable logic circuit, and securely acquire a new-circuit configuration information set using the formed encryption circuit. This is an advantageous effect of the present invention.

The acquisition unit may include a reception subunit operable to receive instruction information that provides an instruction to introduce the new cryptosystem, a notification subunit operable to select one of the one or more cryptosystems, and notify an external apparatus of the selected cryptosystem, and a receiving subunit operable to receive, from the external apparatus, the encrypted new-circuit configuration information set generated in accordance with the notified cryptosystem, and the reading unit may read one of the existing-circuit configuration information sets that corresponds to the cryptosystem selected by the notification subunit.

The notification subunit may select one of the one or more cryptosystems that corresponds to one of the existing-circuit configuration information sets that has been last written into the storage unit.

With the stated structure, for introducing the new cryptosystem, the circuit configuration apparatus determines a cryptosystem to be used for transmitting and receiving the new-circuit configuration information set. In particular, the circuit configuration apparatus selects a cryptosystem that corresponds to the existing-circuit configuration information set that has been last written into the storage unit. The cryptosystem that corresponds to the existing-circuit configuration information set that has been last written into the storage unit has been most recently developed among the one or more cryptosystems, and it can be assumed that this is the most secure cryptosystem. Therefore, with the stated structure, it is possible to more securely acquire the new-circuit configuration information set.

The notification subunit may select one of the one or more cryptosystems that is with a highest cryptographic strength.

In this way, it is possible to more securely acquire the new-circuit configuration information set by selecting the cryptosystem with the highest cryptographic strength.

The notification subunit may select one of the one or more cryptosystems in accordance with an selection instruction received from outside.

For example, the selection instruction received from outside is recorded on a recording medium that is to be attached to the circuit configuration apparatus. The recording medium has recorded thereon a cryptosystem required for handling the information recorded thereon, and the instruction indicating a cryptosystem suitable for acquiring a new-circuit configuration information set corresponding to the required cryptosystem. The notification subunit selects a cryptosystem in accordance with the instruction recorded on the recording medium. As a result, it is possible to make a selection reflecting the selling agency of the recording medium.

The reception subunit may receive the instruction information that includes a cryptosystem-breaking notification indicating that any of the one or more cryptosystems has been broken.

With the stated structure, the reception subunit receives the instruction information including the cryptosystem-breaking notification indicating that any of the cryptosystems has been broken. In other words, if any of the cryptosystems is broken, the circuit configuration apparatus acquires the new-circuit configuration information set corresponding to the new cryptosystem. Therefore, even if any of the cryptosystems is broken, the circuit configuration apparatus of the present invention can use the new cryptosystem instead of the broken cryptosystem.

The notification subunit may select one of the one or more cryptosystems except for said any of the one or more cryptosystems that has been broken and is indicated by the cryptosystem-breaking notification.

With the stated structure, the notification subunit selects one of the cryptosystems except for the broken cryptosystem. Therefore, it is possible to securely acquire the new-circuit configuration information set in accordance with a non-broken cryptosystem.

The circuit configuration apparatus may further comprise a deletion unit operable to delete any of the existing-circuit configuration information sets that corresponds to said any of the one or more cryptosystems that has been broken and is indicated by the cryptosystem-breaking notification.

Note that in the embodiment described below, the function of the "deletion unit" is carried out by a control unit 116.

With the stated structure, it is possible to certainly prevent that the circuit configuration apparatus uses the broken cryptosystem to perform encryption, by the deletion unit deleting the existing-circuit configuration information set corresponding to the broken cryptosystem.

Each of the existing-circuit configuration information sets stored in the storage unit may include encryption circuit information and decryption circuit information, the encryption circuit information indicating a structure of an encryption circuit that executes encryption in accordance with corresponding one of the one or more cryptosystems, and the decryption circuit information indicating a structure of a decryption circuit that executes decryption in accordance with corresponding one of the one or more cryptosystems, and the circuit configuration apparatus may further comprise a deletion unit operable to delete, from the storage unit, the encryption circuit information included in any of the existing-circuit configuration information sets that corresponds to said any of the one or more cryptosystems that has been broken and is indicated by the cryptosystem-breaking notification.

Note that in the embodiment described below, the function of the "deletion unit" is carried out by a control unit 116.

With the stated structure, the deletion unit deletes the encryption circuit configuration information corresponding to the broken cryptosystem. Therefore, the circuit configuration apparatus does not encrypt any information using the broken cryptosystem. On the other hand, the circuit configuration apparatus leaves the decryption circuit information corresponding to the broken cryptosystem as it is. Therefore, the circuit configuration apparatus can decrypt encrypted texts generated in the past in accordance with the broken cryptosystem.

The introduction information set may include the encrypted new-circuit configuration information set and an identifier indicating a cryptosystem used for generating the encrypted new-circuit configuration information set, and the reading unit may read one of the existing-circuit configuration information sets that corresponds to the cryptosystem indicated by the identifier.

With the stated structure, since the introduction information set includes the encrypted new-circuit configuration information set and the identifier indicating the cryptosystem used for generating the encrypted new-circuit configuration information set, the reading unit can read the existing-circuit configuration information set immediately based on the identifier included in the introduction information set.

The new-circuit configuration information set may include structure information and key information, the structure information indicating a structure of an encryption circuit that executes cryptographic processing in accordance with the new cryptosystem, and the key information being to be used in the new cryptosystem, the acquisition unit may acquire the encrypted new-circuit configuration information set including encrypted structure information and encrypted key information, the encrypted structure information having been generated by encrypting the structure information, and the encrypted key information having been generated by encrypting the key information, the control unit may control the encryption circuit that has been configured based on the one of the existing-circuit configuration information sets, to decrypt the encrypted structure information and the encrypted key information to generate the structure information and the key information, and the writing unit may write the new-circuit configuration information set including the structure information and the key information into the storage unit.

The acquisition unit acquires the encrypted new-circuit configuration information set including encrypted structure information and the encrypted key information, and the encryption circuit decrypts the encrypted structure information and the encrypted key information, to generate the structure information and the key information. Therefore, since the circuit configuration apparatus acquires the structure information and the key information relating to the new cryptosystem at the same time, it is possible to use the new cryptosystem immediately after the acquisition of the configuration information.

The acquisition unit may further acquire signature information generated by applying a digital signature to the new-circuit configuration information set, the circuit configuration apparatus may further comprise a verification unit operable to verify legitimacy of the new-circuit configuration information set, using the signature information and the new-circuit configuration information set, and if the legitimacy has been successfully verified, the writing unit may judge that the new-circuit configuration information set has been legitimately generated, and writes the new-circuit configuration information set into the storage unit.

Note that in the embodiment described below, the function of the "verification unit" above is carried out by a legitimacy check unit 112 and an FPGA 122.

With the stated structure, the writing unit writes the new-circuit configuration information set into the storage unit only if the legitimacy has been successfully verified. Accordingly, it is possible to exclude a new-circuit configuration information set distributed by a malicious third party.

The storage unit may further store a verification-circuit configuration information set indicating a structure of the verification unit, and after the decryption is completed, the reading unit may further read the verification-circuit configuration information set, and output the read verification-circuit configuration information set to the configuration unit as the circuit configuration information set.

With the stated structure, the control unit outputs the verification-circuit configuration information set to the configuration unit after the new-circuit configuration information is generated. The configuration unit reconfigures the logic circuit in accordance with the verification-circuit configuration information set to configure the verification unit. In other words, the logic circuit is also used for the verification. This further miniaturizes the circuit size within the circuit configuration apparatus.

BRIEF DESCRIPTION OF THE DRAWINGS

FIG. 2 shows information recorded on a DVD 400*a* and a DVD 400*b*;

FIG. 4 shows details of a disabled-cryptosystem list 621 and a transmission-use key table 626, which are stored in an information storage unit 610;

FIG. 8 is a block diagram showing the structure of the content playback apparatus 100;

FIG. 12 shows specific examples of information stored in an encryption circuit storage unit 117 before and after a new cryptosystem is introduced;

FIG. 13 shows specific examples of information stored in a key circuit storage unit 119 before and after a new cryptosystem is introduced;

FIG. 18 shows details of a check information table 201 stored in a legitimacy check unit 112;

EXPLANATION OF REFERENCE NUMBERS

Figure 1:
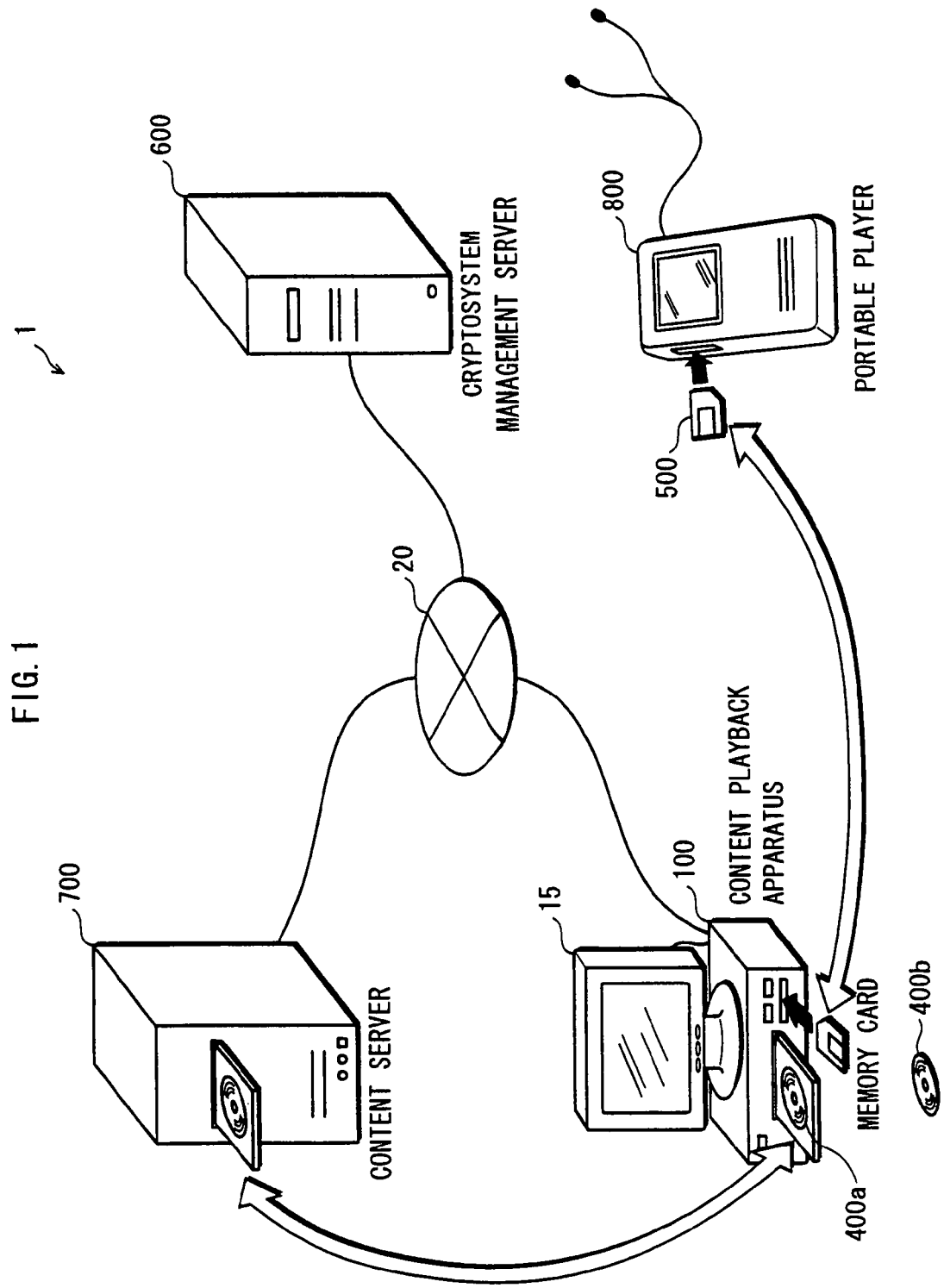
FIG. 1 is a structure diagram showing the structure of an information security system of the first embodiment.

1 Information security system
100 Content playback apparatus
400a DVD
400b DVD
500 Memory card
600 Cryptosystem management server
700 Content server
800 Portable player

DETAILED DESCRIPTION OF THE INVENTION

1. First Embodiment

The following describes an information security system 1 pertaining to the first embodiment of the present invention, with reference to the drawings.

1.1 Overview of the Information Security System 1

As FIG. 1 shows, the information security system 1 includes a content playback apparatus 100, a cryptosystem management server 600, a content server 700 and a portable player 800.

The content server 700, the cryptosystem management server 600, and the content playback apparatus 100 are connected to the Internet 20.

The content server 700 is an apparatus for providing content such as movies. The content server 700 provides an encrypted content that has been generated by encrypting a content and a signature showing that the encrypted content has been generated by a legitimate distributor, to the content playback apparatus 100 via the Internet 20 or a recording medium such as a DVD.

The content playback apparatus 100 acquires the encrypted content and the signature from the content server 700 via the Internet 20 or the DVD, verifies the acquired signature to confirm that the encrypted content has been distributed by a legitimate distributor, and decrypts and plays back the encrypted content. The content playback apparatus 100 can be attached with a memory card, and writes the encrypted content and an encrypted content key that has been generated by encrypting a content key used for generating the encrypted content into the memory card in accordance with an operation by a user.

Here, it is assumed that a cryptosystem identifier identifying a cryptosystem used for encrypting contents at a time the content playback apparatus 100 was manufactured is a cryptosystem identifier "IDA" and a cryptosystem identifier identifying a cryptosystem used for signature verification is a cryptosystem identifier "IDB". For example, in this Specification, the cryptosystem identified by the cryptosystem identifier "IDA" is the DES (Data Encryption Standard) cryptosystem, and the cryptosystem identified by the cryptosystem identifier "IDB" is the RSA (Rivest Shamir Adleman) cryptosystem.

The content playback apparatus 100 includes a reconfigurable circuit. For the signature verification, the content playback apparatus 100 configures, in the reconfigurable circuit, a decryption circuit that performs decryption in accordance with the RSA cryptosystem. For the content decryption, the content playback apparatus 100 configures a decryption circuit that performs decryption in accordance with the DES cryptosystem. For the generation of a content key, the content playback apparatus 100 configures an encryption circuit that performs encryption in accordance with the DES cryptosystem.

The cryptosystem management server 600 manages security of the cryptosystem used by the content playback apparatus 100 for the signature verification, the content decryption, and so on. The cryptosystem management server 600 stores information relating to an alternative cryptosystem to be used by the content playback apparatus 100 if the DES cryptosystem or the RSA cryptosystem is broken. If any one of the cryptosystems is broken, the cryptosystem management server 600 encrypts the information relating to a new cryptosystem as an alternative to the broken cryptosystem in accordance with the other one of the cryptosystems that is not broken, and transmits the encrypted information to the content playback apparatus 100.

The content server 700 and the cryptosystem management server 600 are managed by a single organization or organizations related to each other, and share information relating to change of the cryptosystem and information relating to a key of the new cryptosystem. If any one of the cryptosystems is broken, the content server 700 uses the new cryptosystem instead of the broken cryptosystem to perform the content encryption or the signature generation.

The content playback apparatus 100 securely acquires the information relating to the new cryptosystem in accordance with the other one of the cryptosystems that is not broken, and introduce the new cryptosystem.

1.2 DVD 400a and DVD 400b

A DVD 400a and a DVD 400b are portable optical disc mediums.

Both DVDs 400a and 400b are manufactured for distributing the same content "ConA". However, the DVD 400a was released when the content playback apparatus 100 was manufactured, and has recorded thereon the content encrypted in accordance with the DES cryptosystem. The DVD 400b has been released after the DES cryptosystem was broken, and has recorded thereon the content encrypted in accordance with a cryptosystem as an alternative to the DES cryptosystem. For example the AES (Advanced Encryption Standard) cryptosystem is used as the cryptosystem alternative to the DES cryptosystem.

FIG. 2 shows information recorded on the DVD 400a and the DVD 400b. As FIG. 2 shows, the DVD 400a has recorded thereon a content file 401, content key information 404, and a signature file 411.

The content file 401 includes a cryptosystem identifier 402 "IDA" and an encrypted content 403 "EncA (ConA, KconA)". In this Specification, an encrypted text generated by encrypting a plain text "γ" using an encryption key "β" in accordance with a cryptosystem indicated by a cryptosystem identifier "IDα" (α=A, B, C . . . ) is represented as Enc α (γ, β).

The cryptosystem identifier 402 indicates a cryptosystem that has been used for generating the encrypted content 403. Here, the cryptosystem identifier 402 indicates the DES cryptosystem.

The encrypted content 403 is an encrypted text generated by applying an encryption algorithm in accordance with the DES cryptosystem indicated by the cryptosystem identifier "IDA" to a content "ConA", using a content key "KconA". The content key "KconA" is a 56-bit encryption key.

The content key information 404 "CKinfA" includes a media key block and a media ID. The media key block is information used for giving a content decryption key for decrypting an encrypted content only to a legitimate playback apparatus that can access the DVD 400a. In the case of common-key cryptosystems represented by the DES cryptosystem, the content decryption key is the same as the content key. However, in the case of using a public-key cryptosystem such as the RSA cryptosystem for encrypting a content, the content decryption key is different from the content key.

The media ID is an identifier that is unique to the DVD 400a. A legitimate playback apparatus can generate the content key "KconA" from the media key block, using a device key that is unique to the playback apparatus and the media ID.

A technique for generating, from the media key block, the same key with use of any of different device keys is well known. Therefore, an explanation of this technique is omitted here.

The signature file 411 includes a server ID 412 "001A", a cryptosystem identifier 413 "IDB", and signature data 414. The server ID 412 is an identifier identifying an apparatus that has generated the signature data 414 "SignA". Specifically, "001A" indicates the content server 700 that is the distributor of the content "ConA". The cryptosystem identifier 413 indicates a cryptosystem that has been used for generating the signature data 414. Specifically, the cryptosystem identifier 413 here indicates the RSA cryptosystem. The signature data 414 is generated in the following manner: Firstly, 160-bit digest data is generated by substituting a combination of the content file 401 and the content key information 404 into a hash function; and secondly, an encryption algorithm in accordance with the RSA cryptosystem indicated by the cryptosystem identifier 413 is applied to the digest data, using a signature key "Ksig_Ba". The signature key "Ksig_Ba" is a 128-bit key corresponding to the RSA cryptography system indicated by the cryptosystem identifier 413, and is unique to the content server 700 corresponding to the server ID 412.

As the hash function, the SHA-1 is used for example. This signature generation method is just an example. Any other method may be used.

As FIG. 2B shows, the DVD 400b has recorded thereon a content file 421, content key information 424, and a signature file 431.

The content file 421 includes a cryptosystem identifier 422 "IDC" and an encrypted content 423 "EncC (ConA, KconC)". The cryptosystem identifier 422 indicates the AES cryptosystem that has been used for generating the encrypted content 423. The encrypted content 423 has been generated by applying an encryption algorithm in accordance with the AES cryptosystem to a content "ConA", using a content key "KconC". The content key "KconC" is a 128-bit encryption key.

The content key information 424 includes a media key block and a media ID, and is data used for giving a content key "KconC" to a legitimate playback apparatus.

The signature file 431 includes a server ID 432, a cryptosystem identifier 433, and signature data 434. The server ID 432 is an identifier indicating the content server 700 that is the distributor of the content "ConA". The cryptosystem identifier 433 indicates a cryptosystem that has been used for generating the signature data 434. The signature data 434 "SignA'" is generated in the following manner: Firstly, digest data is generated by substituting a combination of the content file 421 and the content key information 424 into a hash function; and secondly, an encryption algorithm in accordance with the RSA cryptosystem is applied to the digest data, using a signature key "Ksig_Ba" of the content server 700 indicated by the server ID 432.

1.3 Cryptosystem Management Server 600

If the DES cryptosystem has been broken, the cryptosystem management server 600 instructs the content playback apparatus 100 to introduce the AES cryptosystem as an alternative to the DES cryptosystem, and transmits information relating to the introduction of the AES cryptosystem to the content playback apparatus 100 after encrypting the information using the RSA cryptosystem that is not broken. At the same time, the cryptosystem management server 600 generates, using the RSA cryptosystem, signature data that shows that the information is transmitted by the legitimate cryptosystem management server 600, and transmits the signature data to the content playback apparatus 100.

On the other hand, if the RSA cryptosystem has been broken, the cryptosystem management server 600 instructs the content playback apparatus 100 to introduce the elliptic curve cryptosystem as an alternative to the RSA cryptosystem, and transmits information relating to the introduction of the elliptic curve cryptosystem to the content playback apparatus 100 after encrypting the information using the DES cryptosystem that is not broken. At the same time, the cryptosystem management server 600 generates, using the DES cryptosystem, signature data that shows that the information is transmitted by the legitimate cryptosystem management server 600, and transmits the signature data to the content playback apparatus 100.

Figure 3:
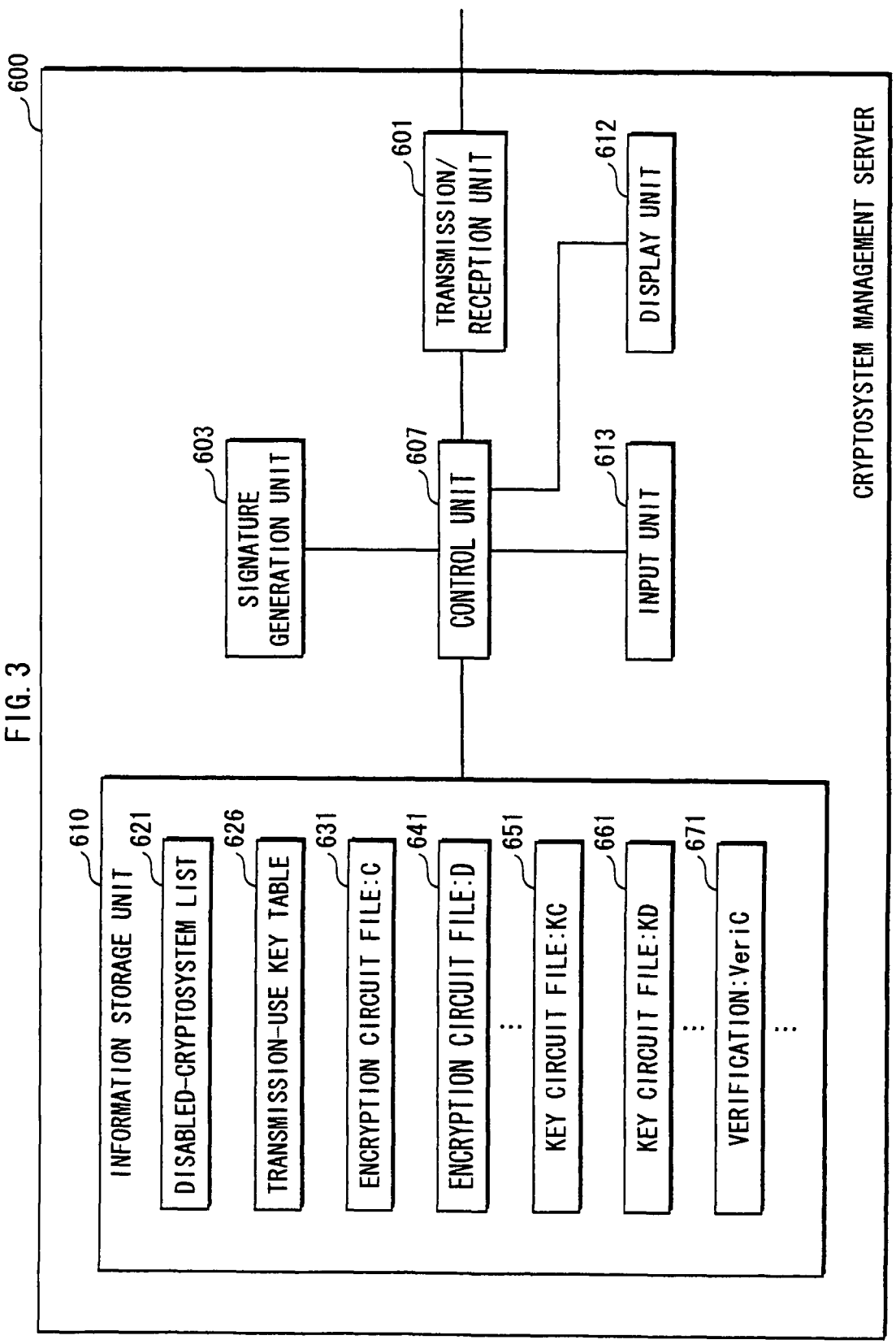
FIG. 3 is a block diagram showing a functional structure of a cryptosystem management server 600.

As FIG. 3 shows, the cryptosystem management server 600 includes a transmission/reception unit 601, a signature generation unit 603, a control unit 607, an information storage unit 610, an input unit 613; and a display unit 612.

The cryptosystem management server 600 is, specifically, a computer system structured so as to include a microprocessor, a RAM and a ROM. The RAM or the ROM stores therein a computer program. The cryptosystem management server 600 achieves part of functions thereof as a result of the microprocessor operating in accordance with the computer program.

The following explain each component of the cryptosystem management server 600.

(1) Information Storage Unit 610

The information storage unit 610 is structured so as to include a hard disk, and stores, for example, a disabled-cryptosystem list 621, a transmission-use key table 626, encryption circuit files 631, 641 . . . , key circuit files 651, 661 . . . , and verification key files 671 . . . .

(1-a) Disabled-Cryptosystem List 621

As FIG. 4A shows, the disabled-cryptosystem list 621 includes a plurality of cryptosystem information sets 622, 623 . . . . Each cryptosystem information set corresponds, to a broken cryptosystem, and includes a cryptosystem identifier, an encryption circuit file name, a key circuit file name, and a verification key file name.

The cryptosystem identifier is an identifier indicating a broken cryptosystem. The encryption circuit file name is a name of a file including a program for introducing a new cryptosystem alternative to the broken cryptosystem. The key circuit file name is a name of a file including a program for generating a device key appropriate to the new cryptosystem alternative to the broken cryptosystem. The verification key file name is a name of a file including a verification key for verifying a signature data that is to be generated using the new cryptosystem. The encryption circuit file, the key circuit file and the verification key file are described later.

For example, the cryptosystem information set 622 includes a cryptosystem identifier "IDA", an encryption circuit file name "C", a key circuit file name "KC" and a verification key file name "VeriC." The cryptosystem identifier "IDA" indicates the DES cryptosystem. The encryption circuit file name "C" is a name of the encryption circuit file 631. The key circuit file name "KC" is a name of the key circuit file 651. The verification key file name "VeriC" is a name of the verification key file 671.

(1-b) Transmission-Use Key Table 626

As FIG. 4B shows, the transmission-use key table 626 includes a plurality of transmission-use key information sets 627, 628 and 629. Each transmission-use key information set includes a cryptosystem identifier, an encryption key, a decryption key, and decryption key information. Each transmission-use key information set corresponds to any one of the cryptosystems.

The cryptosystem identifier indicates a corresponding cryptosystem. The encryption key is a key having a bit length that is appropriate to an encryption computation in accordance with the cryptosystem indicated by the cryptosystem identifier. The decryption key is a key for decrypting an encrypted text that has been generated in accordance with the cryptosystem indicated by the cryptosystem identifier using the encryption key. In the case where the cryptosystem indicated by the cryptosystem identifier belongs to the common-key cryptosystems, the encryption key is the same as the decryption key. The decryption key information includes the media key block, and is used for giving the decryption key only to a legitimate content playback apparatus.

(1-c) Encryption Circuit File 631

The encryption circuit files 631, 641 . . . correspond to the key circuit files 651, 661 . . . respectively. Also, the encryption circuit files 631, 641 . . . correspond to the verification key files 671 . . . respectively.

Figure 5A:
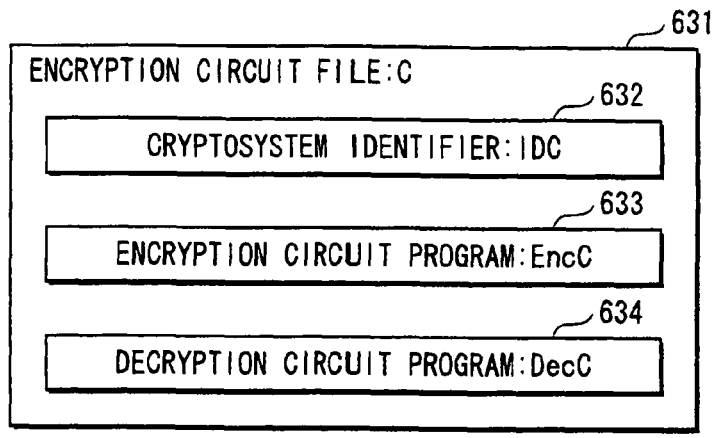
FIG. 5 shows the structures of an encryption circuit file 631, a key circuit file 651 and a verification key file 671, which are stored in the information storage unit 610.

FIG. 5A shows the details of the encryption circuit file 631. The structures of the other encryption circuit files are the same as the structure of the encryption circuit file 631. Therefore, explanations thereof are omitted here.

The encryption circuit file 631 "C" includes a cryptosystem identifier 632 "IDC", an encryption circuit program 633 "EncC" and a decryption circuit program 634, and corresponds to a key circuit file 651 and a verification key file 671.

The cryptosystem identifier 632 "IDC" is a cryptosystem identifier that indicates a cryptosystem other than the DES cryptosystem and the RSA crypto system. Here, the cryptosystem identifier 632 "IDC" indicates the AES cryptosystem.

The encryption circuit program 633 and the decryption circuit program 634 each include a plurality of machine language instructions generated by compiling a hardware description language. The machine language instructions are executed by a configuration mechanism 123 (described later) included in the changeable circuit 108 included in the content playback apparatus 10. As the hardware description language, the VHDL (VHSIC Hardware Description Language) is used, for example.

The encryption circuit program 633 "EncC" is structured so as to configure, within the changeable circuit 108 included in the content playback apparatus 100, the encryption circuit that performs encryption in accordance with the AES cryptosystem indicated by the cryptosystem identifier 632.

The decryption circuit program 634 is structured so as to configure, within the changeable circuit 108 included in the content playback apparatus 100, the decryption circuit that performs decryption in accordance with the AES cryptosystem indicated by the cryptosystem identifier 632.

(1-d) Key Circuit File 651

Figure 5B:
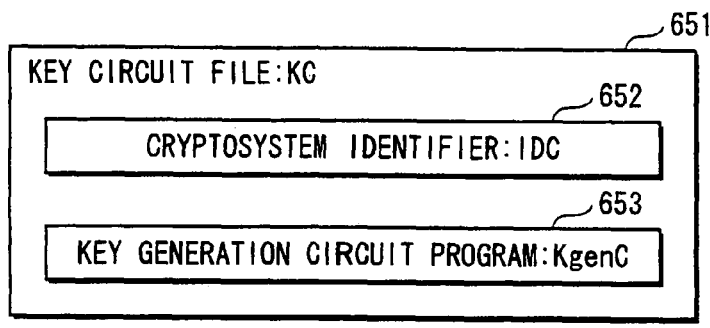

As FIG. 5B shows, the key circuit file 651 "KC" includes a cryptosystem identifier 652 "IDC" and a key generation circuit program 653 "KgenC".

The cryptosystem identifier 652 is the same as the cryptosystem identifier 632 included in the encryption circuit file 631 corresponding to the key circuit file 651.

A key generation circuit program 635 includes a plurality of machine language instructions generated by compiling a hardware description language. The machine language instructions are executed by a configuration mechanism 123 (described later) included in the changeable circuit 108 included in the content playback apparatus.

The key generation circuit program 635 "KgenC" is structured so as to configure, within the changeable circuit 108 included in the content playback apparatus 100, the key generation circuit that generate a device key whose key length is appropriate to the cryptosystem indicated by the cryptosystem identifier 632.

(1-e) Verification Key File 671

Figure 5C:
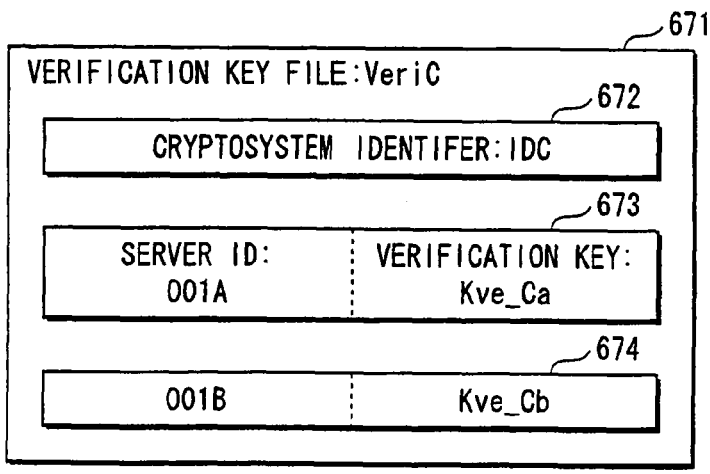

As FIG. 5C shows, the verification key file 671 "VeriC" includes a cryptosystem identifier 672 "IDC", a verification key information sets 673 and 674.

The cryptosystem identifier 672 "IDC" indicates the AES cryptosystem as the cryptosystem identifiers included in the encryption circuit file 631 and the key circuit file 651 indicate.

The verification key information set 673 includes a server ID "001A" and a verification key "Kve_Ca". The server ID "001A" is an identifier indicating the content server 700. The verification key "Kve_Ca" is a 128-bit key appropriate to the AES cryptosystem, and corresponds to a signature key "Ksig_Ca" that is unique to the content server 700. Note that since the AES cryptosystem is a common-key cryptosystem, the signature key "Ksig_Ca" and the verification key "Kve_Ca" are the same.

The verification key information set 674 includes a server ID "001B" and a verification key "Kve_Cb". The server ID "001B" is an identifier indicating the cryptosystem management server 600. The verification key "Kve_Cb" is a 128-bit key appropriate to the AES cryptosystem, and corresponds to a signature key "Ksig_Cb" that is unique to the cryptosystem management server 600.

(2) Transmission/Reception Unit 601

The transmission/reception unit 601 performs transmission and reception of various types of information between an external device connected via the Internet 20 and the control unit 607.

(3) Signature Generation Unit 603

Figures 6, 7:
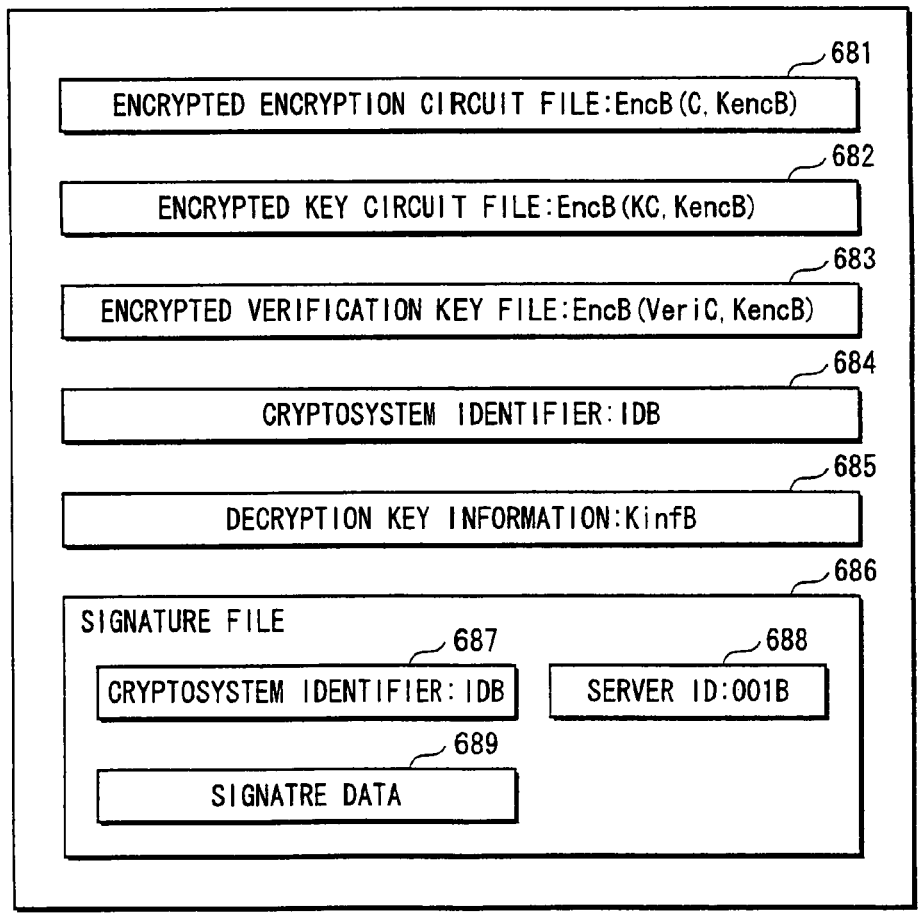
FIG. 6 shows details of a signature key table 691 stored in a signature generation unit 603.
FIG. 7 shows an example of information sets that the cryptosystem management server 600 transmits to a content playback apparatus 100, for introducing a new cryptosystem.

The signature generation unit 603 stores a signature key table 691 shown in FIG. 6. The signature key table 691 includes a plurality of signature key information sets 692, 693, 694 . . . .

Each signature key information set corresponds to any one of the cryptosystems, and includes a cryptosystem identifier, a signature key and a verification key. The cryptosystem identifier indicates a corresponding cryptosystem. The signature key is a key whose key length is appropriate to the cryptosystem indicated by the cryptosystem identifier. The verification key is a key whose key length is appropriate to the cryptosystem indicated by the cryptosystem identifier, and corresponds to the signature key. The signature key and the verification key are both unique to the cryptosystem management server 600. Note that if the cryptosystem indicated by the cryptosystem identifier is a common-key cryptosystem, the signature key and the verification key are the same.

For example, the signature key information set 693 includes a cryptosystem identifier "IDB", a signature key "Ksig_Bb", and a verification key "Kve_Bb". The cryptosystem identifier "IDB" indicates the RSA cryptosystem. The signature key "Ksig_Bb" is a 128-bit key. The verification key "Kve_Bb" is a 128-bit key, and used for decrypting an encrypted text that has been generated using the signature key.

The signature generation unit 603 receives an encryption circuit file, a key circuit file, a verification key file, decryption key information, and a cryptosystem identifier from the control unit 607, and is instructed to perform signature generation.

As instructed to perform signature generation, the signature generation unit 603 generates digest data by substituting a combination of the received encryption circuit file, key circuit file, verification key file, and decryption key information into a hash function.

Next, the signature generation unit 603 selects, within the signature key table 691, a signature key information set that includes the received cryptosystem identifier, and reads the signature key included in the selected signature key information set. Using the read signature key, the signature generation unit 603 applies an encryption algorithm in accordance with the cryptosystem indicated by the received cryptosystem identifier to the generated digest data, to generate encrypted digest data. The signature generation unit 603 outputs the generated encrypted digest data as signature data to the control unit 607.

(4) Control Unit 607

If any of the cryptosystems stored in the content playback apparatus 100 is broken, the control unit 607 receives, via the input unit 613, a cryptosystem identifier indicating the broken cryptosystem and a distribution instruction for distributing information relating to a new cryptosystem alternative to the broken cryptosystem. Upon receiving the cryptosystem identifier indicating the broken cryptosystem and the distribution instruction for distributing the information relating to the new cryptosystem alternative to the broken cryptosystem, the control unit 607 temporarily stores the received cryptosystem identifier. Next, the control unit 607 transmits, via the transmission/reception unit 601, a warning notification notifying that the cryptosystem indicated by the received cryptosystem identifier has been broken to the content playback apparatus.

Next, the control unit 607 receives, from the content playback apparatus 100, an introduction request indicating a request for introducing a cryptosystem. Also, the control unit 607 receives, from an operator, a cryptosystem identifier indicating a cryptosystem used for encrypting an encryption circuit file and so on, and a cryptosystem identifier indicating a cryptosystem used for signature generation.

Upon receiving the cryptosystem identifier for encryption and the cryptosystem identifier for signature generation, the control unit 607 reads the cryptosystem information set including the temporarily stored cryptosystem identifier from the disabled-cryptosystem list 621, and reads an encryption circuit file and a key circuit file and a verification key file corresponding to file names included in the read cryptosystem information set.

The control unit 607 outputs the read encryption circuit file, key circuit file, verification key file, decryption key information and the input cryptosystem identifier for signature generation to the signature generation unit 603 to instruct the signature generation unit 603 to generate signature data. Upon receiving signature data from the signature generation unit 603, the control unit 607 generates a signature file including the received signature data, the server identifier "0001b" indicating the cryptosystem management server 600 itself, and the received cryptosystem identifier for signature generation.

Next, the control unit 607 reads, from the transmission-use key table 626, an encryption key and a decryption key corresponding to the received cryptosystem identifier for encryption. Using the read encryption key, the control unit 607 applies an encryption algorithm according to the cryptosystem indicated by the received cryptosystem identifier for encryption to the read encryption circuit file, the key circuit file and the verification key file, to generate an encrypted encryption circuit file, encrypted key circuit file and encrypted verification key file.

Next, the control unit 607 transmits, via the transmission/reception unit 601, the encrypted encryption circuit file, the encrypted key circuit file, the encrypted verification key file, the decryption key information, the signature file, and the cryptosystem identifier indicating the cryptosystem used for generating the encrypted encryption circuit file and so on, to the content playback apparatus 100.

FIG. 7 shows an example of pieces of information that the control unit 607 transmits here. This is an example of pieces of information to be transmitted in the case where the DES cryptosystem is broken. In this case, the operator of the cryptosystem management server 600 inputs a cryptosystem identifier "IDA" and an instruction for introduction of a cryptosystem, and then, inputs a cryptosystem identifier "IDB" indicating a cryptosystem for encryption, and a cryptosystem identifier "IDB" indicating a cryptosystem for signature generation.

As FIG. 7 shows, in this case, the control unit 607 transmits an encrypted encryption circuit file 681 "EncB(C, KencB)", an encrypted key circuit file 682 "EncB(KC, KencB)", an encrypted verification key file 683 "EncB(VeriC, KencB)", a cryptosystem identifier 684 "IDB", decryption key information 685 "KinfB", and a signature file 686.

The encrypted encryption circuit file 681 "EncB(C, KencB)", the encrypted key circuit file 682 "EncB (KC, KencB)" and the encrypted verification key file 683 "EncB (VeriC, KencB)" have been generated by applying an encryption algorithm according to the RSA cryptosystem to the encryption circuit file 631 "C", the key circuit file 651 "KC" and the verification key file 671 "VeriC" respectively, using an encryption key "KencB".

The cryptosystem identifier 684 is a cryptosystem identifier "IDB" for encryption input by the operator, which indicates the RSA cryptosystem used for generating the encrypted encryption circuit file 681 and so on. The decryption key information 685 "KinfB" has been read from the transmission-use key information set 628 corresponding to the RSA cryptosystem used for the encrypted encryption circuit file 681.

The signature file 686 includes the cryptosystem identifier 687 "IDB", the server ID 688 "001B" and the signature data 689. The cryptosystem identifier 687 "IDB" is a cryptosystem identifier "IDB" input by the operator, and indicates the RSA cryptosystem used for generating the signature data 689.

The signature data 689 has been generated by applying, using the signature key "Ksig_Bb" unique to the cryptosystem management server 600, an encryption algorithm in accordance with the RSA cryptosystem to digest data generated by substituting a combination of the encryption circuit file 631 "C", the key circuit file 651 "KC", the verification key file 671 "VeriC" and the decryption key information "KinfB" into a hash function.

Here, since it is assumed that the content playback apparatus 100 stores two cryptosystems and that one of the two is broken, the same cryptosystem is used for the encryption of the files and the generation of the signature. However, if the content playback apparatus stores many cryptosystems, different cryptosystems may be used for the encryption and the signature generation.

(5) Input Unit 613 and Display Unit 612

The input unit includes various types of keys, and receives various instructions and inputs of information from the operator, and outputs the received information and instructions to the control unit 607.

The display unit 612 includes an indicator lamp and a display, and displays various types of screens and turns on and off the lamp under control of the control unit 607.

1.4 Content Playback Apparatus 100

The content playback apparatus 100 is a circuit configuration apparatus that configures an execution circuit by reconfiguring a reconfigurable circuit in accordance with a plurality of circuit configuration information sets stored therein.

The content playback apparatus 100 stores the DES cryptosystem and the RSA cryptosystem when it is manufactured, and acquires a content encrypted by the DES cryptosystem and signature data generated by using the RSA cryptosystem, and verifies the acquired signature data. If the verification succeeds, the content playback apparatus 100 decrypts and plays back the acquired content. Also, the content playback apparatus 100 writes the content encrypted by the DES cryptosystem into the memory card 500.

If the DES cryptosystem is broken, the content playback apparatus 100 introduces the AES cryptosystem as an alternative to the DES cryptosystem. If the content playback apparatus 100 acquires a content encrypted by the DES cryptosystem after introducing the AES cryptosystem, the content playback apparatus 100 can decrypt and play back the encrypted content, but can not output the content into the memory card 500.

On the other hand, if the RSA cryptosystem is broken, the content playback apparatus 100 introduces the elliptic curve cryptosystem as an alternative to the RSA cryptosystem. If the content playback apparatus 100 acquires a content encrypted by the RSA cryptosystem after introducing the elliptic curve cryptosystem, the content playback apparatus 100 can decrypt and playback the encrypted content, but can not output the content into the memory card 500.

Figure 8:
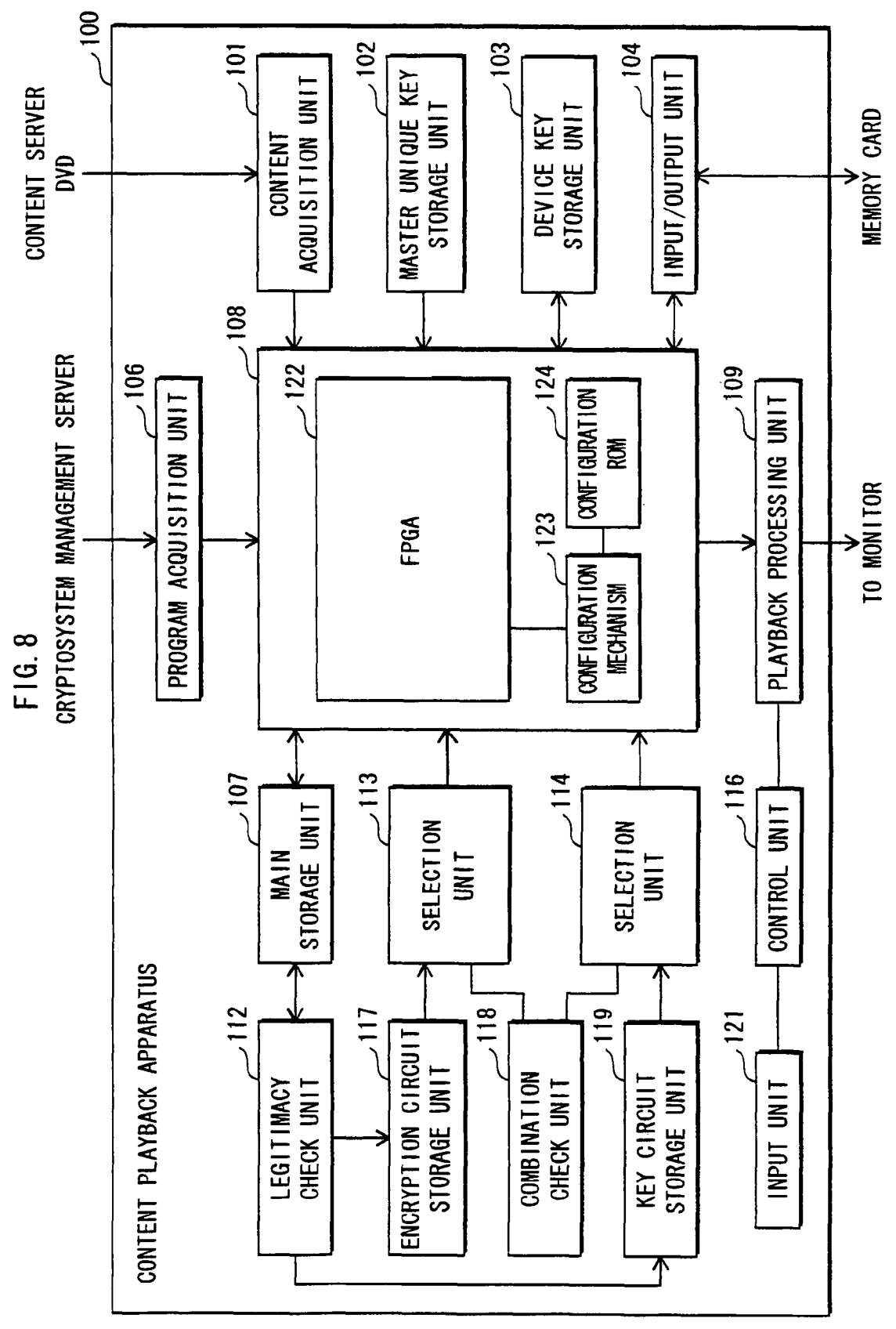

FIG. 8 is a functional block diagram showing the structure of the content playback apparatus 100. As FIG. 8 shows, the content playback apparatus 100 includes a content acquisition unit 101, a master unique key storage unit 102, a device key storage unit 103, an input/output unit 104, a program acquisition unit 106, a main storage unit 107, a changeable circuit 108, a playback processing unit 109, a legitimacy check unit 112, a selection unit 113, a selection unit 114, a control unit 116, an encryption circuit storage unit 117, a combination check unit 118, a key circuit storage unit 119 and an input unit 121.

The content playback apparatus 100 is, specifically, a computer system including a microprocessor, a RAM and a ROM. The RAM or the ROM stores therein a computer program. The content playback apparatus 100 achieves part of functions thereof as a result of the microprocessor operating in accordance with the computer program.

The following explain each component of the content playback apparatus 100.

(1) Master Unique Key Storage Unit 102

The master unique key storage unit 102 is structured with a ROM. The master unique key storage unit 102 is tamper-resistant, and does not accept an access from external devices.

Figure 9A:
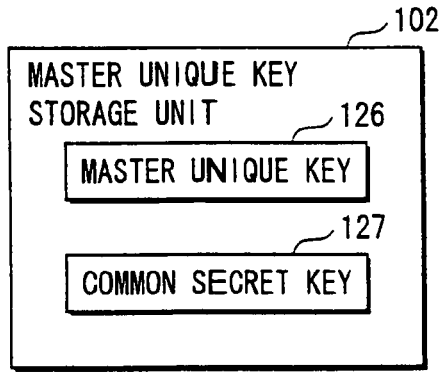
FIG. 9 shows information stored in a master unique key storage unit 102 and a device key storage unit 103.

As FIG. 9 shows, the master unique key storage unit 102 stores a master unique key 126 and a common secret key 127. The master unique key 126 and the common secret key 127 are recorded in the master unique key storage unit 102 when the content playback apparatus 100 is manufactured.

The master unique key 126 is 1024-bit length data, and unique to the content playback apparatus 100. The common secret key 127 is 1024-bit data, and common to legitimate playback apparatuses that can playback contents distributed by the content server 700.

(2) Device Key Storage Unit 103

Figure 9B:
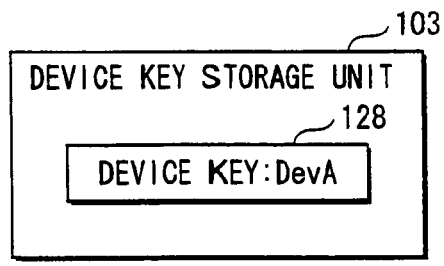

The device key storage unit 103 is structured with a writable and erasable imaging element such as a flash memory, and stores, for example, a device key 128 "DevA" as FIG. 9B shows.

The device key 128 "DevA" is key data unique to the content playback apparatus 100. The device key 128 is 56-bit key data corresponding to the DES cryptosystem, and has been generated by a key generation circuit configured within the changeable circuit 108 in accordance with a key generation circuit program 143.

(3) Main Storage Unit 107

The main storage unit 107 is accessed by the control unit 116, the legitimacy check unit 112, and the changeable circuit 108.

Figure 10:
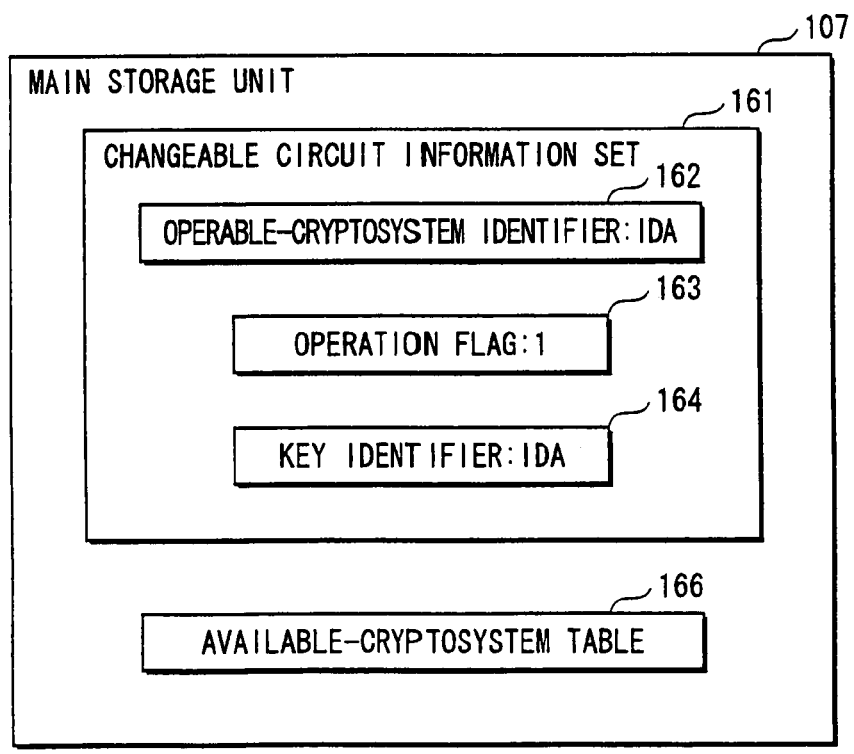
FIG. 10 show an example of information stored in a main storage unit 107.

FIG. 10 shows an example of information stored in the main storage unit 107. As FIG. 10 shows, the main storage unit 107 stores changeable circuit information set 161 and an available-cryptosystem table 166.

The changeable circuit information set 161 is information showing a current status of the changeable circuit 108, and includes an operable-cryptosystem identifier 162, an operation flag 163 and a key identifier 164.

The operable-cryptosystem identifier 162 is a cryptosystem identifier indicating a cryptosystem corresponding to a circuit currently configured within the changeable circuit 108. The operation flag 163 is a flag indicating whether the circuit configured within the changeable circuit 108 is an encryption circuit, a decryption circuit or a key generation circuit, and "0" indicates an encryption circuit, "1" indicates a decryption circuit and "2" indicates a key generation circuit. The key identifier 164 indicates a cryptosystem corresponding to the device key currently stored in the device key storage unit 103.

In FIG. 10 for example, the changeable circuit information set 161 includes an operable-cryptosystem identifier 162 "IDA", an operation flag 163 "1" and a key identifier 164 "IDA". This indicates that an encryption circuit that performs encryption processing according to the DES cryptosystem indicated by the cryptosystem identifier "IDA" is configured in the changeable circuit 108, and the device key storage unit 103 stores a 56-bit device key "DevA" appropriate to the DES cryptosystem. Although not explained specifically below, every time the control unit 116 and the legitimacy check unit 112 instruct the selection unit 113 and the selection unit 114 to output programs to the changeable circuit 108, the control unit 116 and the legitimacy check unit 112 rewrite the operable-cryptosystem identifier 162 and the operation flag 163 such that the operable-cryptosystem identifier 162 and the operation flag 163 indicate a current status of the changeable circuit 108. Also, every time the control unit 116 instructs the key generation circuit configured within the changeable circuit 108 to generate a device key, the control unit 116 rewrite the key identifier 164 such that the key identifier 164 corresponds to the device key generated by the key generation circuit.

Figures 11A, 11B:
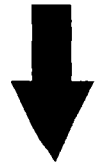
FIG. 11 shows the structure of an available-cryptosystem table 166, and the structure of an available-cryptosystem table 166*b* after a new cryptosystem is introduced.

The available-cryptosystem table 166 is a table showing cryptosystems stored in the content playback apparatus 100. FIG. 11A shows the details of the available-cryptosystem table 166. As FIG. 11A shows, the available-cryptosystem table 166 includes a plurality of availability information sets 171 and 172. Each availability information set includes a cryptosystem identifier and a usage flag.

The cryptosystem identifier indicates a cryptosystem stored in the content playback apparatus 100. The usage flag indicates whether encryption and decryption in accordance with the cryptosystem indicated by the cryptosystem identifier can be performed or not. A usage flag "1" indicates that the encryption and the decryption can be performed. A usage flag "0" indicates that the decryption can be performed but the encryption can not be performed.

FIG. 11A is the available-cryptosystem table 166 at the time when the content playback apparatus 100 was manufactured.

The availability information set 171 includes a cryptosystem identifier "IDA" and a usage flag "1". This shows that the content playback apparatus 100 can perform encryption and decryption in accordance with the DES cryptosystem indicated by the cryptosystem identifier "IDA".

The availability information set 172 includes a cryptosystem identifier "IDB" and a usage flag "1". This shows that the content playback apparatus 100 can perform encryption and decryption in accordance with the RSA cryptosystem indicated by the cryptosystem identifier "IDB".

FIG. 11B is an available-cryptosystem table 166b after the DES cryptosystem has been broken and the AES cryptosystem as an alternative to the DES cryptosystem has been introduced. The available-cryptosystem table 166b includes an availability information set 171b instead of the availability information set 171 of the available-cryptosystem table 166, and further includes an availability information set 173 corresponding to the newly introduced AES cryptosystem.

The availability information set 171b includes a cryptosystem identifier "IDA" and a usage flag "0". This shows that the content playback apparatus 100 can perform decryption in accordance with the DES cryptosystem indicated by the cryptosystem identifier "IDA", but can not perform encryption.

The availability information set 173 includes a cryptosystem identifier "IDC" and a usage flag "1". This shows that the content playback apparatus 100 can perform encryption and decryption in accordance with the AES cryptosystem indicated by the cryptosystem identifier "IDC".

The main storage unit 107 temporarily stores various types of information while the control unit 116, the legitimacy check unit 112 and the changeable circuit 108 performs various types of processing.

(4) Encryption Circuit Storage Unit 117

The encryption circuit storage unit 117 is structured with a writable and erasable non-volatile memory, such as a flash memory. FIG. 12 shows an example of information stored in the encryption circuit storage unit 117. FIG. 12A shows the encryption circuit storage unit 117 at the time when the content playback apparatus 100 was manufactured, and FIG. 12B shows the encryption circuit storage unit 117 after the DES cryptosystem has been broken and the AES cryptosystem as an alternative to the DES cryptosystem has been introduced. In FIG. 12A and FIG. 12B, the same information is referred to by the same reference number.

As FIG. 12A shows, the encryption circuit storage unit 117 stores an encryption circuit file 131 "A" and an encryption circuit file 136 "B". The encryption circuit files correspond to the DES cryptosystem and the RSA cryptosystem respectively. The encryption circuit files also correspond to key circuit files stored in the key circuit storage unit 119 respectively.

In the same manner as the encryption circuit file 631 "C" explained with reference to FIG. 5, each encryption circuit file includes a cryptosystem identifier indicating a corresponding cryptosystem, an encryption circuit program indicating an encryption circuit structure for performing encryption according to the corresponding cryptosystem, and a decryption circuit program indicating a decryption circuit structure for performing decryption according to the corresponding cryptosystem.

Specifically, the encryption circuit file 131 "A" includes a cryptosystem identifier 132 "IDA" indicating the DES cryptosystem, an encryption circuit program 133 "EncA" showing the structure of an encryption circuit in accordance with the DES cryptosystem, and a decryption circuit program 134 "DecA" showing the structure of a decryption circuit in accordance with the DES cryptosystem.

The encryption circuit file 136 "B" includes a cryptosystem identifier 137 "IDB" indicating the RSA cryptosystem, an encryption circuit program 138 "EncB" showing the structure of an encryption circuit in accordance with the RSA cryptosystem, and a decryption circuit program 139 "DecB" showing the structure of a decryption circuit in accordance with the RSA cryptosystem.

As FIG. 12B shows, the encryption circuit storage unit 117 after the AES cryptosystem has been introduced stores encryption circuit files 131b, 136 and 181.

The encryption circuit file 131b "A" has the structure of the encryption circuit file 131 "A" from which the encryption circuit program 133 "EncA" is deleted.

The encryption circuit file 181 "C" corresponds the AES cryptosystem, and is the same as the encryption circuit file 631 "C" stored in the cryptosystem management server 600.

(5) Key Circuit Storage Unit 119

The key circuit storage unit 119 is structured with a writable and erasable non-volatile memory such as a flash memory. FIG. 13 shows an example of information stored in the key circuit storage unit 119. FIG. 13A shows the key circuit storage unit 119 at the time when the content playback apparatus 100 was manufactured, and FIG. 13B shows the key circuit storage unit 119 after the DES cryptosystem has been broken and the AES cryptosystem as an alternative to the DES cryptosystem has been introduced. In FIG. 13A and FIG. 13B, the same information is referred to by the same reference number.

As FIG. 13A shows, the key circuit storage unit 119 stores a key circuit file 141 "KA" and a key circuit file 146 "KB". The key circuit files correspond to the DES cryptosystem and the RSA cryptosystem respectively. Each key circuit file includes a cryptosystem identifier indicating a corresponding cryptosystem, and a key generation circuit program indicating a key generation circuit structure for generating a device key appropriate to the corresponding cryptosystem.

Specifically, the key circuit file 141 "KA" includes a cryptosystem identifier 142 "IDA" indicating the DES cryptosystem, and a key generation circuit program 143 "KgenA" showing the structure of a key generation circuit for generating a 56-bit device key appropriate to the DES cryptosystem.

The key circuit file 146 "KB" includes a cryptosystem identifier 147 "IDB" indicating the RSA cryptosystem, and a key generation circuit program 148 "KgenB" showing the structure of a key generation circuit for generating a 128-bit device key appropriate to the RSA cryptosystem.

As FIG. 13B shows, the key circuit storage unit 119 after the AES cryptosystem has been introduced stores key circuit files 141, 146 and 186. The key circuit file 186 "KC" corresponds to the AES cryptosystem, and is the same as the key circuit file 651 stored in the cryptosystem management server 600.

(6) Selection Units 113 and 114

The selection unit 113 reads and temporarily stores a cryptosystem identifier and an encryption circuit program, or a cryptosystem identifier and a decryption circuit program from the encryption circuit files stored in the encryption circuit storage unit 117, in accordance with an instruction from the control unit 116 or the legitimacy check unit 112.

Next, the selection unit 113 is instructed by the control unit 116 or the legitimacy check unit 112 to output the read program. Upon being instructed, the selection unit 113 outputs the read encryption circuit program or decryption circuit program to the configuration mechanism 123 and a configuration ROM 124 (described later), which are included within the changeable circuit 108.

The selection unit 114 reads and temporarily stores a cryptosystem identifier and a key generation circuit program from the encryption circuit files stored in the key circuit storage unit 119, in accordance with an instruction from the control unit 116.

Next, the selection unit 114 is instructed by the control unit 116 to output the read program. Upon being instructed, the selection unit 114 outputs the read key generation circuit program to the configuration mechanism 123 and the configuration ROM 124 which are included within the changeable circuit 108.

(7) Combination Check Unit 118

The combination check unit 118 receives, from the control unit 116, a correspondence confirmation instruction for confirming that the encryption circuit program or the decryption circuit program read by the selection circuit 113 and the key generation circuit program read by the selection unit 114 correspond to each other. Upon receiving the correspondence confirmation instruction, the combination check unit 118 compares the cryptosystem identifier stored in the selection unit 113 and the cryptosystem identifier stored in the selection unit 114. If they are the same, the combination check unit 118 outputs, to the control unit 116, an OK signal indicating that the program read by the selection unit 113 and the program read by the selection unit 114 correspond to each other.

If they are not the same, the combination check unit 118 outputs, to the control unit 116, an NG signal indicating that the program read by the selection unit 113 and the program read by the selection unit 114 do not correspond to each other.

(8) Changeable Circuit 108

The changeable circuit 108 is tamper-resistant hardware, and if an external device attempts to read data and so on stored in the changeable circuit 108, the data and so on will disappear. Note that any method may be used for realizing the tamper-resistance, and the method is not limited to the above-mentioned method.

The changeable circuit 108 includes an FPGA 122, a configuration ROM 124 and a configuration mechanism 123. The configuration ROM 124 is structured with an EEPROM, and stores any one of the programs stored in the encryption circuit storage unit 117 and the key circuit storage unit 119.

The FPGA 122 is structured with a plurality of CLBs (Configuration Logic Blocks) and connection resources connecting the CLBs.

The configuration mechanism 123 configures the FPGA 122 in accordance with a program stored in the configuration ROM 124 when the content playback apparatus 100 is turned on. Also, the configuration mechanism 123 configures, in the FPGA 122, the key generation circuit, the encryption circuit and the decryption circuit in accordance with the key circuit generation program, the encryption circuit program and the decryption circuit program output by the selection units 113 and 114'. Specifically, the configuration mechanism 123 generates logical function circuits in the plurality of CLBs, and configures the aforementioned key generation circuit, encryption circuit and decryption circuit by connecting the logical function circuits by the connection resources existing between each two of the CLBs.

The configured key generation circuit, encryption circuit and decryption circuit performs encryption, decryption and key generation in accordance with instructions from the control unit 116 and the legitimacy check unit 112. The following explain the encryption, the decryption and the key generation performed by the changeable circuit 108.

(8-a) Key Generation

Figure 14:
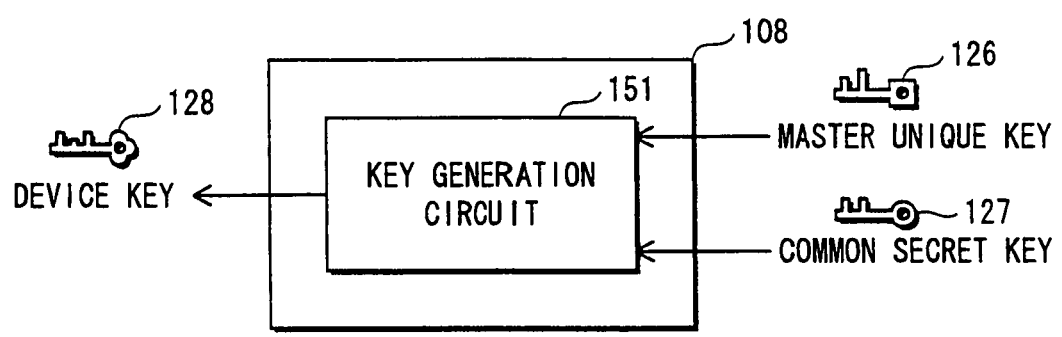
FIG. 14 is a functional block diagram showing a key generation circuit configured in a changeable circuit 108 in accordance with a key circuit configuration program.

FIG. 14 functionally shows a key generation circuit 151 configured within the changeable circuit 108. The key generation circuit 151 is instructed by the control unit 116 to generate a device key. Upon being instructed to generate a device key, the key generation circuit 151 reads the master unique key 126 and the common secret key 127 from the master unique key storage unit 102, and generates the device key 128 based on the read master unique key 126 and common secret key 127.

In the case where the key generation circuit 151 is generated in accordance with the key generation circuit program "KgenA", the key generation circuit 151 generates the 56-bit device key "DevA" appropriate to the DES cryptosystem.

In the case where the key generation circuit 151 is generated in accordance with the key generation circuit program "KgenB", the key generation circuit 151 generates the 128-bit device key "DevB" appropriate to the RSA cryptosystem.

In the case where the key generation circuit 151 is generated in accordance with the key generation circuit program "KgenC", the key generation circuit 151 generates the 128-bit device key "DevC" appropriate to the AES cryptosystem.

Figure 15:
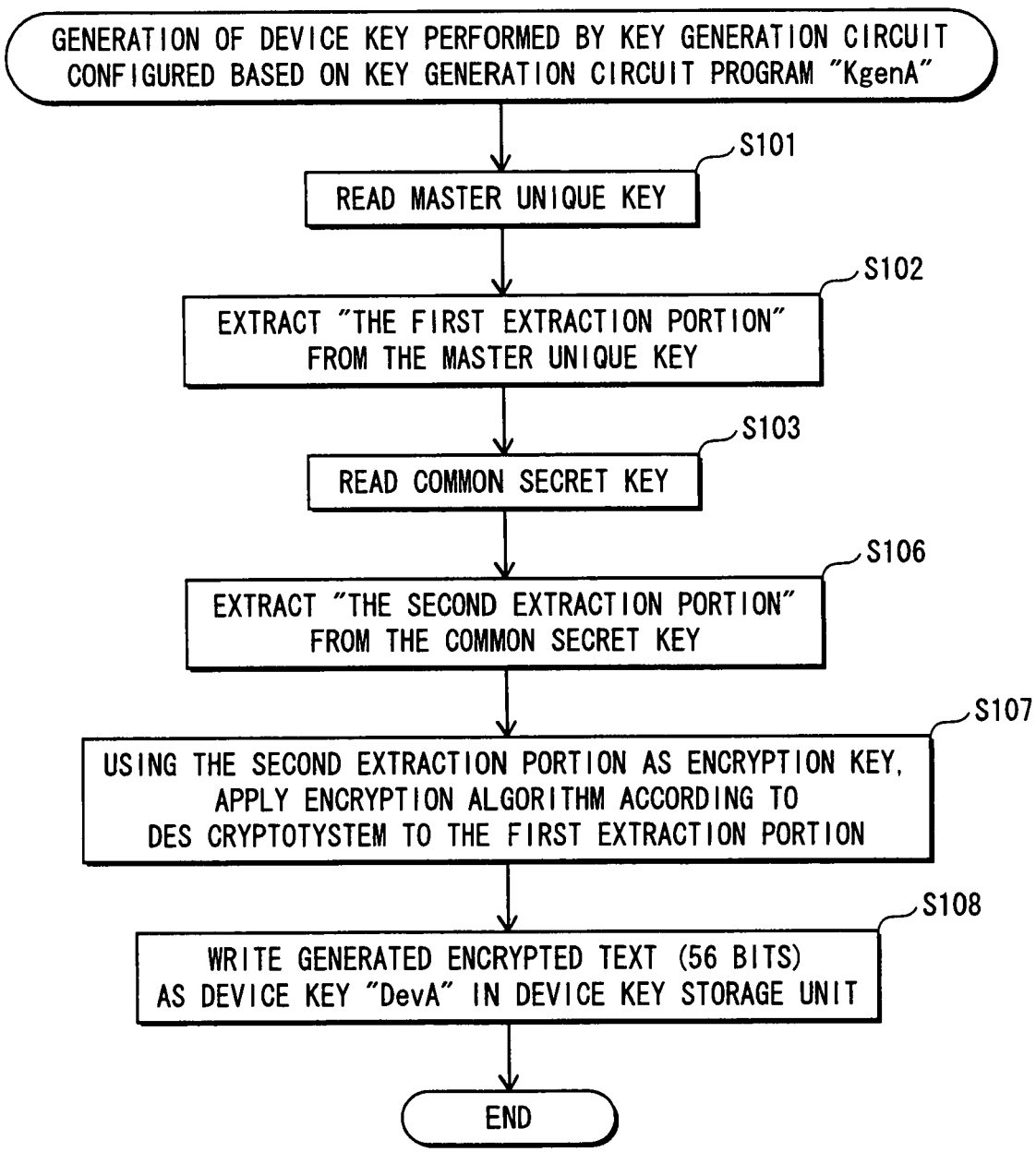
FIG. 15 is a flowchart showing example operations performed by a key generation circuit configured in accordance with a key generation program "KgenA"

FIG. 15 is a flowchart showing an example of generation of a device key performed by the key generation circuit 151 configured in accordance with the key generation circuit program "KgenA". The following explains the key generation performed by the key generation circuit 151, with reference to FIG. 15.

Upon being instructed by the control unit 116 to generate a device key, the key generation circuit 151 reads the master unique key 126 from the master unique key storage unit 102 (Step S101). The key generation circuit 151 extracts the $151^{st}$ bit to the $156^{th}$ bit from the read master unique key (Step S102). The extracted bit sequence is hereinafter called the first extraction portion.

Next, the key generation circuit 151 reads the common secret key 127 from the master unique key storage unit 102 (Step S103). Te key generation circuit 151 extracts the last 56 bits (hereinafter called the second extraction portion) of the common secret key 127 (Step S106), and generates an encrypted text by applying an encryption algorithm in accordance with the DES cryptosystem to the first extraction portion, using the second extraction portion as an encryption key (Step S107). The key generation circuit 151 writes the generated encrypted text as the device key "DevA" into the device key storage unit 103 (Step S108).

The above-described key generation method is only an example. Any method for generating a 56-bit device key appropriate to the DES cryptosystem may be used.

Also, the method used by other key generation circuits configured in accordance with other key generation programs to generate a device key may be selected arbitrarily. Any method for generating a device key having a length appropriate to the corresponding cryptosystem may be used. However, it is preferable to use a method in which procedures of key generation can not be easily estimated.

(8-b) Encryption

Figure 16:
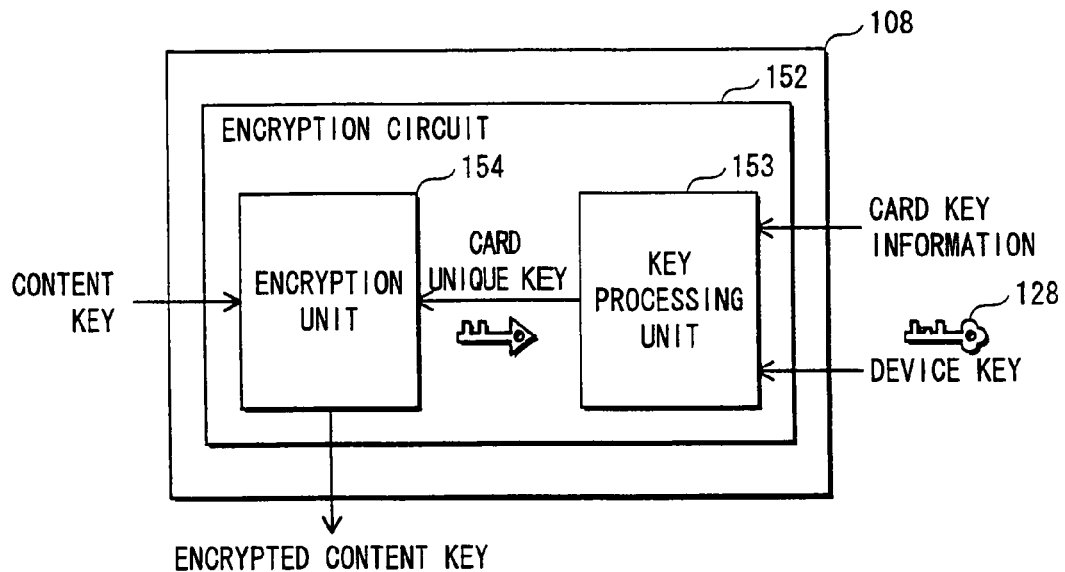
FIG. 16 is a functional block diagram showing an encryption circuit configured in the changeable circuit 108 in accordance with an encryption program.

FIG. 16 is a functional block diagram showing the structure of an encryption circuit 152 configured in the changeable circuit 108. The encryption circuit 152 includes a key processing unit 153 and an encryption unit 154.

The key processing unit 153 receives card key information from the control unit 116. The card key information is stored in a memory card (described later) attached to the content playback apparatus 100, and includes a media key block and a card ID.

Upon receiving the card key information, the key processing unit 153 reads the device key 128 from the device key storage unit 103, and generates a card unique key unique to the memory card from the media key block included in the card key information, based on the read device key 128. The key processing unit 153 outputs the generated card unique key to the encryption unit 154. If the cryptosystem stored in the memory card is a common-key cryptosystem such as the DES cryptosystem, the card unique key generated here is the same as the card unique key stored in the memory card. If it is a public-key cryptosystem, the card unique key generated here is a key corresponding to the card unique key stored in the memory card.

The encryption unit 154 receives the card unique key from the key processing unit 153. Also, the encryption unit 154 receives a content key from the control unit 116, and is instructed by the control unit 116 to encrypt the content key.

Upon being instructed to encrypt the content key, the encryption unit 154 encrypts the content key to generate an encrypted content key, using the received card unique key. Then, the encryption unit 154 outputs the generated encrypted content key to the input/output unit 104'.

If the encryption circuit 152 is configured in accordance with the encryption circuit program "EncA", the key processing unit 153 generates a 56-bit card unique key, and the encryption unit 154 generates an encrypted content key by applying an encryption algorithm in accordance with the DES cryptosystem.

If the encryption circuit 152 is configured in accordance with the encryption circuit program "EncB", the key processing unit 153 generates a 128-bit card unique key, and the encryption unit 154 generates an encrypted content key by applying an encryption algorithm in accordance with the RSA cryptosystem.

If the encryption circuit 152 is configured in accordance with the encryption circuit program "EncC", the key processing unit 153 generates a 128-bit card unique key, and the encryption unit 154 generates an encrypted content key by applying an encryption algorithm in accordance with the AES cryptosystem.

(8-c) Decryption

Figure 17:
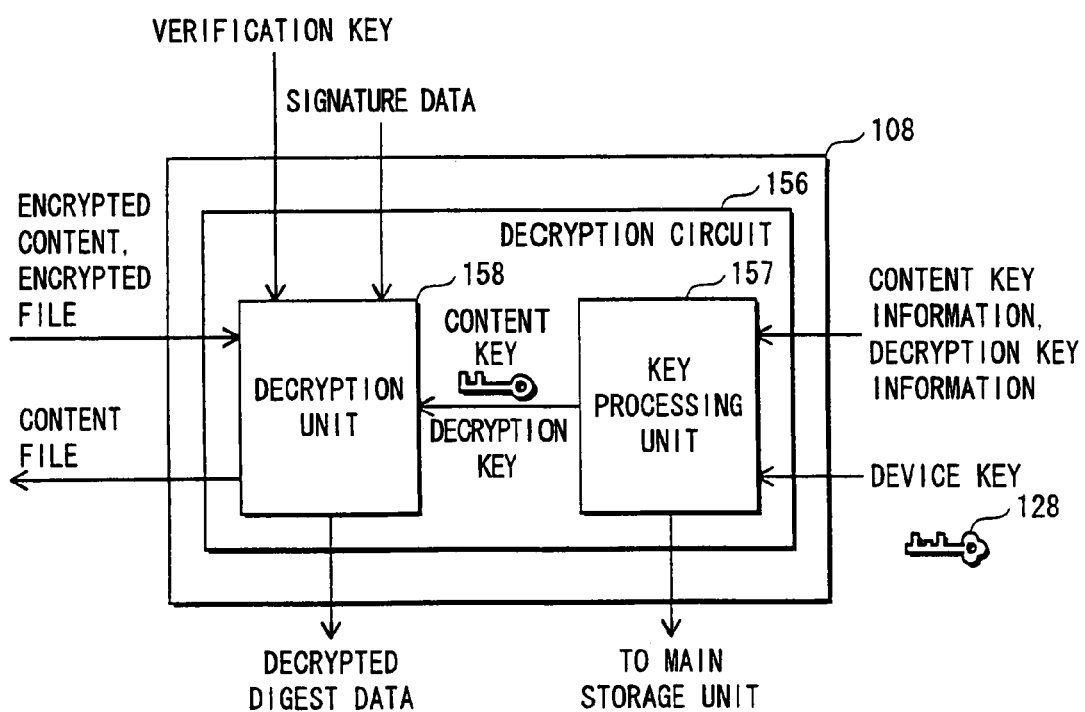
FIG. 17 is a functional block diagram showing a decryption circuit configured in the changeable circuit 108 in accordance with a decryption program.

FIG. 17 functionally shows a decryption circuit 156 configured within the changeable circuit 108. The decryption circuit 156 includes a key processing unit 157 and a decryption unit 158.

The key processing unit 157 receives, from the control unit 116, content key information and an instruction to extract a content key. The key processing unit 157 also receives decryption key information and an instruction to extract a decryption key.

Upon receiving the instruction to extract a content key or a decryption key, the key processing unit 157 reads a device key from the device key storage unit 103, and extract a content key or a decryption key from the content key information or the decryption key information, based on the read device key. The key processing unit 157 outputs the extracted content key or decryption key to the decryption unit 158 and the main storage unit 107.

The decryption unit 158 receives an encrypted text and a decryption instruction for decrypting the encrypted text from the control unit 116 or the legitimacy check unit 112, and generates a decrypted text by applying a decryption algorithm to the received encrypted text, and outputs the generated decrypted text.

The encrypted text that the decryption unit receives from the control unit 116 is, specifically, an encrypted content, an encrypted encryption circuit file, an encrypted key circuit file, and an encrypted verification key file.

If receiving an encrypted content, the decryption unit 158 acquires a content key from the key processing unit 157, and decrypts the encrypted content using the acquired content key to generate a content. In accordance with an instruction from the control unit 116, the decryption unit 158 outputs the generated content to the playback processing unit 109.

If receiving an encrypted encryption circuit file, an encrypted key circuit file and an encrypted verification key file (In FIG. 17, these three are collectively called as "encrypted file"), the decryption unit 158 acquires a decryption key from the key processing unit 157, and decrypts the encrypted encryption circuit file, the encrypted key circuit file and the encrypted verification key file to generate an encryption circuit file, a key circuit file and a verification key file, and writes the generated encryption circuit file, key circuit file and verification key file (In FIG. 17, these three are collectively called as "file") to the main storage unit 107.

The encrypted text that the decryption unit 158 receives from the legitimacy check unit 112 is, specifically, signature data read from the DVD 400a or 400b, or signature data received from the cryptosystem management server 600 together with an encrypted program. In this case, the decryption unit 158 receives a verification key together with the signature data, from the legitimacy check unit 112. Upon receiving the signature data and the verification key, the decryption unit 158 applies a decryption algorithm to the signature date using the acquired verification key, to generate decrypted digest data. The decryption unit 158 outputs the generated decrypted digest data to the main storage unit 107.

In the case where the decryption unit 158 is configured in accordance with the decryption circuit program "DecA", the decryption unit 158 generates the decrypted digest data by applying a decryption algorithm in accordance with the DES cryptosystem.

In the case where the decryption unit 158 is configured in accordance with the decryption circuit program "DecB", the decryption unit 158 generates the decrypted digest data by applying a decryption algorithm in accordance with the RSA cryptosystem.

In the case where the decryption unit 158 is configured in accordance with the decryption circuit program "DecC", the decryption unit 158 generates the decrypted digest data by applying a decryption algorithm in accordance with the AES cryptosystem.

(8) Content Acquisition Unit 101

The content acquisition unit 101 can be attached with a DVD, and reads information recorded on the DVD in accordance with the control unit 116, and outputs the read information to the changeable circuit 108 or the main storage unit 107.

The content acquisition unit 101 is also capable of receiving information that is the same as the information recorded on the DVD from the content server 700 connected to the Internet 20.

(9) Program Acquisition Unit 106

The program acquisition unit 106 performs transmission and reception of information and instructions to and from the cryptosystem management server 600 via the Internet 20.

(10) Legitimacy Check Unit 112

The legitimacy check unit 112 stores a check information table 201 shown in FIG. 18. The check information table 201 includes a plurality of check information sets. The check information sets corresponds to the cryptosystems stored in the content playback apparatus 100 respectively. Each check information set includes a cryptosystem identifier, a server ID and a verification key.

The verification key is a key whose bit length is appropriate to the cryptosystem indicated by the cryptosystem identifier, and corresponds to the signature key unique to the apparatus indicated by the server ID. For example, a check information set 203 includes a cryptosystem identifier "IDB", a server ID "001B", and a verification key "Kve_Bb". The verification key "Kve_Bb" is a 128-bit key corresponding to the RSA cryptosystem indicated by the cryptosystem identifier "IDB", and corresponds to the signature key "Ksig_Bb" that is unique to the cryptosystem management server 600 indicated by the server ID "001B".

The legitimacy check unit 112 receives a content file, content key information and a signature file read from the DVD 400a or 400b, and is instructed to perform signature verification.

Also, during the introduction of a cryptosystem (described later), the legitimacy check unit 112 receives, from the control unit 116m an encryption circuit file "C", a key circuit file "KC", a verification key file "VeriC", a decryption key information "KinfB", and a signature file whose example structure is shown in FIG. 7, and is instructed to perform signature verification.

(10-a) Legitimacy Check on Content File

Upon receiving the content file, the content key information and the signature file, and upon being instructed to perform signature verification, the legitimacy check unit 112 extracts a cryptosystem identifier included in the received signature file.

Next, the legitimacy check unit 112 searches the check information table 201 for a check information set including a cryptosystem identifier that is the same as the extracted cryptosystem identifier. If such a check information set is not detected, the legitimacy check unit 112 outputs a verification failure notice indicating a signature verification failure to the control unit 116.

If such a check information set is detected, the legitimacy check unit 112 outputs the extracted cryptosystem identifier to the selection unit 113 to instruct the selection unit 113 to read and output a decryption circuit program.

Upon the configuration of the decryption circuit 156, the legitimacy check unit 112 reads a verification key included in the detected check information set, and outputs signature data included in the signature file and the read verification key to the decryption unit 158 of the decryption circuit 156 configured within the changeable circuit 108, and instructs the decryption unit 158 to perform decryption.

Next, upon the generation of the decrypted digest data by the decryption unit 158, the legitimacy check unit 112 generates digest data by substituting a combination of the content file and the content key information received from the control unit 116 into a hash function. The legitimacy check unit 112 compares the generated digest data with the decrypted digest data. If they are the same, the legitimacy check unit 112 outputs a verification success notification indicating that the signature verification has succeeded to the control unit 116.

If they are not the same, the legitimacy check unit 112 outputs a verification failure notification indicating that the verification has failed to the control unit 116.

(10-b) Legitimacy Check on File for Cryptosystem Introduction

Also in the case of receiving the encryption circuit file, the key circuit file, the verification key file, the decryption key information and the signature file, the legitimacy check unit 112 performs verification of the signature data, included in the received signature file, in the same manner as (10-a). In this case, the legitimacy check unit 112 generates digest data by substituting a combination of the encryption circuit file, the key circuit file, the verification key file and the decryption key information into a hash function.

If the signature verification has succeeded, the legitimacy check unit 112 is instructed by the control unit 116 to perform writing of the encryption circuit file, and the key circuit file. Upon being instructed, the legitimacy check unit 112 writes the encryption circuit file and the key circuit file into the encryption circuit storage unit 117 and the key circuit storage unit 119.

Next, the legitimacy check unit 112 is instructed by the control unit 116 to update the check information table 201. Upon being structured to update the check information table 201, the legitimacy check unit 112 generates a new check information set based on the verification key file, and adds the generated check information set to the check information table 201.

(11) Control Unit 116

In FIG. 8, although wirings are not specifically illustrated, the control unit 116 is connected to each component of the content playback apparatus 100, and controls operations of each.

Upon receiving a warning notification notifying that a cryptosystem has been broken from the cryptosystem management server 600 via the program acquisition unit 106, the control unit 116 introduces a new cryptosystem that is alternative to the broken cryptosystem.

The control unit 116 also detects that the DVD 400a or 400b is attached, via the content acquisition unit 101. Upon detecting that the DVD 400a or 400b is attached, the control unit 116 performs verification as to whether an encrypted content recorded on the attached DVD is playable or not.

The control unit 116 also receives, from the input unit 121, operation instruction information indicating various operations input by the user, and performs playback of the content or copying of the content to the memory card, depending on the received operation instruction information.

The following explain the introduction of the cryptosystem, the verification as to whether the content is playable, the playback of the content, and the copying of the content to the memory card.

Although the following explains the case where the DVD 400a is attached, the same operations are performed in the case where the DVD 400b is attached.

Introduction of Cryptosystem

The warning notification that the control unit 116 receives from the cryptosystem management server 600 includes a cryptosystem identifier indicating the broken cryptosystem. Although the following explains the case where the cryptosystem identifier "IDA" indicating the DES cryptosystem is included, the same operations are performed in the case where other cryptosystem identifier is included.

The control unit 116 detects the availability information set 171 including the cryptosystem identifier "IDA" from the available-cryptosystem table 166. The control unit 116 reads the usage flag from the availability information set 171. If the read usage flag is "0", this means that a cryptosystem that is alternative to the DES cryptosystem has already been introduced. Therefore, the control unit stops the processing.

If the read usage flag is "1", the control unit 116 transmits an introduction request for requesting introduction of a cryptosystem to the cryptosystem management server 600 via the program acquisition unit 106.

Next, the control unit 116 receives, via the program acquisition unit 106, the encrypted encryption circuit file 681, the encrypted key circuit file 682, the encrypted verification key file 683, the cryptosystem identifier 684, the decryption key information 685 and the signature file 686, which are illustrated in FIG. 7.

Upon receiving these, the control unit 116 instructs the selection unit 113 to read a decryption circuit program corresponding to the RSA cryptosystem indicated by the cryptosystem identifier 684, and instructs the selection unit 114 to read a key generation circuit program corresponding to the RSA cryptosystem indicated by the cryptosystem identifier 684, and outputs a correspondence confirmation instruction for confirming the correspondence between the read programs to the combination check unit 118.

Upon receiving an OK signal from the combination check unit 118, the control unit 116 instructs the selection unit 114 to outputs the read key generation circuit program. Next, the control unit 116 instructs the key generation circuit 151 configured with in the changeable circuit 108 to generate a device key.

Upon generation of a device key "DevB" by the key generation circuit 151, the control unit 116 instructs the selection unit 113 to output the read decryption circuit program.

Note that if the changeable circuit information set 161 stored in the main storage unit 107 indicates that the device key currently stored in the device key storage unit 103 corresponds to the RSA cryptosystem and a decryption circuit in accordance with the RSA cryptosystem is currently configured within the changeable circuit 108, the instruction for reading the program, the generation of the device key and the configuration of the decryption circuit are omitted.

Next, the control unit 116 outputs the decryption key information 685 to the key processing unit 157 of the decryption processing circuit 156. Also, the control unit 116 outputs the encrypted encryption circuit file 681 "EncB (C, KencB)", the encrypted key circuit file 682 "EncB (KC, KencB)" and the encrypted verification key file 683 "EncB(VeriC, KencB)" to the decryption unit 158 and instructs the decryption unit 158 to perform decryption.

After the decryption finishes, and the encryption circuit file "C", the key circuit file "KC" and the verification key file "VeriC" are written into the main storage unit 107, the control unit 116 outputs the encryption circuit file "C", the key circuit file "KC", the verification key file "VeriC", the decryption key information 685 and the signature file 686 to the legitimacy check unit 112, and instructs the legitimacy check unit 112 to perform signature verification.

If the signature verification has succeeded, the control unit 116 instructs the legitimacy check unit 112 to perform writing of the encryption circuit file "C" and the key circuit file "KC". IF the signature verification has failed, the control unit 116 retransmits the introduction request to the cryptosystem management server 600 via the program acquisition unit 106.

Next, the control unit 116 instructs the legitimacy check unit 112 to update the check information table 201. Next, the control unit 116 generates an availability information set that includes the cryptosystem identifier "IDC" and the usage flag "1" included in the encryption circuit file "C", and adds the generated availability information set to the available-cryptosystem table 166.

Next, the control unit 116 detects the encryption circuit file 131 including the cryptosystem identifier "IDA" from the encryption circuit storage unit 117, and deletes the encryption circuit program 133 from the detected encryption circuit file 131. Then, the control unit 116 selects the availability information set 171 including the cryptosystem identifier "IDA" from the available-cryptosystem table 166, and change the usage flag included in the selected availability information set 171 to "0".

Verification as to Whether Content is Playable

Upon detecting that the DVD 400a is attached via the content acquisition unit 101, the control unit 116 reads, via the content acquisition unit 101, the content file 401, the content key information 404 and the signature file 411 from the DVD 400a attached thereto. Next, the control unit 116 extracts the cryptosystem identifier 402 "IDA" included in the content file 401, and searches the available-cryptosystem table 166 stored in the main storage unit 107 for an availability information set that includes a cryptosystem identifier that is the same as the extracted cryptosystem identifier. Here, if such an availability information set is not detected, the control unit 116 judges that the content is not playable.

If such an availability information set 171 is found, the control unit 116 outputs the read content file 401, content key information 404 and signature file 411 to the legitimacy check unit 112, and instructs the legitimacy check unit 112 to verify the signature data 414 included in the signature file 411.

If the legitimacy check unit 112 has succeeded to verify the signature data 414, the control unit 116 judges that the content is playable. If the legitimacy check unit 112 has failed to verify the signature data 414, the control unit 116 judges that the content is not playable.

Although the case where the DVD 400a is attached is described above, the verification is performed in the same manner in the case where the DVD 400b is attached. Accordingly, the content playback apparatus 100 can not play back the content recorded on the DVD 400b until the AES cryptosystem that is alternative to the broken DES cryptosystem is introduced. Furthermore, even after the AES cryptosystem is introduced, the content playback apparatus can playback the content recorded on the DVD 400a.

Playback of Content

After judging that the content is playable by the verification described above, upon receiving operation instruction information indicating playback of the content from the input unit 121, the control unit 116 extracts the cryptosystem identifier 402 "IDA" included in the content file 401. Next, the control unit 116 controls the selection units 113 and 114, the combination check unit 118 and the changeable circuit 108 to generate a device key "DevA" corresponding to the cryptosystem identifier 402 "IDA", and to configure the decryption circuit 156. The control of the generation of the device key and the configuration of the decryption circuit 156 is performed in the same manner as described in Introduction of cryptosystem above. Therefore, the explanation thereof is omitted here.

Next, the control unit 116 outputs the read content key information 404 to the key processing unit 157 of the configured decryption circuit 156, and outputs the encrypted content 403 to the decryption unit 158 and instructs the decryption unit 158 to decrypt the encrypted content 403.

Upon generation of the content by the decryption unit 158, the control unit 116 instructs the playback processing unit 109 to play back the content.

Output of Content to Memory Card

After judging that the content is playable by the verification described above, upon receiving operation instruction information indicating copying of the content from the input unit 121, the control unit 116 extracts the cryptosystem identifier 402 "IDA" included in the content file 401 and the cryptosystem identifier 413 "IDB" included in the signature file 411. Next, the control unit 116 reads the available-cryptosystem table 166 from the main storage unit 107, and searches the read available-cryptosystem table 166 for an availability information set including the cryptosystem identifier "IDA" and an availability information set including the cryptosystem identifier "IDB".

If any of the cryptosystem identifiers is not detected, the control unit 116 generates an error screen showing that it is impossible to copy the content, and displays the error screen on the monitor 15 via the playback processing unit 109.

If the availability information sets 171 and 172 respectively including the identifiers are detected, the control unit 116 reads the usage flags included in the detected availability information sets 171 and 172 respectively. If any one of the usage flags is "0", the control unit 116 generates an error screen showing that it is impossible to copy the content from the attached DVD, and displays the error screen on the monitor 15.

If both of the read usage flags are "1", the control unit 116 extracts the cryptosystem identifier 402 "IDA" from the content file 401, and outputs the extracted cryptosystem identifier 402 "IDA" to the memory card 500 via the input/output unit 104, and inquires whether the cryptosystem indicated by the cryptosystem identifier 402 "IDA" is stored in the memory card 500.

Next, the control unit 116 receives a response signal from the memory card 500 via the input/output unit 104. If the response signal indicates "0", which means that the cryptosystem indicted by the cryptosystem identifier "IDA" is not stored in the memory card 500, the control unit 116 generates an error message showing that it is impossible to perform the requested copying, and displays the error screen on the monitor 15.

If the response signal indicates "1", which means that the cryptosystem indicated by the cryptosystem identifier "IDA" is stored in the memory card 500, the control unit 116 controls the selection units 113 and 114, the combination check unit 118 and the changeable circuit 108 to generate a device key "DevA" corresponding to the cryptosystem identifier "IDA" read from the content file 401, and configures, in the changeable circuit 108, the decryption circuit 156 that performs decryption in accordance with the cryptosystem identifier "IDA". The control of the generation of the device key and the configuration of the decryption circuit 156 is performed in the same manner as described in Introduction of cryptosystem above. Therefore, the explanation thereof is omitted here.

Next, the control unit 116 outputs the read content key information 404 to the key processing unit 157 of the configured decryption circuit 156, and instructs the decryption circuit 156 to generate a content key.

Upon generation of the content key "KconA" by the key processing unit 157, the control unit 116 instructs the selection unit 113 to read and output an encryption circuit program corresponding to the cryptosystem identifier 402 "IDA".

Upon configuration of the encryption circuit 152 in the changeable circuit 108, the control unit 116 instructs the memory card 500 via the input/output unit 104 to output card key information, and acquires the card key information from the memory card 500.

Next, the control unit 116 outputs the acquired card key information to the key processing unit 153 of the encryption circuit 152, and outputs the content key "KconA" to the encryption unit 154, and instructs the encryption unit 154 to encrypt the content key "KconA".

Upon generation of an encrypted content key "EncA(KconA, MkeyA)" by the encryption unit 154, the control unit 116 extracts the encrypted content 403 "EncA(ConA, KconA)" from the content file 401, and outputs the extracted encrypted content 403 "EncA(ConA, KconA)" and the encrypted content key "EncA(KconA, MkeyA)" to the memory card 500 via the input/output unit 104.

(12) Input/Output Unit 104

The input/output unit 104 can be attached with a memory card 500, and performs input and output of various types of information under control of the control unit 116.

(13) Input Unit 121 and Playback Processing Unit 109

The input unit 121 includes various types of buttons, such as a playback button, a selection button, and a determination button. The input unit 121 receives an operation using the above-mentioned buttons, and outputs operation instruction information indicating the received operation to the control unit 116.

The playback processing unit 109 is connected to the monitor 15, and generates a screen and an audio from the content received configure the changeable circuit 108 in accordance with an instruction from the control unit 116, and outputs the generated screen and audio to the monitor 15.

Also, in accordance with the instruction from the control unit 116, the playback processing unit 109 has the monitor 15 display various types of screens, such as an error screen.

1.5 Memory Card 500

Figure 19:
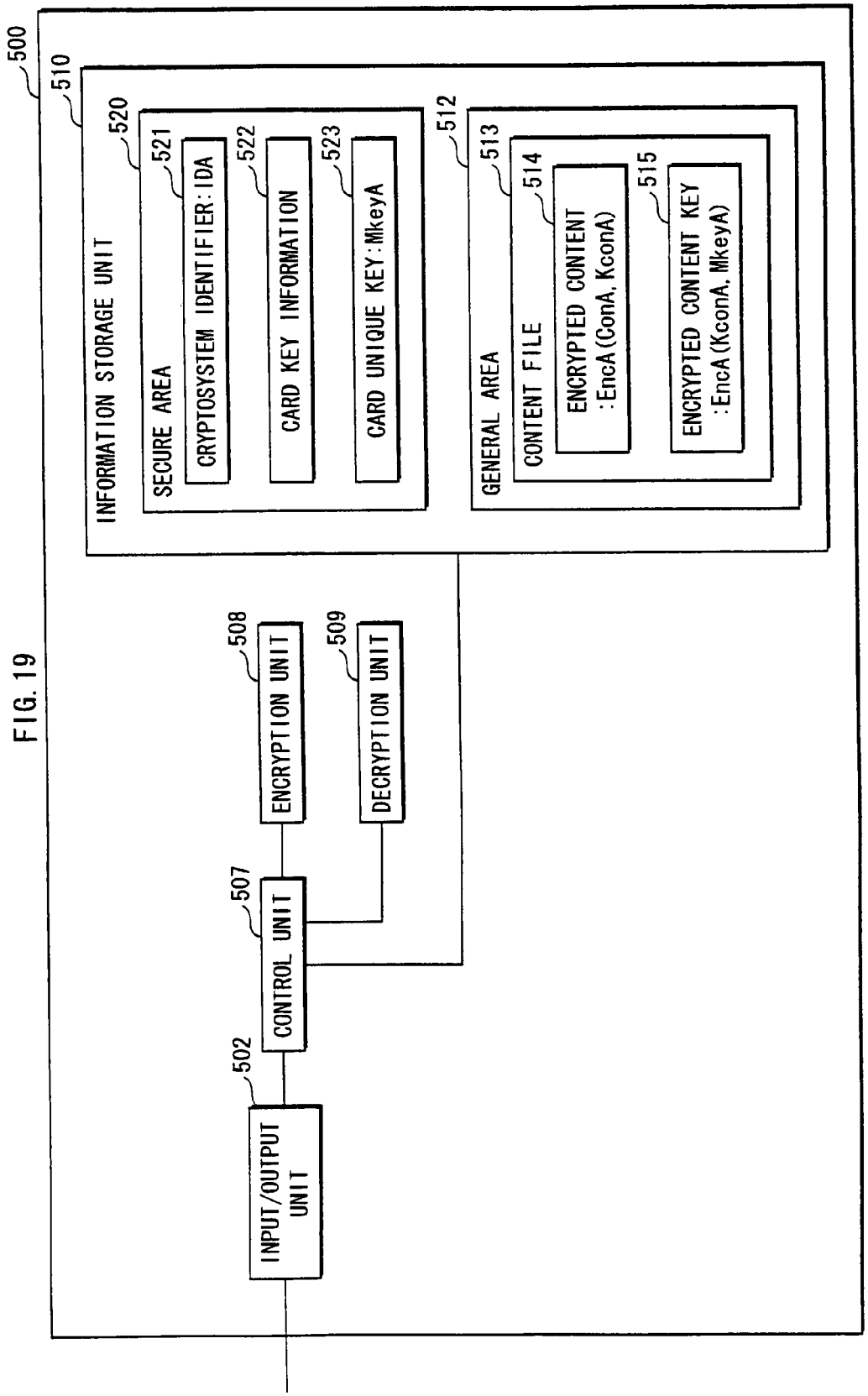
FIG. 19 is a functional block diagram showing the structure of a memory card 500.

As FIG. 19 shows, the memory card 500 includes an input/output unit 502, a control unit 507, an encryption unit 508, a decryption unit 509 and an information storage unit 510.

The following explain each component of the memory card 500.

(1) Information Storage Unit 510

The information storage unit 510 includes a flash memory, and the internal area thereof is divided into a secure area 520 and a general area 512.

The secure area 520 is an area that is not accessible from apparatuses other than legitimate apparatuses, and stores, for example, a cryptosystem identifier 521 "IDA", card key information 522 and a card unique key 523 "MkeyA".

The cryptosystem identifier 521 indicates a cryptosystem stored in the memory card 500. Here, the cryptosystem identifier 521 indicates the DES cryptosystem.

As described above, the card key information 522 includes a media key block and a media ID. The media ID is an identifier that is unique to the memory card 500. The media key block is data used for giving a card unique key "MkeyA" only to a legitimate apparatus that is permitted to access the memory card 500. Note that if the memory card corresponds to the public-key cryptosystem, the card unique key generated by a legitimate apparatus from the card key information is not the same as the card unique that the memory card stores.

The card unique key 523 "MkeyA" is a key that is unique to the memory card 500. Here, the card unique key 523 is a 56-bit key corresponding to the cryptosystem indicated by the cryptosystem identifier 521.

The general area 512 is an area that external apparatuses can freely access, and stores a content file 513 for example. The content file 513 includes an encrypted content 514 "EncA(ConA, KconA)" and an encrypted content key 515 "EncA(KconA, MkeyA)".

The encrypted content 514 is the same as the encrypted content 403 recorded on the DVD 400a. The encrypted content key 515 is generated by applying an encryption algorithm in accordance with the DES cryptosystem to the content key "KconA", using the card unique key "MkeyA".

(2) Input/Output Unit 502

The input/output unit 502 includes an interface that is connectable to external apparatuses, and transmits and receives various types of information between the external apparatuses and the control unit 507.

The external apparatuses are, specifically, the content playback apparatus 100 and the portable player 800.

(3) Encryption Unit 508 and Decryption Unit 509

The encryption unit 508 receives an encryption key and a plain text from the control unit 507, and is instructed to perform encryption. Upon being instructed to perform encryption, the encryption unit 508 generates an encrypted text by applying an encryption algorithm in accordance with the DES cryptosystem to the plain text, using the encryption key, and outputs the generated an encrypted text to the control unit 507.

The decryption unit 509 receives a decryption key and an encrypted text from the control unit 507, and is instructed to perform decryption. Upon being instructed to perform decryption, the decryption unit 509 generates a decrypted text by applying a decryption algorithm in accordance with the DES cryptosystem to the encrypted text, using the decryption key, and outputs the generated decrypted text to the control unit 507.

(4) Control Unit 507

The control unit 507 controls each component of the memory card 500.

Writing of Content File

In the state where the memory card 500 is attached to the playback apparatus 100, the control unit 507 receives a cryptosystem identifier from the content playback apparatus 100 via the input/output unit 502, and is inquired as to whether the control unit 507 stores the cryptosystem indicated by the received cryptosystem identifier. Upon being inquired, the control unit 507 compares the received cryptosystem identifier and the cryptosystem identifier 521 stored in the secure area 520. If they are the same, the control unit 507 generates a response signal "1", which means that the control unit 507 can decrypt the encrypted text encrypted in accordance with the cryptosystem indicated by the received cryptosystem identifier.

If they are not the same, the control unit 507 generates a response signal "0", which means that the control unit 507 can not decrypt the encrypted text encrypted in accordance with the cryptosystem indicated by the received cryptosystem identifier.

Next, the control unit 507 outputs the generated response signal to the content playback apparatus 100 via the input/output unit 502.

Next, in accordance with a request from the content playback apparatus 100, the control unit 507 outputs the card key information 522 to the content playback apparatus 100. Next, the control unit 507 receives the encrypted content and the encrypted content key from the content playback apparatus 100, and generates a content file including the received encrypted content and the encrypted content key, and writes the generated content file in the general area.

Playback of Content

In the state where the memory card 500 is attached to the portable player 800, if being requested to play back the content, the control unit 507 outputs the card unique key 523 and the encrypted content key 515 to the decryption unit 509, and instructs the decryption unit to decrypt the encrypted content 515.

Upon receiving the content key from the decryption unit 509, the control unit 507 outputs the received content key and the encrypted content 514 to the decryption unit 509, and instructs the decryption unit 509 to perform decryption. Next, the control unit 507 outputs the content generated by the decryption unit 509 to the portable player 800.

1.6 Portable Player 800

The portable player 800 is a playback only apparatus for contents including videos and audios, and reads and plays back a content recorded in the memory card 500.

1.7 Operations of Information Security System 1

The following explains operations of each apparatus included in the information security system 1.

(1) Operations of Content Playback Apparatus 100

Figure 20:
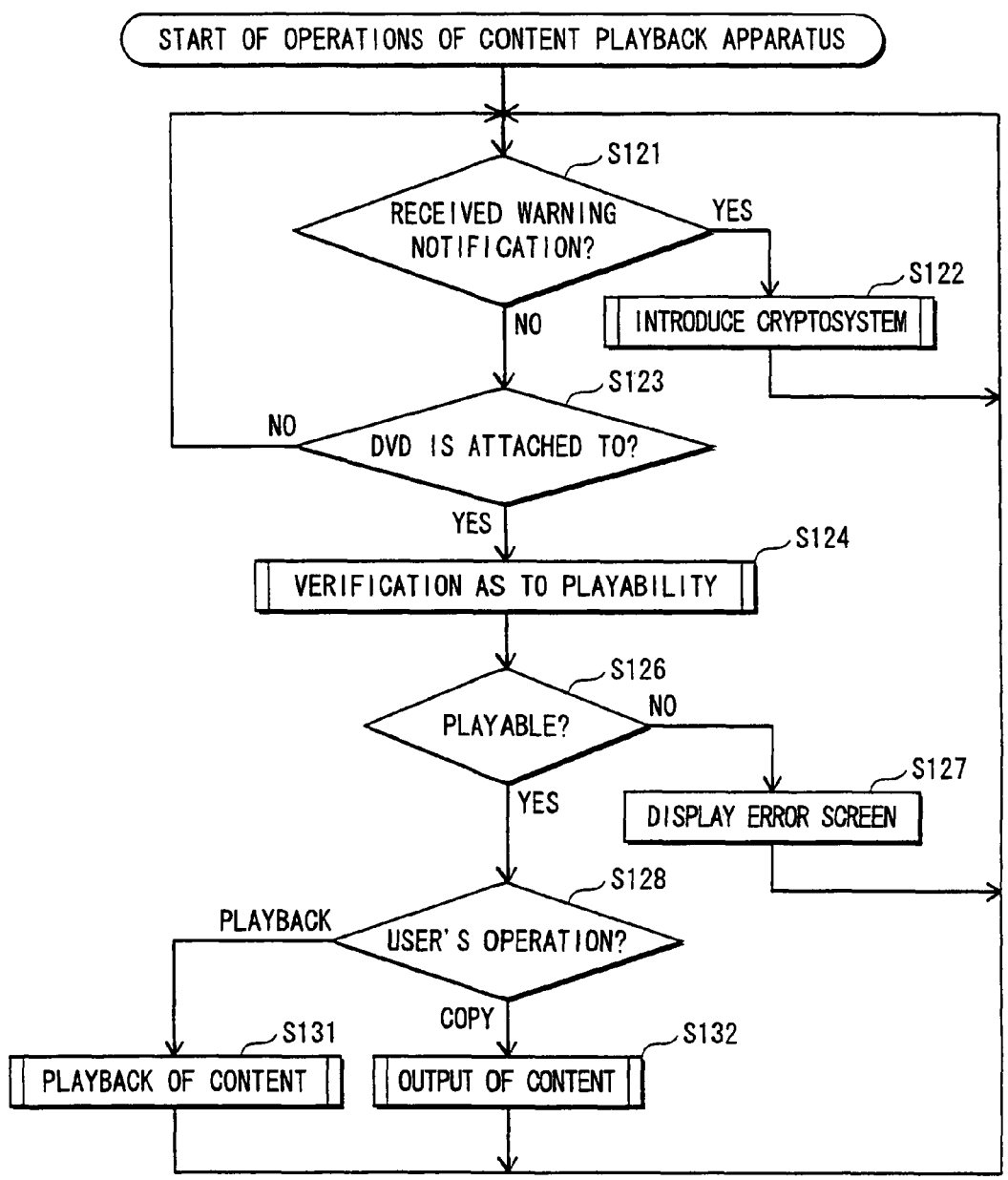
FIG. 20 is a flowchart showing operations performed by a content playback apparatus.
Figure 21:
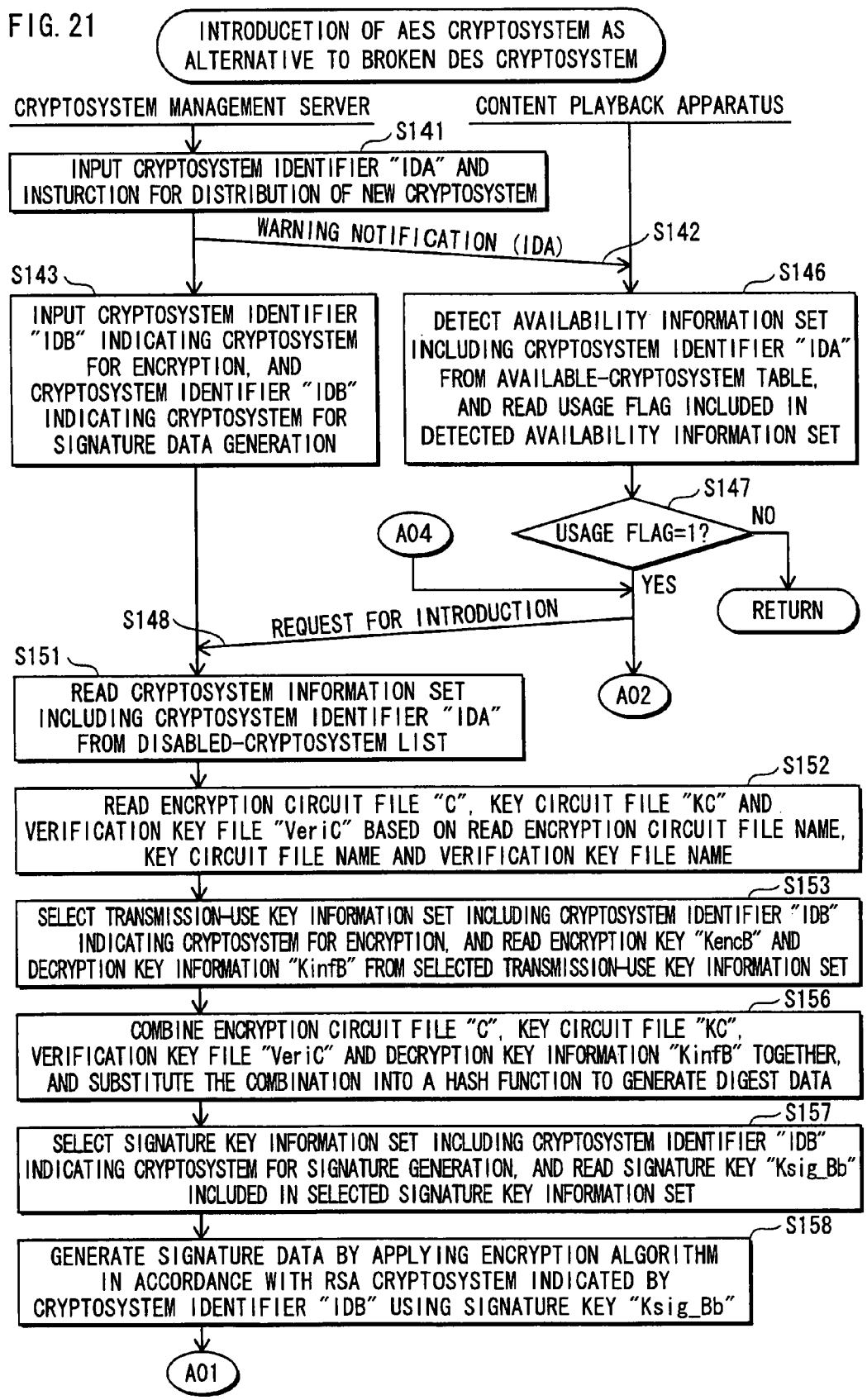
FIG. 21 is a flowchart showing operations performed by the content playback apparatus 100 and the cryptosystem management server 600 to introduce the AES cryptosystem in response to breaking of the DES cryptosystem.
Figure 22:
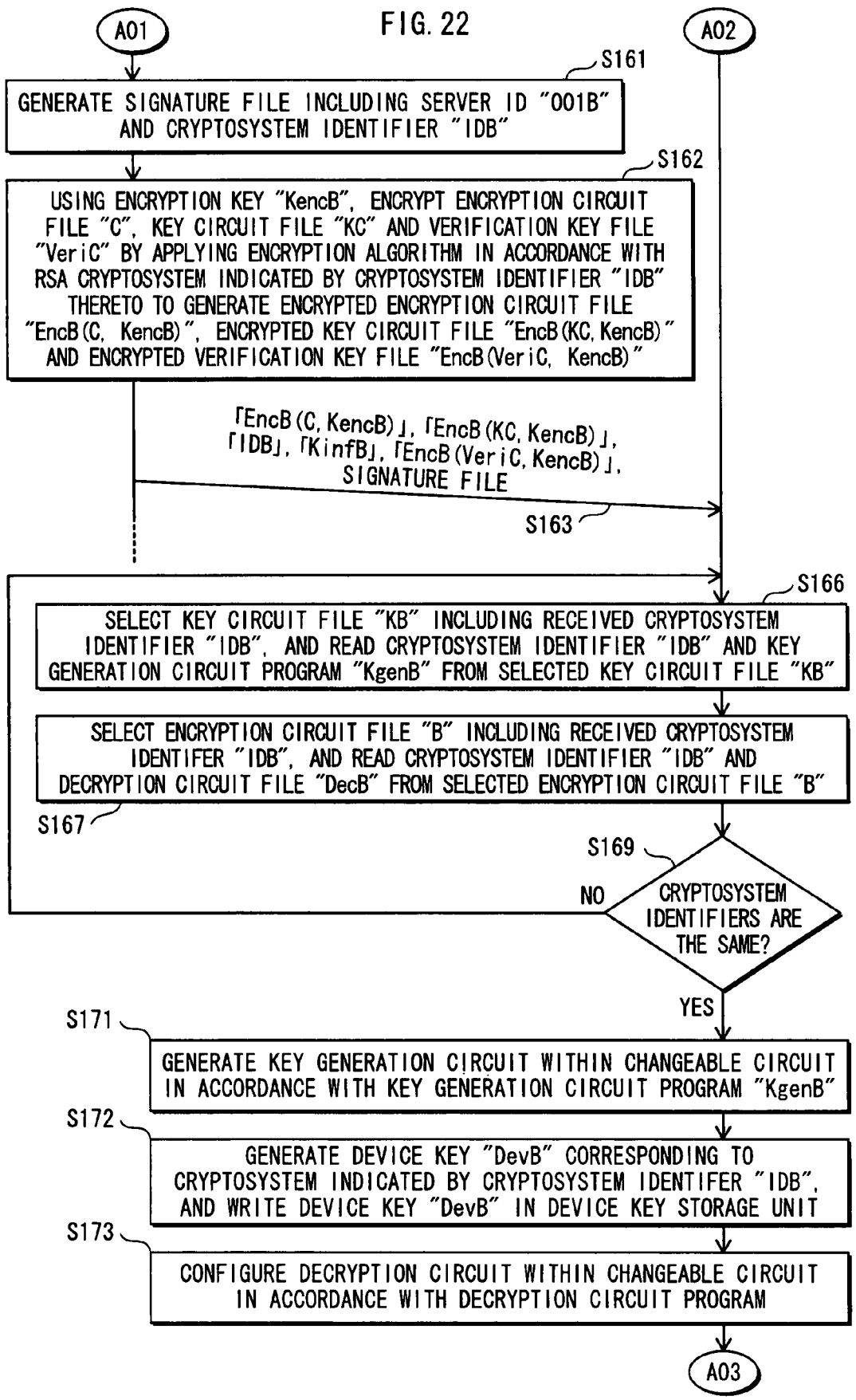
FIG. 22 is a flowchart showing operations performed by the content playback apparatus 100 and the cryptosystem management server 600 to introduce the AES cryptosystem in response to the breaking of the DES cryptosystem, which is continued from FIG. 21.
Figure 23:
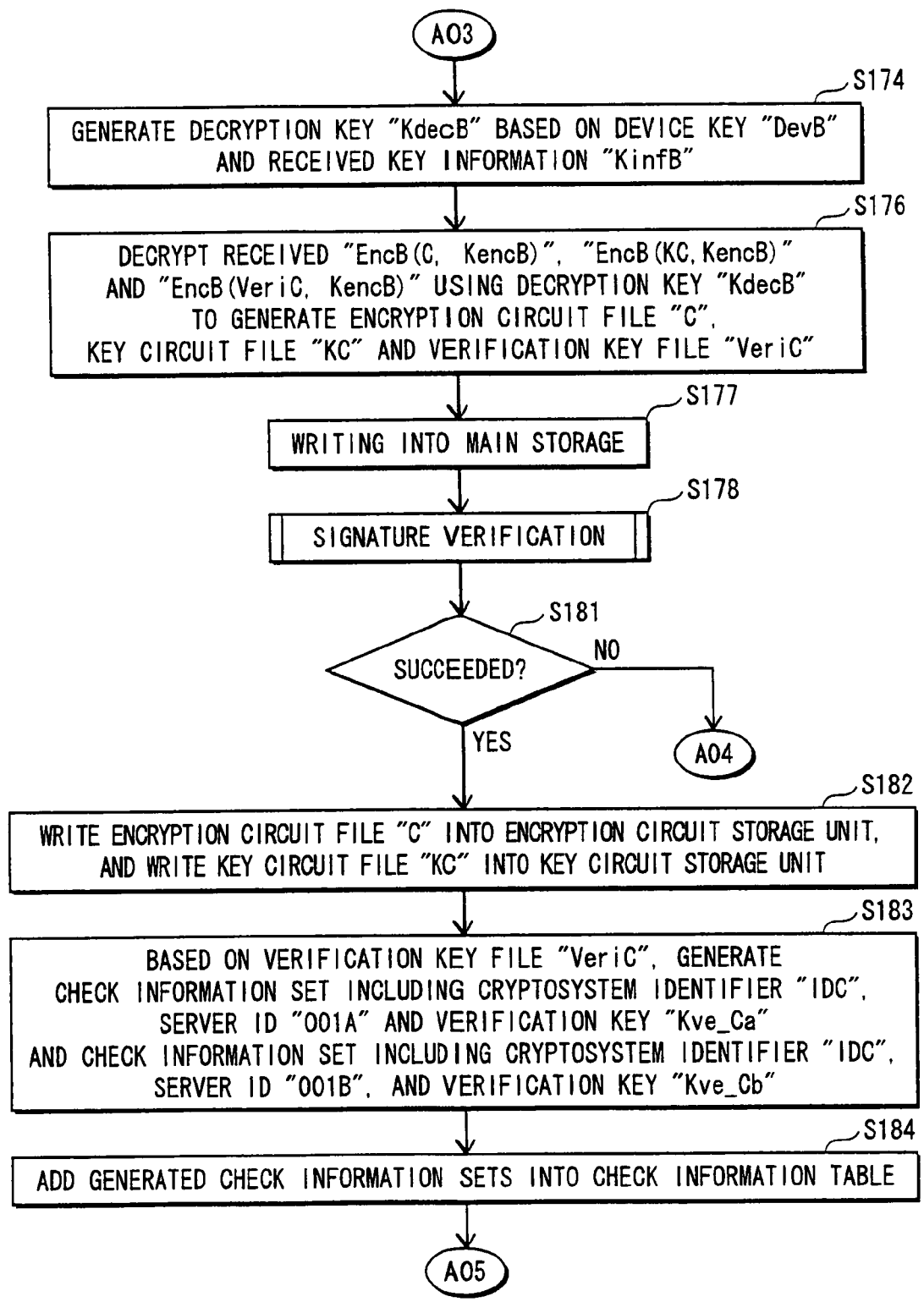
FIG. 23 is a flowchart showing operations performed by the content playback apparatus 100 and the cryptosystem management server 600 to introduce the AES cryptosystem in response to the breaking of the DES cryptosystem, which is continued from FIG. 21.
Figure 24:
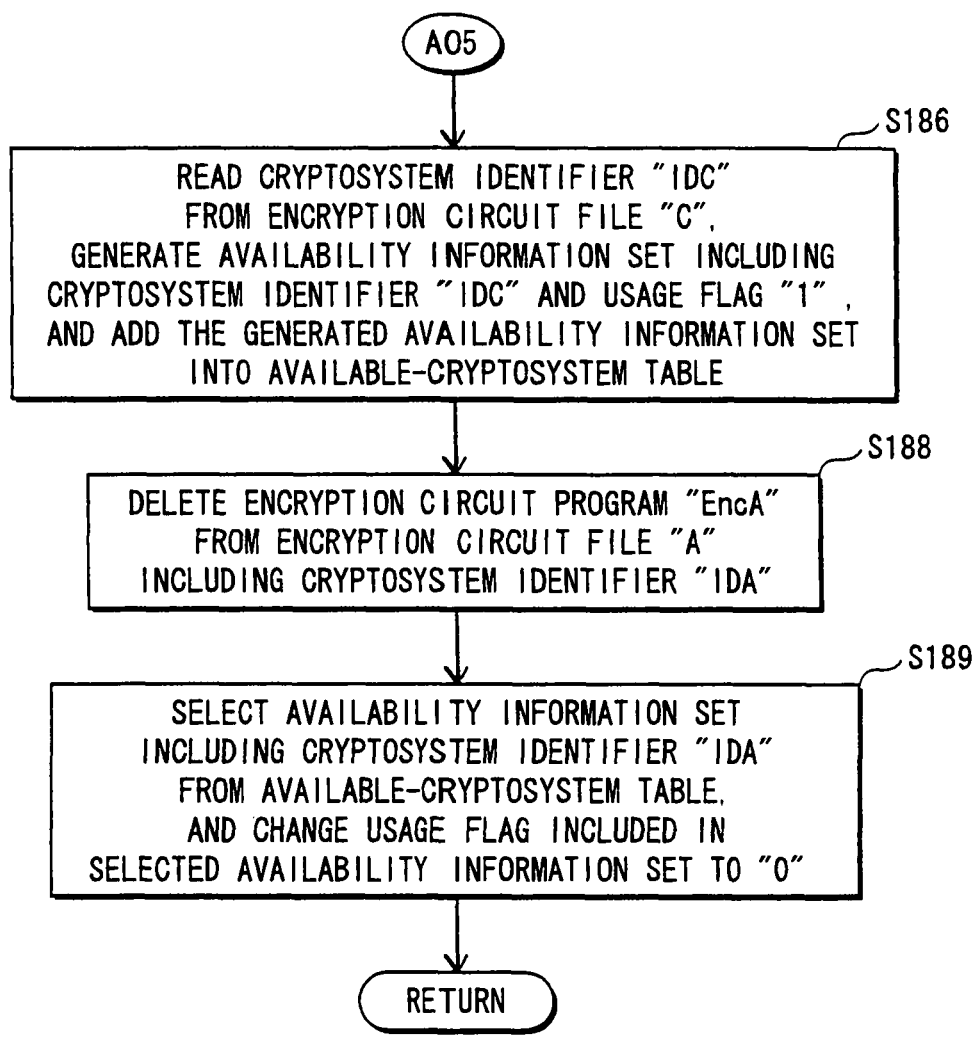
FIG. 24 is a flowchart showing operations performed by the content playback apparatus 100 and the cryptosystem management server 600 to introduce the AES cryptosystem in response to the breaking of the DES cryptosystem, which is continued from FIG. 21.

FIG. 20 is a flowchart showing part of operations performed by the content playback apparatus 100 after it is turned on. The following explains operations of the content playback apparatus 100 with reference to FIG. 20.

After turned on, if receiving a warning notification, which indicates that any of the cryptosystems stored in the content playback apparatus 100 has been broken, from the cryptosystem management server 600 via the program acquisition unit 106 (YES in Step S121), the content playback apparatus 100 introduces a cryptosystem that is alternative to the broken cryptosystem (Step S122).

If detecting via the content acquisition unit 101 that a DVD is newly attached (YES in Step S123), the content playback apparatus 100 verifies whether the playback apparatus 100 can play back the content recorded on the attached DVD (Step S124).

If not receiving any warning message and not detecting any attached DVD (NO in Step S121 and NO in Step S123), the content playback apparatus 100 keeps waiting.

As a result of the verification performed in Step S124, if it is judged that the playback apparatus 100 can play back the content (YES in Step S126), in accordance with an operation by the user (Step S128), the playback apparatus 100 performs playback of the content (Step S131) and output of the content to the memory card 500 (Step S132).

As a result of the verification, if it is judged that the playback apparatus 100 can not play back the content (NO in Step S126), the playback apparatus displays an error screen showing that the playback apparatus 100 can not play back the content recorded on the attached DVD (Step S127).

After completing Steps S122, S127, S131 and S132, the playback apparatus 100 performs Step S121 again.

(2) Introduction of Cryptosystem

FIG. 21 to FIG. 24 are flowcharts showing operations performed by the content playback apparatus 100 and the cryptosystem management server 600 in relation to introduction of a cryptosystem as an alternative to the broken cryptosystem. These flowcharts show the details of Step S122 shown in FIG. 20.

The following describes, as an example, a case where the DES cryptosystem among the cryptosystems stored in the content playback apparatus, 100 has been broken and the AES cryptosystem is to be introduced.

The control unit 607 of the cryptosystem management server 600 receives, via the input unit 613, a cryptosystem identifier "IDA" and a distribution instruction for distributing a new cryptosystem from the operator (Step S141). Upon receiving the distribution instruction, the control unit 607 generates a warning notification including the cryptosystem identifier "IDA" input by the operator, and transmits the generated warning notification to the content playback apparatus 100 via the transmission/reception unit 601 (Step S142). Also, the control unit 607 receives, via the input unit 613, a cryptosystem identifier "IDB", which indicates the cryptosystem for encryption of various types of files relating to the introduction of cryptosystem, and a cryptosystem identifier "IDB", which indicates the cryptosystem for generation of signature data (Step S143).

The control unit of the content playback apparatus 100 receives the warning notification from the cryptosystem management server 600 via the program acquisition unit 106. Upon receiving the warning notification, the control unit 116 detects the availability information set 171 from the available-cryptosystem table 166 stored in the main storage unit 107, based on the cryptosystem identifier "IDA" included in the received warning notification, and reads the usage flag included in the detected availability information set 171 (Step S146). If the read usage flag is "0" (No in Step S147), this means that the introduction of the cryptosystem as an alternative to the DES cryptosystem has been already finished. Accordingly, the processing for the introduction of the cryptosystem is finished and processing shown in FIG. 20 is performed again.

If the read usage flag is "1" (YES in Step S147), the control unit 116 transmits, via the program acquisition unit 106, an introduction request for introducing a cryptosystem as an alternative to the DES cryptosystem, to the cryptosystem management server 600 (Step S148).

The control unit 607 of the cryptosystem management server 600 receives, via the transmission/reception unit 601, the introduction request from the content playback apparatus 100. Upon receiving the introduction request, the control unit 607 reads the cryptosystem information set 622 including the cryptosystem identifier "IDA" from the disabled-cryptosystem list 621 (Step S151). Based on the encryption circuit file name "C", the key circuit file name "KC" and the verification key file name "VeriC", the control unit 607 reads the encryption circuit file 631 "C", the key circuit file 651 "KC" and the verification key file-671 "VeriC" (Step S152).

Next, based on the cryptosystem identifier "IDB" indicating the cryptosystem for encryption, the control unit 607 selects the transmission-use key information set 628 including the cryptosystem identifier "IDB" from the transmission-use key table 626, and reads the encryption key "KencB" and the decryption key information "KinfB" included in the selected transmission-use key information set 628 (Step S153).

The control unit 607 outputs the cryptosystem identifier "IDB" indicating the cryptosystem for signature generation and the read encryption circuit file 631 "C", key circuit file 651 "KC" verification key file 671 "VeriC" and decryption key information "KinfB" to the signature generation unit 603, and instructs the signature generation unit 603 to generate signature data.

The signature generation unit 603 combines the received encryption circuit file 631 "C", key circuit file 651 "KC", verification key file 671 "VeriC" and decryption key information "KinfB" together, and substituting the combination result into a hash function to generate digest data (Step S156).

The signature generation unit 603 selects the signature key information set 693 including the received cryptosystem identifier "IDB" from the signature key table 691, and reads the signature key "Ksig_Bb" included in the selected signature key information set 693 (Step S157). Using the read signature key "Ksig_Bb", the signature generation unit 603 applies an encryption algorithm in accordance with the RSA cryptosystem indicated by the cryptosystem identifier "IDB" to the generated digest data, to generate signature data (Step S158). The signature generation unit 603 outputs the generated signature data to the control unit 607.

The control unit 607 generates a signature file including the server ID "001B" indicating the cryptosystem management server 600, the cryptosystem identifier "IDB" indicating the cryptosystem for signature generation, and the signature data (Step S161).

Next, using the read encryption key "KencB", the control unit 607 encrypts the read encryption circuit file 631 "C", key circuit file 651 "KC" and verification key file 671 "VeriC" by applying an encryption algorithm in accordance with the RSA cryptosystem indicated by the cryptosystem identifier "IDB" thereto, to generate an encrypted encryption circuit file "EncB (C, KencB)", an encrypted key circuit file "EncB(KC, KencB")" and an encrypted verification key file "EncB(VeriC, KencB)" (Step S162).

Next, the control unit 607 transmits, via the transmission/reception unit 601, the generated encrypted encryption circuit file "EncB (C, KencB)", encrypted key circuit file "EncB (KC, KencB") and encrypted verification key file "EncB (VeriC, KencB), the cryptosystem identifier "IDB" indicating the cryptosystem used for the encryption of these files, the decryption key information "KinfB" and the signature file to the content playback apparatus 100 (Step S163).

The control unit 116 of the content playback apparatus-100 receives, via the program acquisition unit 106, the encrypted encryption circuit file 681 "EncB(C, KencB)", the encrypted key circuit file 682 "EncB(KC, KencB"), the encrypted verification key file 683 "EncB (VeriC, KencB), the cryptosystem identifier 684 "IDB", the decryption key information 685 "KinfB" and the signature file 686 (Step S163).

Upon receiving these files, the control unit 116 outputs the received cryptosystem identifier 684 "IDB" to the selection unit 114, and instructs the selection unit 114 to read a key generation circuit program. The selection unit 114 selects the key circuit file 146 "KB" including the received cryptosystem identifier "IDB", and reads the cryptosystem identifier "IDB" and the key generation circuit program 148 "KgenB" from the selected key circuit file 146 "KB" (Step S166).

Also, the control unit 116 outputs the received cryptosystem identifier 684 to the selection unit 113, and instructs the selection unit 113 to read a decryption circuit program. The selection unit 113 selects the encryption circuit file 136 "B" including the received cryptosystem identifier "IDB", and reads the cryptosystem identifier 137 "IDB" and the decryption circuit file 139 "DecB" from the selected encryption circuit file 136 "B" (Step S167).

The combination check unit 118 compares the cryptosystem identifiers respectively read by the selection units 113 and 114. If they are not the same (NO in Step S169), the combination check unit 118 outputs an NG signal to the control unit 116 and returns to Step S166. If they are the same (YES in Step S169), the combination check unit 118 outputs an OK signal to the control unit 116.

Upon receiving the OK signal, the control unit 116 instructs the selection unit 114 to output the read program. Upon receiving the instruction for output, the selection unit 114 outputs the read key generation circuit program 148 to the changeable circuit 108, and the configuration mechanism 123 of the changeable circuit 108 configures the key generation circuit 151 within the FPGA 122, in accordance with the key generation circuit program 148 "KgenB" (Step S171).

Upon the configuration of the key generation circuit 151, the control unit 116 instructs the key generation circuit 151 to generate a device key.

In accordance with the instruction from the control unit 116, the key generation circuit 151 generates a 128-bit device key "DevB" corresponding to the RSA cryptosystem, and writes the generated device key "DevB" in the device key storage unit 103 (Step S172).

Upon completion of, the generation of the device key "DevB", the control unit 116 instructs the selection unit 113 to output the read program.

Upon receiving the instruction for output, the selection unit 113 outputs the read decryption circuit program 139 "DecB" to the changeable circuit 108. The configuration mechanism 123 of the changeable circuit 123 configures the decryption circuit 156 within the FPGA 122, in accordance with the decryption circuit program 139 "DecB" output by the selection unit 113 (Step S173). Note that if the device key "DevB" has already been stored in the device key storage unit 103, the Steps S166 and S169 to S172 are to be omitted. Furthermore, if the decryption circuit corresponding to the cryptosystem indicated by the cryptosystem identifier "IDB" has already been configured within the changeable circuit 108, Steps S166 to S173 are to be omitted.

Next, the control unit 116 outputs the received key information 685 "KinfB" to the key processing unit 157 of the decryption circuit 156, and outputs, the received encrypted encryption circuit file 681 "EncB(C, KencB)", encrypted key circuit file 682 "EncB(KC, KencB") and encrypted verification key filed 683 "EncB(VeriC, KencB) to the decryption unit 158 and instructs the decryption unit 158 to decrypt these files.

The key processing unit 157 reads the device key "DevB" from the device key storage unit 103, generates a decryption key "KdecB" based on the device key "DevB" and the key information "KinfB", and outputs the decryption key "KdecB" to the decryption unit 158 (Step S174).

The decryption unit 158 acquires the decryption key "KdecB" from the key processing unit 157. Then, using the acquired decryption key "KdecB", the decryption unit 158 generates an encryption circuit file "C", a key circuit file "KC" and a verification key file "VeriC" by applying a decryption algorithm in accordance with the RSA cryptosystem to the encrypted encryption circuit file "EncB (C, KencB)", the encrypted key circuit file "EncB(KC, KencB") and the encrypted verification key file "EncB (VeriC, KencB) received from the control unit 116 (Step S176). The decryption unit 158 writes the generated files into the main storage unit 107 (Step S177).

Upon the writing of the encryption circuit file "C", the key circuit file "KC" and the verification key file "VeriC" into the main storage unit 107, the control unit 116 instructs the legitimacy check unit 112 to verify the signature data included in the received signature file.

In accordance with the instruction from the control unit 116, the legitimacy check unit 112 verifies the signature data (Step S178).

If the signature verification by the legitimacy check unit 112 has failed (NO in Step S181), the control unit 116 returns to Step S148 and retransmits the introduction request to the cryptosystem management server 600 via the program acquisition unit 106.

If the signature verification has succeeded (YES in Step S181), the control unit 116 instructs the legitimacy check unit 112 to perform writing of the encryption circuit file "C" and the key circuit file "KC".

The legitimacy check unit 112 writes the encryption circuit file "C" into the encryption circuit storage unit 117, and writes the key circuit file "KC" into the key circuit storage unit 119 (Step S182).

Next, the control unit 116 instructs the legitimacy check unit 112 to update the check information table 201.

Upon being instructed to update the check information table 201, the legitimacy check unit 112 newly generates, based on the verification key file "VeriC", a check information set including the cryptosystem identifier "IDC", the server ID "001A" and the verification key "Kve_Ca", and a check information set including the cryptosystem identifier "IDC", the server ID "001B" and the verification key "Kve_Cb" (Step S183), and adds the generated two check information sets into the check information table 201 (Step S184).

Next, the control unit 116 generates a availability information set including the cryptosystem identifier "IDC" and the usage flag "1" included in the encryption circuit file "C", and adds the generated availability information set into the available-cryptosystem table 166 (Step S186).

Next, the control unit 116 detects the encryption circuit file 131 "A" including the cryptosystem identifier "IDA" from the encryption circuit storage unit 117, and deletes the encryption circuit program 133 "EncA" from the detected encryption circuit file 131 "A" (Step S188).

Next, the control unit 116 selects the availability information set 171 including the cryptosystem identifier "IDA" from the available-cryptosystem table 166 stored in the main storage unit 107, and change the usage flag included in the selected availability information set 171 to "0" (Step S189).

(3) Verification as to Playability

Upon detecting via the content acquisition unit 101 that the DVD 400a or 400b is attached, the control unit 116 verifies whether the content playback apparatus 100 can play back the content recorded on the attached DVD.

Figure 25:
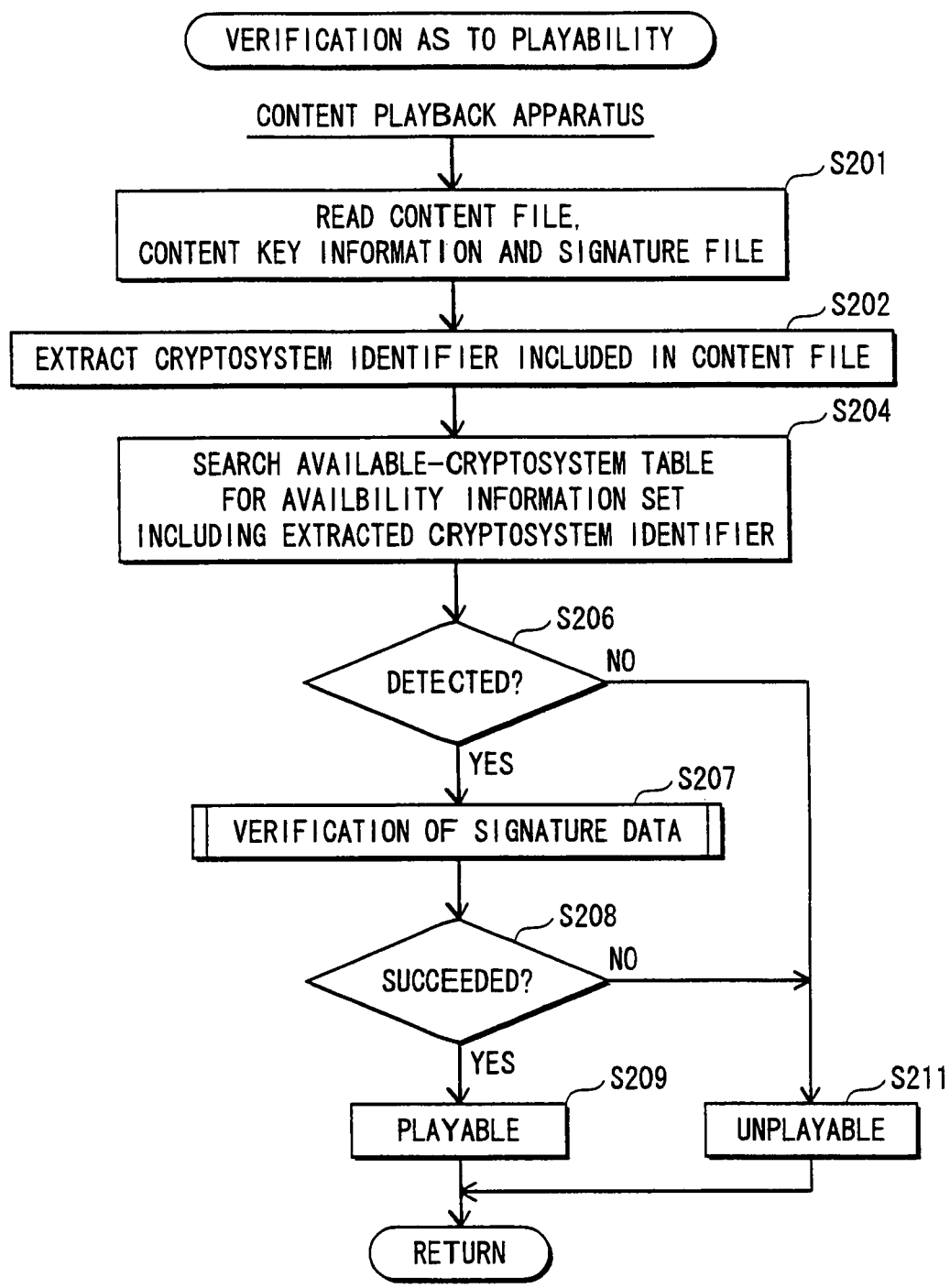
FIG. 25 is a flowchart showing verification operations performed by the content playback apparatus 100 to judge whether an acquired content is playable.

FIG. 25 is a flowchart showing operations for this verification performed by the content playback apparatus 100. FIG. 25 is generalized, and ignores which between the DVD 400a and the DVD 400b the attached DVD is.

The following describes the verification as to whether the content recorded on the attached DVD is playable or not, with reference to FIG. 25. FIG. 25 shows the details of Step S124 in FIG. 20

The control unit 116 reads, via the content acquisition unit 101, a content file, content key information and a signature file from the attached DVD (Step S201). Next, the control unit 116 extracts a cryptosystem identifier included in the content file (Step S202), and searches the available-cryptosystem table 166 stored in the main storage unit 107 for an availability information set including an cryptosystem identifier that is the same as the extracted cryptosystem identifier (Step S204). Here, if such an availability information set is not detected (NO in Step S206), the control unit 116 judges that the content is not playable (Step S211).

If such an availability information set is detected (YES in Step S206), the control unit 116 outputs the read content file, content key information and signature file to the legitimacy check unit 112, and instructs the legitimacy check unit 112 to verify signature data included in the signature file.

The legitimacy check unit 112 verifies the signature data using the cryptosystem indicated by the cryptosystem identifier included in the signature file (Step S207). Operations for verifying the signature data are described later.

If the verification of the signature data has succeeded (Step S208), the control unit 116 judges that the content is playable (Step S209). If the verification of the signature data has failed, the control unit 116 judges that the content is not playable (Step S211).

(4) Verification of Signature Data

The legitimacy check unit 112 receives, from the control unit 116, various types of information and a signature file including signature data generated based on the information, and is instructed to verify the signature data. Upon receiving the instruction from the control unit 116, the legitimacy check unit 112 controls the selection unit 113 and the changeable circuit 108 to verify the signature data.

Figure 26:
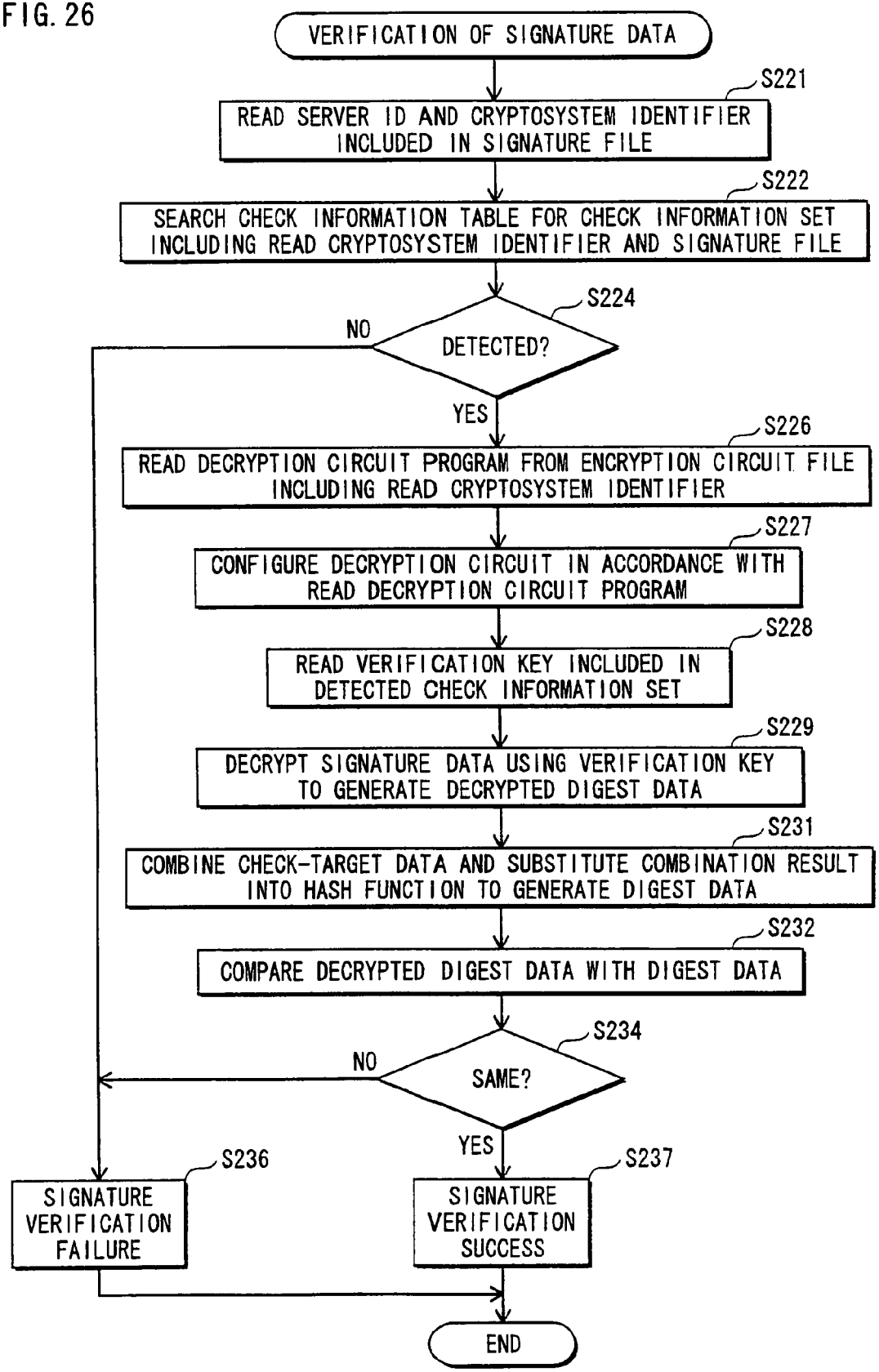
FIG. 26 is a flowchart showing operations relating to verification of signature data.

FIG. 26 is a flowchart showing operations for verifying signature data. The following describes the operations for verifying signature data, with reference to FIG. 26. This flowchart shows the details of Step S178 of FIG. 23 and Step S207 of FIG. 25.

Note that the flowchart is generalized and the various types of information that the legitimacy check unit 112 receives with the signature file are simply described as check-target data. The combination of the various types of information and the signature data is, specifically, a combination of the content file and the content key information, read from the DVD, and the signature data, and a combination of the encryption circuit file relating to the cryptosystem to be newly introduced, the key circuit file, the verification key file and the decryption key information and the key file.

The legitimacy check unit 112 reads a server ID and a cryptosystem identifier included in the signature file (Step S221). Next, the legitimacy check unit 112 searches, from the check information table 201 stores therein, a check information set including the read cryptosystem identifier and server ID (Step S222). If such a check information set is not detected (NO in Step S224), the legitimacy check unit 112 outputs a verification failure notification showing that the verification of the signature data has failed to the control unit 116 (Step S236).

If such a check information set is detected (YES in Step S224), the legitimacy check unit 112 outputs the read cryptosystem identifier to the selection unit 113, and instructs the selection unit 113 to read and output a decryption circuit program.

In accordance with the instruction from the legitimacy check unit 112, the selection unit 113 reads a decryption circuit program corresponding to the received cryptosystem identifier (Step S226), and outputs the read decryption circuit program to the changeable circuit 108.

The configuration mechanism 123 of the changeable circuit 108 configures the decryption circuit 156 by reconfiguring the FPGA 122, in accordance with the received decryption circuit program (Step S227).

Upon the configuration of the decryption circuit 156, the legitimacy check unit 112 reads a verification key included in the detected check information set (Step S228), and outputs signature data included in the signature file and the read verification key to the decryption unit 158 of the configured decryption circuit 156, and instructs the decryption circuit 156 to perform decryption.

Using the verification key, the decryption unit 158 decrypts the signature data in accordance with the instruction from the legitimacy check unit 112, to generate decrypted digest data (Step S229). The decryption unit 158 outputs the generated decrypted digest data to the legitimacy check unit 112.

The legitimacy check unit 112 generates digest data by substituting a combination of pieces of the check-target data into a hash function (Step S231). The legitimacy check unit 112 compares the generated digest data and the decrypted digest data output by the decryption unit 158 (Step S232). If they are the same (YES in Step S234), the legitimacy check unit 112 outputs a verification success notification indicating that the signature verification has succeeded to the control unit 116 (Step S237).

If they are not the same (NO in Step S234), the legitimacy check unit 112 outputs a verification failure notification indicating that the signature verification has failed to the control unit 116 (Step S236).

(5) Playback of Content

Figure 27:
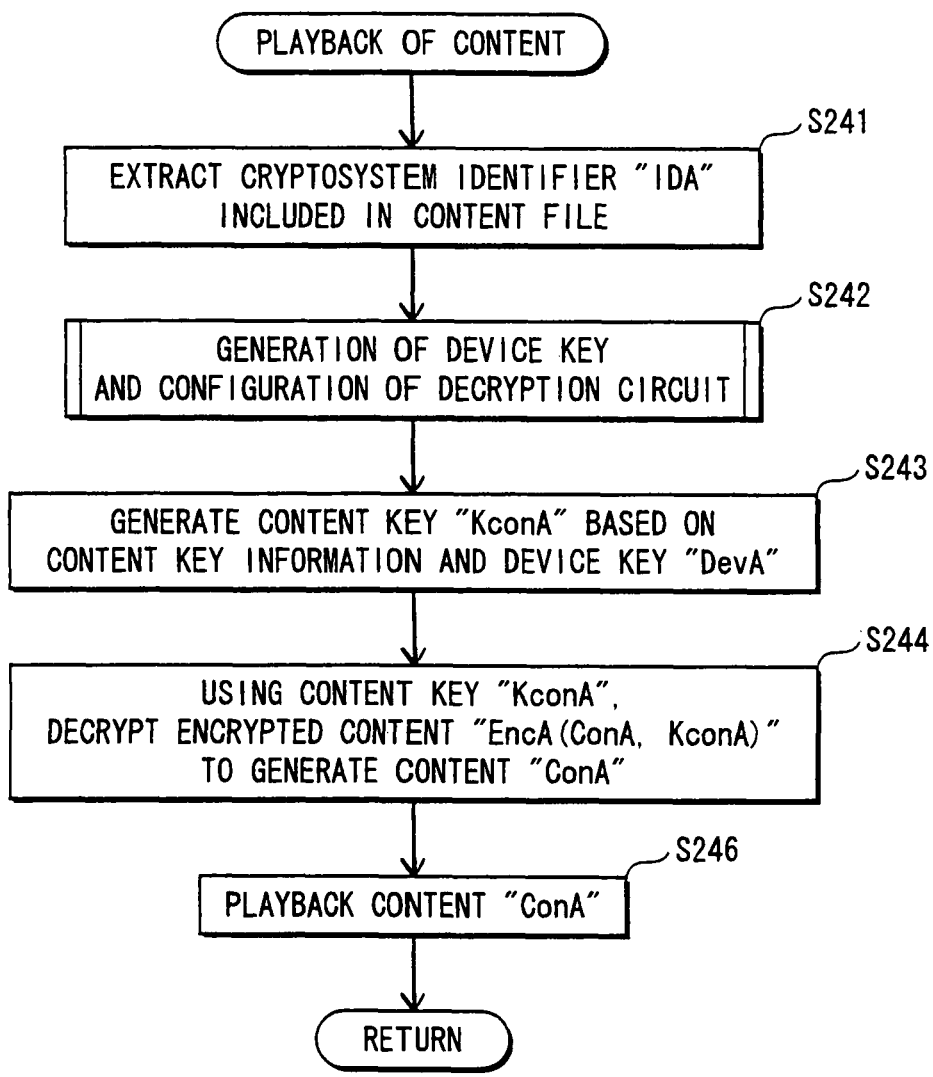
FIG. 27 is a flowchart showing operations for playing back a content.

FIG. 27 is a flowchart showing operations for playing back a content performed by the content playback apparatus 100. Although the following describe the case where the DVD 400a is attached to the content playback apparatus 100, the same operations are performed in the case the DVD 400b is attached.

The following explain operations for playing back a content, with reference to FIG. 27. Note that FIG. 27 shows the details of Step S131 of FIG. 20.

Upon receiving an operation instruction information indicating playback of a content from the input unit 121, the control unit 116 extracts the cryptosystem identifier 402 "IDA" included in the read content file 401 (Step S241). Next, the control unit 116 controls the selection units 113 and 114, the combination check unit 118 and the changeable circuit 108 to generate a device key "DevA" corresponding to the cryptosystem identifier "IDA" and configure the decryption circuit 156 (Step S242). The generation of the device key and the configuration of the decryption circuit are performed in the same manner as in Step S166 to Step S173 of FIG. 22. Therefore, explanations thereof are omitted here.

Next, the control unit 116 outputs the read content key information 404 to the key processing unit 157 of the configured decryption circuit 156, and outputs the encrypted content 403 to the decryption unit 158 and instructs the decryption unit 158 to decrypt the encrypted content 403.

Upon receiving the content key information 404, the key processing unit 157 reads the device key 128 "DevA" from the device key storage unit 103, and generates a content key "KconA" based on the read device key 128 "DevA" and the content key information 404 (Step S243).

The decryption unit acquires the content key "KconA" from the key processing unit 157, and decrypts the encrypted content 403 using the acquired content key "KconA" to generate a content "ConA" (Step S244). In accordance with an instruction from the control unit 116, the decryption unit 158 outputs the generated content to the playback processing unit 109.

Upon receiving the content "ConA", the playback processing unit 109 plays back the received content on the monitor 15 (Step S246).

(6) Output of Content to Memory Card

Figure 28:
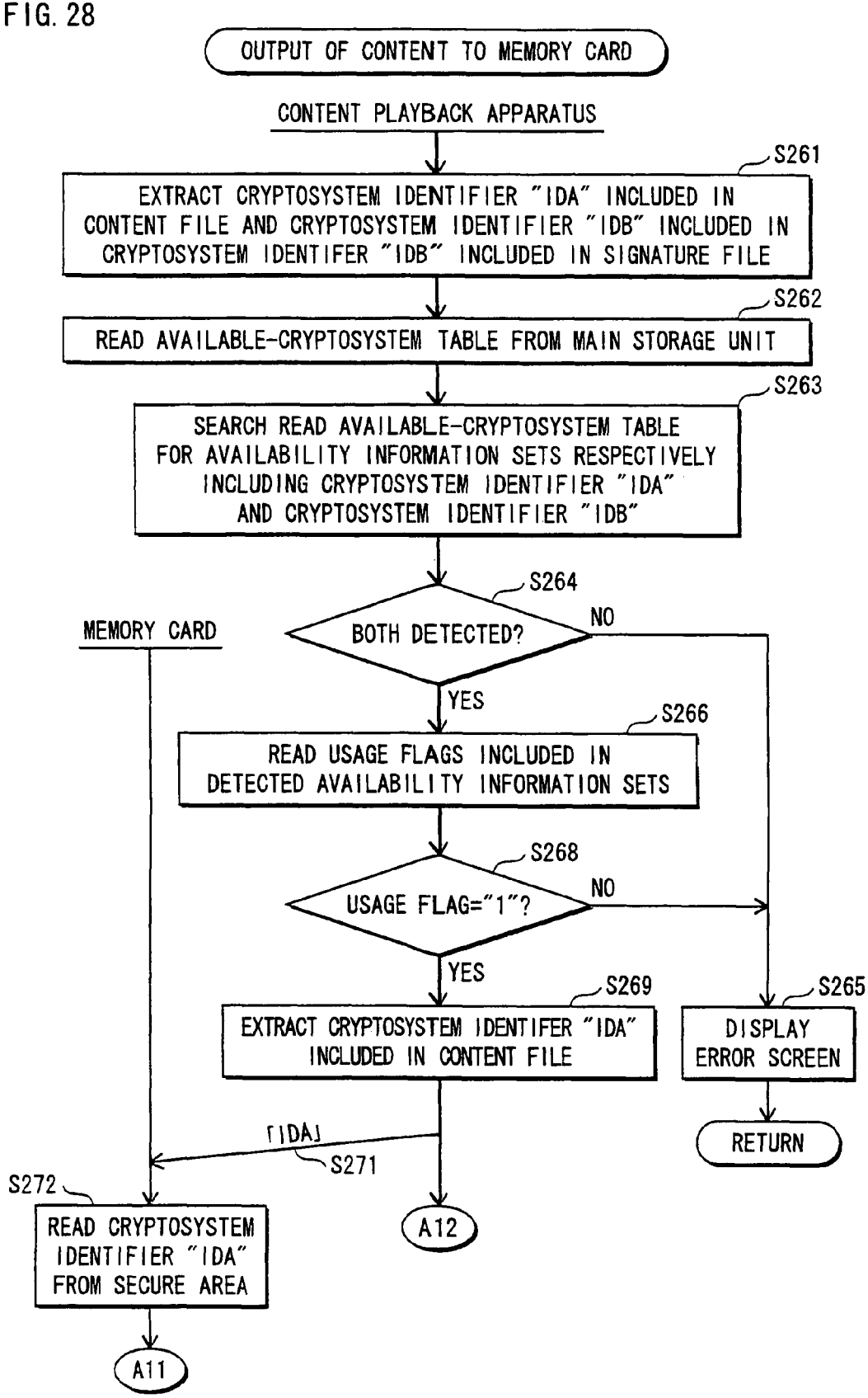
FIG. 28 is a flowchart showing operations for outputting a content to a memory card.
Figure 29:
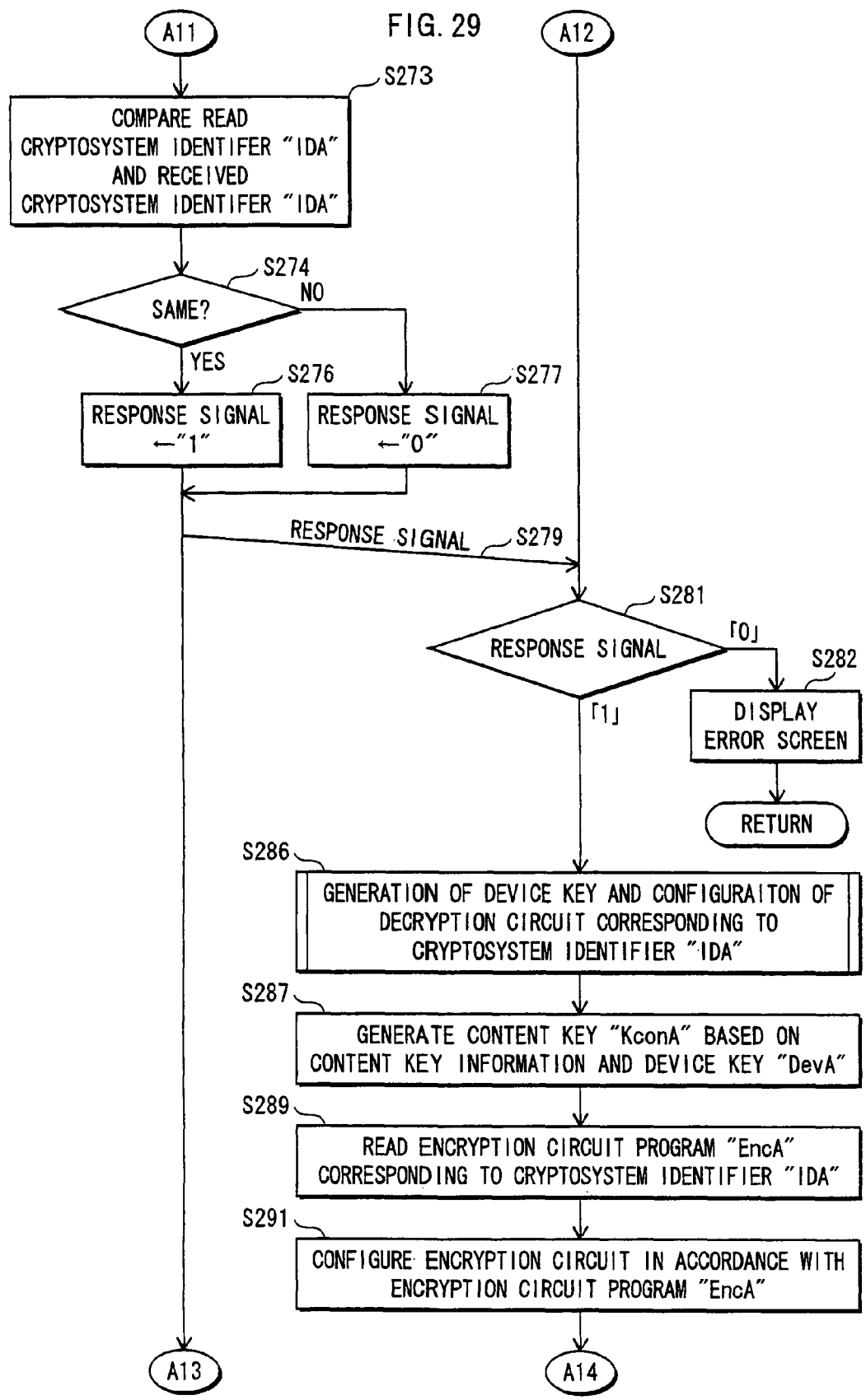
FIG. 29 is a flowchart showing operations for outputting a content to a memory card, which is continued from FIG. 28.
Figure 30:
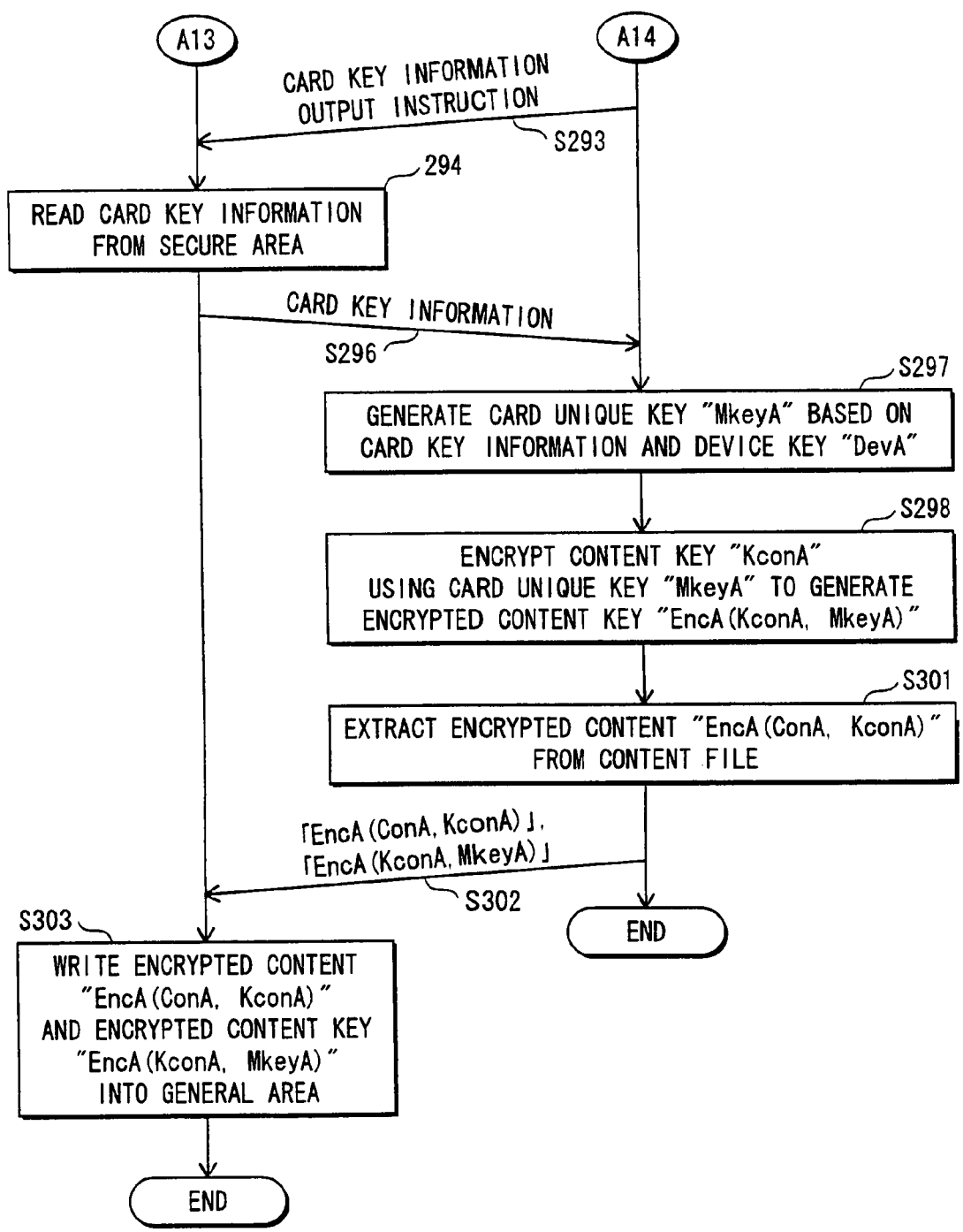
FIG. 30 is a flowchart showing operations for outputting a content to a memory card, which is continued from FIG. 28.

FIG. 28 to FIG. 30 are flowcharts showing operations performed by the content playback apparatus 100 for outputting the content to the memory card 500. The following explain the operations for outputting the content, with reference to FIG. 28 to FIG. 30. These flowcharts show the details of Step S132 of FIG. 20. In the following, the case where the DVD 400a and the memory card 500 storing the cryptosystem identifier "IDA" is attached to the content playback apparatus 100. However, the same operations are performed in the case the DVD 400b is attached, and the case a memory card storing other cryptosystem identifier is attached.

Upon being instructed by the user to copy the content, the control unit 116 extracts the cryptosystem identifier 402 "IDA" included in the content file 401 and the cryptosystem identifier 413 "IDB" included in the signature file 411 (Step S261). Next, the control unit 116 reads the available-cryptosystem table 166 from the main storage unit 107 (Step S262), and searches the read available-cryptosystem table 166 for availability information sets respectively including the cryptosystem identifier "IDA" and the cryptosystem identifier "IDB" (Step S263).

If any one of such availability information sets is not detected (NO in Step S264), the control unit 116 generates an error screen showing that it is impossible to copy the content, and displays the error screen on the monitor 15 via the playback processing unit 109 (Step S265).

If the availability information sets 171 and 172 are detected (YES in Step S264), the control unit 116 reads the usage flags included in the detected availability information sets 171 and 172 respectively (Step S266). If any one of the usage flags is "0" (NO in Step S268), the control unit 116 displays an error screen showing that it is impossible to copy the content recorded on the attached DVD (Step S265).

If both of the read usage flags are "1" (YES in Step S268), the control unit 116 extracts the cryptosystem identifier 402 "IDA" from the content file 401 (Step S269), and outputs the extracted cryptosystem identifier 402 "IDA" to the memory card 500 via the input/output unit 104, and inquires whether the cryptosystem indicated by the cryptosystem identifier 402 "IDA" is stored in the memory card 500 (Step S271).

The control unit 507 of the memory card 500 receives the cryptosystem identifier "IDA" from the content playback apparatus 100 via the input/output unit 502, and is inquired as to whether the control unit 507 stores the cryptosystem indicated by the received cryptosystem identifier "IDA".

Upon being inquired, the control unit 507 reads the cryptosystem identifier 521 stored in the secure area 520 (Step S272). The control unit 507 compares the read cryptosystem identifier 521 and the received cryptosystem identifier "IDA" (Step S273). If they are the same (YES in Step S274), the control unit 507 generates a response signal "1", which means that the control unit 507 can decrypt the encrypted text encrypted in accordance with the cryptosystem indicated by the received cryptosystem identifier (Step S276).

If they are not the same (NO in Step S274), the control unit 507 generates a response signal "0", which means that the control unit 507 can not decrypt the encrypted text encrypted in accordance with the cryptosystem indicated by the received cryptosystem identifier (Step S277). Next, the control unit 507 outputs the generated response signal to the content playback apparatus 100 via the input/output unit 502 (Step S279).

The control unit 116 of the content playback apparatus 100 receives the response signal from the memory card 500, via the input/output unit 104. If the received response signal is "0" ("0" in Step S281), the control unit 116 generates an error screen showing that it is impossible to perform the request copy, and displays the error screen on the monitor 15 (Step S282).

If the received response signal is "1" ("1" in Step S281), the control unit 116 controls the selection units 113 and 114, the combination check unit 118 and the changeable circuit 108 to generate a device key "DevA" corresponding to the cryptosystem identifier 402 "IDA" read from the content file 401, and configure, within the changeable circuit 108, a decryption circuit that performs decryption, in accordance with the cryptosystem identifier "IDA" (Step S286). The details of Step S287 are the same as Step S166 to S173, where in FIG. 22, the cryptosystem identifier "IDB" should read as "IDA", the key circuit file "KB" should read as "KA", the key generation circuit program "KgenB" should read as "KgenA", and the decryption circuit program "DecB" should read as "DecA".

Next, the control unit 116 outputs the read content key information 404 to the key processing unit 157 of the configured decryption circuit 156, and instructs the key processing unit 157 to generate a content key.

The key processing unit 157 generates the content key "KconA" based on the content key information 404 and the device key "DevA" (Step S287).

Next, the control unit 116 instructs the selection unit 113 to read and output an encryption circuit program corresponding to the cryptosystem identifier 402 "IDA".

In accordance with the instruction from the control unit 116, the selection unit 113 reads the encryption circuit program 133 "EncA" corresponding to the cryptosystem identifier 402 "IDA" (Step S289), and outputs the read encryption circuit program 133 "EncA" to the changeable circuit 108.

The configuration mechanism 123 of the changeable circuit 108 configures the encryption circuit 152 in accordance with the encryption circuit program 133 "EncA" (Step S291).

Upon configuration of the encryption circuit 152, the control unit 116 instructs, via the input/output unit 104, the memory card 500 to output card key information (Step S293).

Upon being instructed by the content playback apparatus 100 via the input/output unit 502 to output the card key information, the control unit 507 of the memory card 500 reads the card key information 522 from the secure area 520 (Step S294). The control unit 507 outputs the read card key information 522 to the content playback apparatus 100 via the input/output unit 502 (Step S296).

The control unit 116 of the playback apparatus 100 acquires the card key information from the memory card 500 via the input/output unit 104, outputs the acquired card key information to the key processing unit 153 of the encryption circuit 152, and outputs the content key "KconA" to the encryption unit 154 and instructs the encryption unit 154 to encrypt the content key "KconA".

The key processing unit 153 reads the device key "DevA" from the device key storage unit 103, and generates a card unique key "MkeyA" based on the read device key "DevA" and the card key information (Step S297). The encryption unit 154 acquires the card unique key "MkeyA" from the key processing unit 153, and encrypts the content key "KconA" using the acquired card unique key "MkeyA" to generate an encrypted content key "EncA(KconA, MkeyA)" (Step S298).

Upon generation of the encrypted content key "EncA(KconA, MkeyA)" by the encryption unit 154, the control unit 116 extracts the encrypted content 403 "EncA(ConA, KconA)" from the content file 401 (Step S301), and outputs the extracted encrypted content 403 "EncA (ConA, KconA)" and the encrypted content key "EncA (KconA, Mkey A)" to the memory card 500 via the input/output unit 104 (Step S302).

The control unit 507 of the memory card 500 receives the encrypted content "EncA (ConA, KconA)" and the encrypted content key "EncA (KconA, MkeyA)" from the content playback apparatus 100, generates a content file including the received encrypted content "EncA(ConA, KconA)" and the encrypted content key "EncA(KconA, MkeyA)", and writes the generated content file in the general area 512 (Step S303).

2. Other Modification Examples

The present invention is described above based on the first embodiment. However, the present invention is not limited to this. The following are possible modification examples.

(1) In the first embodiment, for simplifying explanations, the content playback apparatus 100 stores the DES cryptosystem and the RSA cryptosystem at the time the content playback apparatus 100 is manufactured. However, the content playback apparatus 100 may store more than three cryptosystems.

If this is the case, if any of the cryptosystems is broken, the cryptosystem management server 600 selects one of the cryptosystems that is not broken. The cryptosystem management server 600 encrypts the encryption circuit file, the key circuit file and the verification key file corresponding to the cryptosystem as an alternative to the broken cryptosystem, and transmits them to the content playback apparatus 100.

Also, the signature data may be generated using a cryptosystem that is different from the cryptosystem used for encryption.

Moreover, although the cryptosystems stored in the content playback apparatus 100 is used for encryption and decryption of contents and verification of signature data in the first embodiment, use of the cryptosystems is not limited to these. The cryptosystems may be used for various purposes, such as key sharing and apparatus authentication.

(2) In the case of the modification example (1), the cryptosystem management server 600 may select the cryptosystem used for encryption and generation of signature data in the following manner, for example: The cryptosystem management server 600 stores cryptographic strength for each cryptosystem, and selects the cryptosystem with the highest strength among the non-broken cryptosystems. Also, the cryptosystem management server 600 may select the newest cryptosystem among them.

The content playback apparatus 100 may select the cryptosystem used for the encryption and the generation of the signature data, and transmit the cryptosystem identifier of the selected cryptosystem to the cryptosystem management server 600.

If this is the case, the content playback apparatus 100 may select the cryptosystem in the following manner, for example: The content playback apparatus 100 may store time and data of introduction for each cryptosystem, and select the cryptosystem with the most recent time and data. Also, the content playback apparatus 100 may receive selection of cryptosystem by the user.

(3) In the first embodiment, when the cryptosystem management server 600 transmits the encrypted key circuit and the like, the signature file including the signature data is generated using a cryptosystem that is not broken. However, this is just an example, and the present invention is not limited to this.

In the first embodiment, the cryptosystem management server 600 transmits, when introducing the new cryptosystem, the verification key file including the verification key corresponding to the new cryptosystem in view of the possibility that the new cryptosystem is used for the signature verification. However, the transmission of the verification key file is not essential. If the new cryptosystem is not used for the signature verification, the transmission of the verification key file is unnecessary.

Also, if the new cryptosystem is a public-key cryptosystem, the verification key may be transmitted without encryption because the verification key is the public key of each server.

(4) In the first embodiment, for the verification of the signature data, the decryption circuit is configured in the changeable circuit 108, and the decryption circuit performs part of the processing for verifying the signature data. However, a verification circuit, which is for performing the series of the signature verification processing, may be configured in the changeable circuit 108, and the verification circuit may perform the verification of the signature data. If this is the case, it is unnecessary to transmit and receive the verification key file to introduce a cryptosystem.

(5) The first embodiment is an example in which the cryptosystems used for the encryption and the decryption are focused on. In the first embodiment, even in the case where the cryptosystem used for the generation and the verification of the signature is broken, a new cryptosystem is to be introduced. In this case, the verification key file is acquired from the cryptosystem management server 600 in view of the possibility that the new cryptosystem is used for the generation and the verification of the signature.

However, in the case of the modification example (4), in addition to the change of the cryptosystem used for the encryption and the decryption, the signature method may be changed. In the following explanation, the "signature method" means a series of procedures for generating the signature data and a series of procedures for verifying the signature data.

Figure 31:
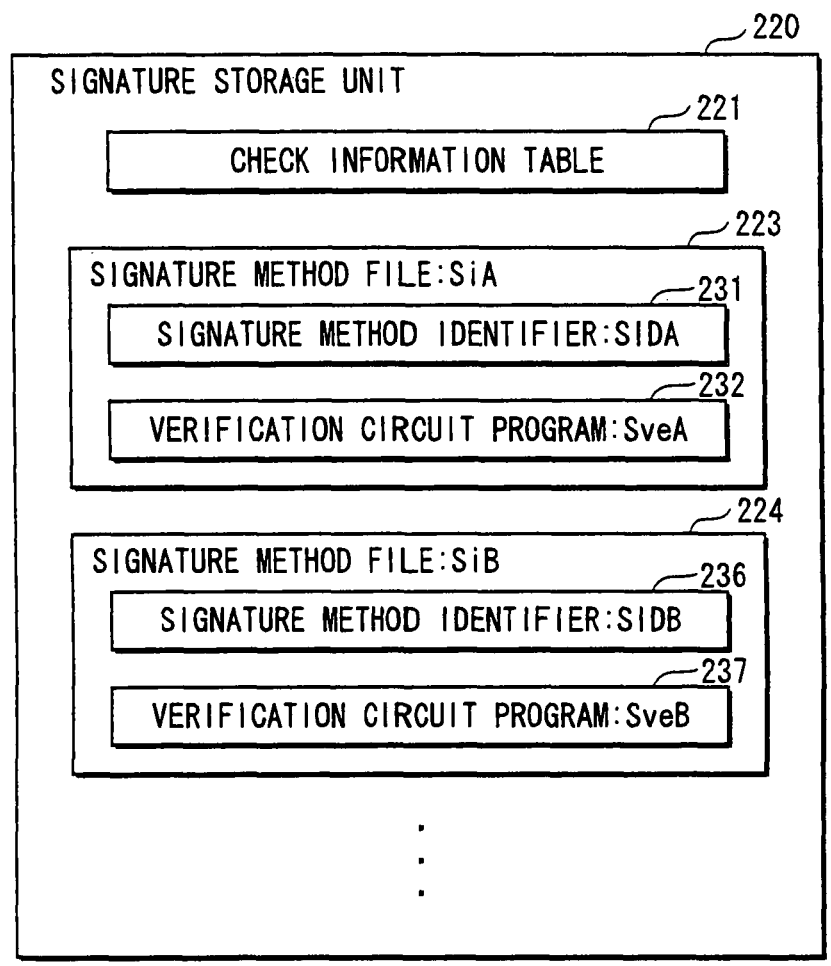
FIG. 31 is an example of information stored in a signature storage unit 220.

Specifically, if this is the case, the content playback apparatus 100 includes a signature storage unit 220 instead of the legitimacy check unit 112. As FIG. 31 shows, the signature storage unit 220 stores a check information table 221 and a plurality of signature method files 223, 224 . . . . The check information table 221 has the structure that is similar to the structure of the check information table 201 described in the first embodiment. However, each check information set of the check information table corresponds to any of signature methods, and includes a signature method identifier indicating a corresponding signature method, instead of the cryptosystem identifier.

Each signature file corresponds to any of the signature methods, and includes a signature method identifier indicating a corresponding signature method and a verification circuit program. The verification circuit program shows the structure of the verification circuit having a function of verifying the signature data generated in accordance with the signature method indicated by the signature method identifier.

The cryptosystem management server 600 also manages security relating to the signature methods. The cryptosystem management server 600 stores a signature file "SiC" and a verification key file. These signature file "SiC" and the verification key relate to a new signature method used as an alternative signature method if any of the signature methods is broken and it becomes easy to tamper with the signature. The signature file "SiC" includes a signature method identifier "SIDC" and a verification circuit program "SveC". The verification key file is similar to the verification key file 671 shown in FIG. 5C, but includes a signature method identifier "SIDC" instead of the cryptosystem identifier 672. Here, it is assumed that a signature method indicated by a signature method identifier "SIDA" has been broken.

For introducing a new signature method, the content playback apparatus 100 receives the verification key file and the signature file "SiC" corresponding to the new signature method, signature data generated by applying a signature to the verification key file and the signature file "SiC" in accordance with a signature method corresponding to a signature method identifier "SIDB", and the signature identifier "SIDB" indicating a signature method used for generating the signature data.

The control unit 116 reads a verification circuit program 237 corresponding to a signature method identifier that is the same as the received signature method identifier "SIDB", and outputs the read verification circuit program 237 to the changeable circuit 108.

Upon configuration of the verification circuit corresponding to the signature method identifier "SIDB" within the changeable circuit 108, the control unit 116 outputs the received signature file "SiC", verification key file and signature data to the verification circuit, and instructs the verification circuit to perform the signature verification.

If the verification succeeds, the control unit 116 writes the received signature file in the signature storage unit 220 generates a new check information set based on the received verification file, and adds the generated check information set into the check information table 221.

Note, if the information to be transmitted/received includes information to be kept secret, that the information may be encrypted before the transmission/reception.

(6) Instead of a signature method, a MAC (Message Authentication Code) generation/verification method may be introduced. If the is the case, in the same manner as the modification example (5), a server apparatus-managing the MAC generation/verification method stores a plurality of MAC verification circuit programs, each showing the structure of a circuit for performing MAC verification and corresponding to a different MAC generation/verification method.

If any of the MAC generation/verification methods becomes unavailable for a certain reason (e.g. because a one-way function used for generating MAC has been broken and a method for the inverse operation has been found), the server apparatus acquires a MAC verification program corresponding to a new MAC generation/verification method. For the acquisition, the server apparatus receives MAC information generated in accordance with an effective MAC generation/verification method, together with a new MAC verification program. Based on the received MAC information, the server apparatus confirms that the received new MAC verification program has not been tampered with.

(7) Not only the signature method and the verification MAC generation/verification method, but a method for key sharing and a method for apparatus authentication may be introduced, and a key sharing program defining the structure of a common-key generation circuit corresponding to a new key sharing method and an authentication circuit program corresponding to a new apparatus authentication method may be acquired.

In the case of the key sharing method, the content playback apparatus 100 stores key sharing circuit programs each corresponding to a different key sharing method. Each key sharing circuit program is in a format that is decodable by the configuration mechanism of the changeable circuit 108, and shows the structure of a key sharing circuit that performs key sharing with an external apparatus through procedures in accordance with a corresponding key sharing method.

In the same manner as the case of the cryptosystem management server 600, a server apparatus that manages the key sharing methods stores a key sharing circuit program corresponding to a new key sharing method.

For acquiring the key sharing circuit program corresponding to the new key sharing method, the content playback apparatus 100 configures a key sharing circuit in accordance with any of the key sharing circuit programs that the content playback apparatus 100 has already stored, and generates a common key with the server apparatus, using the configured key sharing circuit.

Using the generated common key, the server apparatus generates an encrypted key sharing circuit program by encrypting the key sharing circuit program corresponding to the new key sharing method, and transmits the encrypted key sharing circuit program to the content playback apparatus 100.

The content playback apparatus 100 receives the encrypted key sharing program, and decrypts the received encrypted key sharing program using the generated share key to acquire the key sharing circuit program corresponding to the new key sharing method.

Also in the case of the apparatus authentication method, the content playback apparatus 100 prestores a plurality of apparatus authentication circuit programs each corresponding to a different authentication method. The content playback apparatus 100 configures a apparatus authentication circuit in accordance with any of the apparatus authentication circuit programs. Using the configured apparatus authentication circuit, the content playback apparatus 100 performs apparatus authentication with an external server apparatus. If the authentication succeeds, the content playback apparatus 100 receives an apparatus authentication circuit program corresponding to the new apparatus authentication method.

(8) In the explanations above, it is assumed that the changeable circuit 109 of the first embodiment includes the FPGA 122 that is configurable, the configuration mechanism 123 and the configuration ROM 124, and the selection units 113 and 114 outputs the read encryption circuit program and so on to the configuration mechanism 123 and the configuration ROM 124. However, the present invention is not limited to this.

The changeable circuit 108 may include only an FPGA and a configuration mechanism, and a configuration ROM attached to the FPGA may structure the encryption circuit storage unit 117 and the key circuit storage unit 119.

With this structure, the circuit configured within the changeable circuit disappears when the content playback apparatus 100 is turned off. When application of power is stated next time, firstly, the control unit 116 reads the changeable circuit information set 161 stored in the main storage unit 107. Then, based on the read changeable circuit information set 161, the control unit 116 instructs the selection units 113 and 114 and the configuration mechanism 123 to reconfigure the circuit configured within the changeable circuit 108 immediately before the power is turned off.

(9) In the first embodiment, the content playback apparatus 100 and the cryptosystem management server 600 are connected to the Internet 20, and the transmission and the reception of the encrypted encryption circuit file and so on is performed via the Internet 20. However, the present invention is not limited to this.

Since the cryptosystem management server 600 transmits the same encryption circuit file, the same key circuit file and the same signature circuit file to all the authorized content playback apparatuses, these files may be transmitted by a one-way communication, such as a broadcast wave.

(10) In the first embodiment, the series of operations for introducing a content is triggered by an instruction from the operator of the cryptosystem management server 600. However, the present invention is not limited to this.

For example, the content playback apparatus 100 may periodically transmit cryptosystem identifiers of cryptosystems stored therein, and inquires of cryptosystem management server 600 for checking whether any of the cryptosystems stored in the content playback apparatus 100 is broken. Upon receiving the inquiry, if the disabled-cryptosystem list 621 includes a cryptosystem identifier that is the same as any of the cryptosystem identifiers received from the content playback apparatus 100, the cryptosystem management server 600 transmits a warning notification including the cryptosystem identifier to the content playback apparatus 100.

In the first embodiment, the content playback apparatus 100 simply does not play back the content if the cryptosystem corresponding to the cryptosystem identifier included in the content file of the attached DVD is not stored therein. However, the content playback apparatus 100 may perform the above-described inquiry to the cryptosystem management server 600.

In the first embodiment and the modification examples above, the new cryptosystem is introduced if any of the cryptosystems stored in the content playback apparatus 100 is broken. However, even if none of the cryptosystems is broken, a new superior cryptosystem may be introduced if such a cryptosystem is developed.

(11) In the first embodiment, only the encryption circuit program corresponding to the broken cryptosystem is deleted, and the decryption circuit program and the key circuit file are left. This enables the content playback apparatus 100 to play back the contents distributed in the past to avoid putting the purchaser of the contents at a disadvantage.

However, it is possible to delete all the encryption circuit file and the key circuit file corresponding to the broken cryptosystem to completely prohibit playback of contents encrypted in accordance with the broken cryptosystem and contents attached with signature data generated in accordance with the broken cryptosystem. If this is the case, the check information set corresponding to the broken cryptosystem is to be deleted from the check information table 201.

(12) In the first embodiment and the modification examples, the changeable circuit 108 is described as being structured with an FPGA. However, the present invention is not limited to this. Other reconfigurable circuit may be used instead. A reconfigurable circuit is differently referred to depending on the circuit size, the structure of the internal logic circuit and so on, namely a PLD (Programmable Logic Device), a PLA (Programmable Array Logic), a CPLD (Complex Programmable Logic Device), a reconfigurable LSI and a dynamic reconfigurable LSI, and so on.

(13) In the first embodiment, the method using the media key block is applied to allow all the authorized playback apparatuses, each having a different device key, to acquire the content, and not to allow unauthorized apparatuses to acquire the content. However, other methods may be applied.

For example, it is possible to apply a technique of assigning, using a tree structure, a device key each including a plurality of pieces of key data to each apparatus, to allow authorized apparatuses to acquire contents using any of the pieces of key data.

(14) In the first embodiment, the content playback apparatus 100 prestores the encryption circuit files and the key circuit files respectively corresponding to cryptosystems. However, the content playback apparatus 100 may receive a required key circuit file when it becomes necessary for performing encryption processing such as decryption of a content.

For example, for decrypting the encrypted content 403 stored in the DVD 400a, the control unit 116 reads the cryptosystem identifier 402 from the content file 401, transmits the read cryptosystem identifier 402 to the cryptosystem management server 600 via the program acquisition unit 106 and requests the cryptosystem management server 600 to transmit the key circuit file.

The cryptosystem management server 600 stores key circuit files respectively corresponding to the cryptosystems. The control unit 607 receives a cryptosystem identifier from the content playback apparatus 100, and upon receiving the request for transmitting the key circuit file, reads the key circuit file corresponding to the cryptosystem indicated by the received cryptosystem identifier, and transmits the read key circuit file.

The control unit 116 of the content playback apparatus 100 receives the key circuit file from the cryptosystem management server 600, and outputs the key circuit generation program included in the received key circuit file to the changeable circuit 108.

Afterwards, in the same manner as in the first embodiment, the content playback apparatus 100 performs the generation of the device key, the configuration of the decryption circuit and the decryption of the encrypted content 403.

(15) In the first embodiment, to easily distribute the device key to each playback apparatus, the cryptosystem management server 600 distributes the key circuit file including the key generation circuit program to each of the playback apparatuses including the playback apparatus 100, and each playback apparatus configures the key generation circuit in accordance with the acquired key generation circuit program, and generates each device key using the key generation circuit. However, instead of the key circuit file, each device key may be individually distributed to each playback apparatus.

If this is the case, the cryptosystem management server 600 stores, for each apparatus, a device ID of the apparatus and device keys respectively corresponding to the cryptosystems.

The playback apparatus 100 transmits unique information, such as the ID of the content playback apparatus 100 and the device key used with the broken cryptosystem.

The cryptosystem management server 600 receives the unique information from the playback apparatus 100, and selects a device key that is unique to the content playback apparatus 100 and corresponds to the new cryptosystem based on the received unique information. The cryptosystem management server 600 encrypts and transmits the selected device key instead of the key circuit file.

(16) A part or all of the components included in each apparatus may be realized as one system LSI (Large Scale Integration). The system LSI is a super-multifunctional LSI manufactured by integrating a plurality of components on one chip. The system LSI is specifically a computer system structured from a microprocessor, a ROM, a RAM and the like, which are not illustrated. A computer program is stored on the RAM. The system LSI carries out functions as a result of the microprocessor operating in accordance with the computer program.

Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

(17) A part or all of the components included in each of the above-described apparatuses may be structured by an IC card or a single module which is attachable to the apparatus. The IC card or the module is a computer system structured from a microprocessor, a ROM, a RAM and the like. The IC card and the module may include the above-described super-multi-functional LSI. The IC card or the module carries out functions as a result of the microprocessor operating in accordance with a computer program. The IC card or the module may be tamper-resistant.

(18) The present invention may be methods shown by the above. Furthermore, the methods may be a computer program realized by a computer, and may be a digital signal of the computer program.

Furthermore, the present invention may be a computer-readable recording medium apparatus such as a flexible disk, a hard disk, a CD-ROM, an MO, a DVD, a DVD-ROM, a DVD RAM, a BD (Blu-ray Disc) or a semiconductor memory, that stores the computer program or the digital signal. Furthermore, the present invention may be the computer program or the digit al signal recorded on any of the aforementioned recording medium.

Furthermore, the present invention may be the computer program or the digital signal transmitted on an electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(19) The present invention may be any combination of the above-described embodiment and modifications.

INDUSTRIAL APPLICABILITY

The present invention can be used for business purposes, in other words, can be used repeatedly and continuously, in the industry of manufacturing and selling electrical apparatuses for performing encryption and decryption of various types of information, in the industry of manufacturing and selling information used by the apparatuses, and in the industry of providing various services using the information used by the apparatuses.

The invention claimed is:

1. A circuit configuration apparatus that reconfigures a reconfigurable logic circuit so as to configure an execution circuit, the circuit configuration apparatus comprising:
    a non-transitory memory that (i) stores computer executable instructions and (ii) stores a first circuit configuration information set that defines a first cryptographic processing circuit for executing cryptographic processing in accordance with a first cryptosystem used for a first content; and
    a processor that executes the computer executable instructions to function as:
        a configuration unit operable to reconfigure the reconfigurable logic circuit in accordance with a circuit configuration information set input thereto so as to configure the execution circuit;
        a reading unit operable to read the first circuit configuration information set from the non-transitory memory, and to output the first circuit configuration information set to the configuration unit;
        an acquisition unit operable to acquire a second circuit configuration information set that has been subject to cryptographic processing according to the first cryptosystem and that defines a second cryptographic processing circuit for executing cryptographic processing in accordance with a second cryptosystem used for a second content, the second cryptosystem being different from the first cryptosystem;
        a control unit operable to cause the first cryptographic processing circuit to decrypt the second circuit configuration information set that has been subject to encryption processing in accordance with the first cryptosystem and that has been acquired by the acquisition unit; and
        a writing unit operable to write the second circuit configuration information set into the non-transitory memory,
    wherein each of the first circuit configuration information set and the second circuit configuration information set stored in the non-transitory memory includes encryption processing circuit information and decryption processing circuit information, the encryption processing circuit information indicating a structure of an encryption processing circuit that executes encryption processing in accordance with the corresponding cryptosystem, and the decryption processing circuit information indicating a structure of a decryption processing circuit that executes decryption processing in accordance with the corresponding cryptosystem, and
    wherein the processor further functions as
        a deletion unit operable to delete, from the non-transitory memory, encryption processing circuit information included in a circuit configuration information set that corresponds to a cryptosystem that has been broken, without deleting decryption processing circuit information included in the circuit configuration information set.

2. The circuit configuration apparatus of claim 1, wherein the acquisition unit includes:
a reception subunit operable to receive instruction information that provides an instruction to introduce a new cryptosystem;
a notification subunit operable to notify an external apparatus of the first cryptosystem; and
a receiving subunit operable to receive, from the external apparatus, the encrypted second circuit configuration information set that has been subject to cryptographic processing according to the first cryptosystem and that defines the second cryptosystem as the new cryptosystem.

3. The circuit configuration apparatus of claim 2, wherein the notification subunit notifies the external apparatus of, as the first cryptosystem, a cryptosystem that corresponds to a circuit configuration information set that has been last written into the non-transitory memory.

4. The circuit configuration apparatus of claim 2, wherein the notification subunit notifies the external apparatus of, as a first cryptosystem, a cryptosystem that has a highest cryptographic strength among one or more cryptosystems stored in the non-transitory memory.

5. The circuit configuration apparatus of claim 2, wherein the notification subunit notifies the external apparatus of, as the first cryptosystem, a cryptosystem indicated by a selection instruction received from outside.

6. The circuit configuration apparatus of claim 2,
wherein the instruction information includes a cryptosystem-breaking notification indicating that a cryptosystem has been broken, and
wherein the notification subunit notifies the external apparatus of, as the first cryptosystem, a cryptosystem other than the broken cryptosystem.

7. The circuit configuration apparatus of claim 1,
wherein the acquisition unit further acquires signature information generated by applying a digital signature to the second circuit configuration information set,
wherein the processor further functions as
a verification unit operable to verify legitimacy of the second circuit configuration information set using the signature information and the decrypted second circuit configuration information set, and
wherein, only when the legitimacy has been successfully verified, the writing unit writes the second circuit configuration information set into the non-transitory memory.

8. The circuit configuration apparatus of claim 1,
wherein the non-transitory memory further stores a verification-circuit configuration information set indicating a structure of the verification unit, and
wherein, after the decryption is completed, the reading unit further reads the verification-circuit configuration information set, and outputs the read verification-circuit configuration information set to the configuration unit as the circuit configuration information set, thereby causing the configuration unit to configure the verification unit.

9. The circuit configuration apparatus of claim 1, wherein the reconfigurable logic circuit is structured with a Field Programmable Gate Array.

10. The circuit configuration apparatus of claim 1, wherein the reconfigurable logic circuit is structured with a dynamic reconfigurable LSI.

11. A new circuit introduction system comprising a server apparatus and a circuit configuration apparatus that reconfigures a reconfigurable logic circuit so as to configure an execution circuit,
wherein the circuit configuration apparatus includes:
a first non-transitory memory that (i) stores computer executable instructions and (ii) stores a first circuit configuration information set that defines a first cryptographic processing circuit for executing cryptographic processing in accordance with a first cryptosystem used for a first content; and
a first processor that executes the computer executable instructions to function as:
a configuration unit operable reconfigure the reconfigurable logic circuit in accordance with a circuit configuration information set input thereto so as to configure the execution circuit;
a reading unit operable to read the first circuit configuration information set from the first non-transitory memory, and to output the first circuit configuration information set to the configuration unit;
an acquisition unit operable to acquire a second circuit configuration information set that has been subject to cryptographic processing according to the first cryptosystem and that defines a second cryptographic processing circuit for executing cryptographic processing in accordance with a second cryptosystem used for a second content, the second cryptosystem being different from the first cryptosystem;
a control unit operable to cause the first cryptographic processing circuit to decrypt the second circuit configuration information set that has been subject to encryption processing in accordance with the first cryptosystem and that has been acquired by the acquisition unit; and
a writing unit operable to write the second circuit configuration information set into the first non-transitory memory,
wherein the server apparatus includes:
a second non-transitory memory that (i) stores computer executable instructions and (ii) stores the second circuit configuration information set; and
a second processor that executes the computer executable instructions to function as:
a generation unit operable to encrypt the second circuit configuration set; and
an output unit operable to output the encrypted second circuit configuration information set to the circuit configuration apparatus,
wherein each of the first circuit configuration information set and the second circuit configuration information set stored in the first non-transitory memory includes encryption processing circuit information and decryption processing circuit information, the encryption processing circuit information indicating a structure of an encryption processing circuit that executes encryption processing in accordance with the corresponding cryptosystem, and the decryption processing circuit information indicating a structure of a decryption processing circuit that executes decryption processing in accordance with the corresponding cryptosystem, and wherein the first processor further functions as
a deletion unit operable to delete, from the first non-transitory memory, encryption processing circuit information included in a circuit configuration information set that corresponds to a cryptosystem that has been broken, without deleting decryption processing circuit information included in the circuit configuration information set.

12. A new circuit introduction method used in a circuit configuration apparatus that reconfigures a reconfigurable logic circuit so as to configure an execution circuit, the new circuit introduction method comprising:
storing, in a non-transitory memory, a first circuit configuration information set that defines a first cryptographic processing circuit for executing cryptographic processing in accordance with a first cryptosystem used for a first content;
reading the first circuit configuration information set from the non-transitory memory, and outputting the first circuit configuration information set to a configuration unit;
reconfiguring, using the configuration unit, the reconfigurable logic circuit in accordance with a circuit configuration information set so as to configure the execution circuit;
acquiring a second circuit configuration information set that has been subject to cryptographic processing according to the first cryptosystem and that defines a second cryptographic processing circuit for executing cryptographic processing in accordance with a second cryptosystem used for a second content, the second cryptosystem being different from the first cryptosystem;
controlling the first cryptographic processing circuit to decrypt the second circuit configuration information set that has been subject to encryption processing in accordance with the first cryptosystem and that has been acquired in the acquisition step; and
writing the second circuit configuration information set into the non-transitory memory,
wherein each of the first circuit configuration information set and the second circuit configuration information set stored in the non-transitory memory includes encryption processing circuit information and decryption processing circuit information, the encryption processing circuit information indicating a structure of an encryption processing circuit that executes encryption processing in accordance with the corresponding cryptosystem, and the decryption processing circuit information indicating a structure of a decryption processing circuit that executes decryption processing in accordance with the corresponding cryptosystem, and
wherein the new circuit introduction method further comprises
deleting, from the non-transitory memory, encryption processing circuit information included in a circuit configuration information set that corresponds to a cryptosystem that has been broken, without deleting decryption processing circuit information included in the circuit configuration information set.

13. A non-transitory computer readable recording medium having stored thereon a new-circuit introduction program used in a circuit configuration apparatus that reconfigures a reconfigurable logic circuit so as to configure an execution circuit, wherein when executed, the new-circuit introduction program causes the circuit configuration apparatus to perform a method comprising:
storing, in a non-transitory memory, a first circuit configuration information set that defines a first cryptographic processing circuit for executing cryptographic processing in accordance with a first cryptosystem used for a first content;
reading the first circuit configuration information set from the non-transitory memory, and outputting the first circuit configuration information set to a configuration unit;
reconfiguring, using the configuration unit, the reconfigurable logic circuit in accordance with a circuit configuration information set so as to configure the execution circuit;
acquiring a second circuit configuration information set that has been subject to cryptographic processing according to the first cryptosystem and that defines a second cryptographic processing circuit for executing cryptographic processing in accordance with a second cryptosystem used for a second content, the second cryptosystem being different from the first cryptosystem;
controlling the first cryptographic processing circuit to decrypt the second circuit configuration information set that has been subject to encryption processing in accordance with the first cryptosystem and that has been acquired in the acquisition step; and
writing the second circuit configuration information set into the non-transitory memory,
wherein each of the first circuit configuration information set and the second circuit configuration information set stored in the non-transitory memory includes encryption processing circuit information and decryption processing circuit information, the encryption processing circuit information indicating a structure of an encryption processing circuit that executes encryption processing in accordance with the corresponding cryptosystem, and the decryption processing circuit information indicating a structure of a decryption processing circuit that executes decryption processing in accordance with the corresponding cryptosystem, and
wherein the method further comprises
deleting, from the non-transitory memory, encryption processing circuit information included in a circuit configuration information set that corresponds to a cryptosystem that has been broken, without deleting decryption processing circuit information included in the circuit configuration information set.

14. An integrated circuit that is mounted on a circuit configuration apparatus that reconfigures a reconfigurable logic circuit so as to configure an execution circuit, the integrated circuit comprising:
a non-transitory memory that (i) stores computer executable instructions and (ii) stores a first circuit configuration information set that defines a first cryptographic processing circuit for executing cryptographic processing in accordance with a first cryptosystem used for a first content; and
a processor that executes the computer executable instructions to function as:
a configuration unit operable to reconfigure the reconfigurable logic circuit in accordance with a circuit configuration information set input thereto so as to configure the execution circuit;
a reading unit operable to read the first circuit configuration information set from the non-transitory memory, and to output the first circuit configuration information set to the configuration unit;

an acquisition unit operable to acquire a second circuit configuration information set that has been subject to cryptographic processing according to the first cryptosystem and that defines a second cryptographic processing circuit for executing cryptographic processing in accordance with a second cryptosystem used for a second content, the second cryptosystem being different from the first cryptosystem;

a control unit operable to cause the first cryptographic processing circuit to decrypt the second circuit configuration information set that has been subject to encryption processing in accordance with the first cryptosystem and that has been acquired by the acquisition unit; and a writing unit operable to write the second circuit configuration information set into the non-transitory memory, wherein each of the first circuit configuration information set and the second circuit configuration information set stored in the non-transitory memory includes encryption processing circuit information and decryption processing circuit information, the encryption processing circuit information indicating a structure of an encryption processing circuit that executes encryption processing in accordance with the corresponding cryptosystem, and the decryption processing circuit information indicating a structure of a decryption processing circuit that executes decryption processing in accordance with the corresponding cryptosystem, and wherein the processor further functions as a deletion unit operable to delete, from the non-transitory memory, encryption processing circuit information included in a circuit configuration information set that corresponds to a cryptosystem that has been broken, without deleting decryption processing circuit information included in the circuit configuration information set.

15. The integrated circuit of claim 14, wherein
the reconfigurable logic circuit is structured with a Field Programmable Gate Array.

16. The integrated circuit of claim 14, wherein
the reconfigurable logic circuit is structured with a dynamic reconfigurable LSI.

* * * * *